United States Patent
Becker et al.

(10) Patent No.: US 12,258,443 B2
(45) Date of Patent: Mar. 25, 2025

(54) POLY(PROPYLENE FUMARATE)-BASED COPOLYMERS FOR 3D PRINTING APPLICATIONS

(71) Applicants: Matthew Becker, Chapel Hill, NC (US); Yongjun Shin, Fairlawn, OH (US); Gaelle Le Fer, Akron, OH (US)

(72) Inventors: Matthew Becker, Chapel Hill, NC (US); Yongjun Shin, Fairlawn, OH (US); Gaelle Le Fer, Akron, OH (US)

(73) Assignee: The University of Akron, Akron, OH (US)

( * ) Notice: Subject to any disclaimer, the term of this patent is extended or adjusted under 35 U.S.C. 154(b) by 898 days.

(21) Appl. No.: 17/260,043

(22) PCT Filed: Jul. 15, 2019

(86) PCT No.: PCT/US2019/041782
§ 371 (c)(1),
(2) Date: Jan. 13, 2021

(87) PCT Pub. No.: WO2020/014699
PCT Pub. Date: Jan. 16, 2020

(65) Prior Publication Data
US 2021/0284791 A1    Sep. 16, 2021

Related U.S. Application Data

(60) Provisional application No. 62/697,613, filed on Jul. 13, 2018.

(51) Int. Cl.
| | |
|---|---|
| C08G 63/58 | (2006.01) |
| B29C 64/314 | (2017.01) |
| B33Y 40/10 | (2020.01) |
| B33Y 70/00 | (2020.01) |
| C08G 63/83 | (2006.01) |
| B29K 105/00 | (2006.01) |

(52) U.S. Cl.
CPC .......... C08G 63/58 (2013.01); B29C 64/314 (2017.08); B33Y 40/10 (2020.01); B33Y 70/00 (2014.12); C08G 63/83 (2013.01); B29K 2105/0002 (2013.01)

(58) Field of Classification Search
CPC ........ C08G 63/66; C08G 63/16; C08G 63/58; C08G 63/83; B33Y 70/00; B33Y 40/10
See application file for complete search history.

(56) References Cited

U.S. PATENT DOCUMENTS 4,888,413 A    12/1989 Domb
2019/0091343 A1*    3/2019 Tatara .................. A61K 31/506

FOREIGN PATENT DOCUMENTS

JP    2002-053626 A    2/2002
WO    2016081587 A9    5/2016

OTHER PUBLICATIONS

DiCiccio et al (Ring-Opening Copolymerization of Maleic Anhydride with Epoxides: A Chain-Growth Approach to Unsaturated Polyesters), J. Am. Chem. Soc. 2011, 133, 10724-10727, published on Jun. 24, 2011.*
Ben-Shabat et al (Synthesis and Characterization of Biodegradable Copolyesters and Copolyanhydrides Prepared from Fumaric and Succinic Acid Trimers and Oligomers, Israel Journal of Chemistry vol. 45 2005 pp. 411-420, published on Sep. 2005).*
Sadafule, et al.; "Photocrosslinkable unsaturated polyesters from aliphatic diacids" Polymer Photochemistry, Jan. 1982, vol. 2; pp. 13-21; p. 14, p. 15.
Takenouchi, et al.; Effects of Geometrical Difference of Unsaturated Aliphatic Polyesters on Their Biodegradability II. Isomerization of Poly((maleic anhydride-co-propylene oxide) in the Presence of Morpholine, Polymer Journal, Jan. 1, 2002 (Jan. 1, 2002), vol. 34, pp. 36-42; p. 37.
Wilson, et al.; "Magnesium Catalyzed Polymerization of End Functionalized Poly (propylene maleate) and Poly (propylene fumarate) for 3D Printing of Bioactive Scaffolds", Journal of the American Chemical Society, Dec. 13, 2017 (Dec. 13, 2017), vol. 140, pp. 277-284; Abstract, p. 279.
Ye, HM et al. "Isomorphism in Poly(butylene succinate-co-butylene fumarate) and its application as polymeric nucleating agent for Poly(butylene succinate)" Macromolecules vol. 45, issue. 14, pp. 5667-5675 (Jul. 2012).
Sheikholeslami, et al., "Material properties of degradable Poly(butylene succinate-co-fumarate) copolymer networks synthesized by polycondensation of pre-homopolyesters" Polymer, vol. 98, pp. 70-79 (Jun. 2016).

(Continued)

Primary Examiner — Gregory Listvoyb
(74) Attorney, Agent, or Firm — Renner, Kenner, Greive, Bobak, Taylor & Weber Co., LPA

(57) ABSTRACT

In various embodiments, the present invention is directed to a PPF-based copolymer for 3D printing applications and methods for its making and use. These copolymers have a viscosity in a printable viscosity range and allow light transmittance at curing wavelengths. In various embodiments, a lower viscosity copolymers are obtained by substitution of a portion of maleic anhydride with succinic anhydride and then forming a poly(propylene fumarate-co-succinate) copolymer by the copolymerization of maleic anhydride and succinic anhydride with propylene oxide via $Mg(BHT)_2(THF)_2$ catalyzed ring opening copolymerization (ROCOP). Because of their lower viscosities, these copolymers require less, if any, diethyl fumarate (DEF) to prepare the 3D printing resin, while the mechanical properties can still be adjusted as with a PPF polymer prepared without the succinic anhydride.

16 Claims, 33 Drawing Sheets

(56) References Cited

OTHER PUBLICATIONS

Extended European Search Report issued Mar. 21, 2022 in the corresponding European national phase application (No. 19835200.7).

Office Action issued Mar. 17, 2022 in the corresponding Chinese national phase application (No. 201980059566.2) and a partial translation thereof.

\* cited by examiner

Order of addition of reactive species

Order 1:
1. Maleic anhydride
2. Catalyst Mg(BHT)$_2$(THF)$_2$
3. Toluene
4. Initiator (Propargyl alcohol)
5. Propylene oxide Order 2:
1. Initiator (Propargyl alcohol)
2. Catalyst Mg(BHT)$_2$(THF)$_2$
3. Toluene
4. Maleic anhydride
5. Propylene oxide Polymers obtained

POLY(PROPYLENE FUMARATE)-BASED COPOLYMERS FOR 3D PRINTING APPLICATIONS

CROSS REFERENCE TO RELATED APPLICATIONS

This application claims the benefit of international application serial number PCT/US2019/041782 entitled "Poly (Propylene Fumarate)-Based Copolymers for 3D Printing Applications," filed Jul. 15, 2019, which claims the benefit of U.S. provisional patent application Ser. No. 62/697,613 entitled "Poly(Propylene Fumarate)-Based Copolymers for 3D Printing Applications," filed Jul. 13, 2018. Both of these applications are incorporated herein by reference in its entirety.

NAMES OF THE PARTIES TO A JOINT RESEARCH AGREEMENT

The present application stems from work done pursuant to a Joint Research Agreement between The University of Akron of Akron, Ohio and 3D BioActives, LLC of Akron, Ohio.

FIELD OF THE INVENTION

One or more embodiments of the present invention relates to a 3D printable and degradable polymer for use in medical devices and applications. In certain embodiments, the present invention relates to poly(propylene fumarate)(PPF)-based polymers and copolymers for use as medical devices or tissue scaffolds that have a viscosity in a 3D printable viscosity range and allow transmittance of the light at photochemically curing wavelengths.

BACKGROUND OF THE INVENTION

Additive manufacturing, also known as 3D printing, has enabled a new frontier for regenerative medicine due to its ability to fabricate patient and defect specific devices precisely. In particular continuous digital light processing (cDLP) photochemical printing builds all pixels in one layer simultaneously, therefore the build time is much faster than other additive manufacturing methods. In addition to photopolymers, slurry resins that containing fillers, such as nanoparticles or ceramics, can be processed through photo stereolithography, which make cDLP a promising technique for a stress bearing applications.

Poly(propylene fumarate)(PPF) is a resorbable polyester that forms fumaric acid and propylene glycol after degradation in vivo, which are readily excreted from the body. It has been extensively studied for medical device applications, such as drug delivery, blood vessel engineering, nerve grafts, cartilage and bone tissue scaffolds. PPF has an unsaturated double bond in its polymer back bone, which can be crosslinked post-polymerization in photochemical reactions. Oligomeric poly(propylene fumarate)(PPF) is 3D printable through stereolithographic processes and has been found to be a promising material for the construction of medical devices and 3D scaffolds for bone regeneration application using stereolithographic methods, such as cDLP (continuous digital light processing) or liquid crystal display-based printing.

When first introduced in 1994, PPF was synthesized by step-growth polymerization with diethyl fumarate and propylene glycol. However, due to intrinsic limitations of step growth polymerization, the molecular mass of PPF is hard to control using these methods. Targeting oligomers (degree of polymerization (DP)<20) resulted in relatively low conversion, starting material contamination and broad molecular mass distributions ($Đ_m$). More recently, techniques for production of PPF by ring-opening copolymerization (ROCOP) of maleic anhydride and propylene oxide have been reported. Initially, these methods yielded PPF with a narrow $Đ_m$, but that suffered from a low conversion and homopolymerization of the propylene oxide, producing byproducts not easily degraded in the body. By about 2011, methods for production of PPF using a two-step process in which a well-defined ROCOP method yielded poly(propylene maleate) (PPM) intermediate in a first step and then, in a second reaction the PPM intermediate was isomerized to produce the PPF. These methods produced a PPF Polymer with a high conversion with a narrow $Đ_m$ but used a cobalt catalyst that raised cytocompatibility concerns. More recently, PPF has been successfully synthesized via ROCOP using $Mg(BHT)_2(THF)_2$ as the catalyst. This methods resulted in a well-defined molecular mass PPF, having a narrow $Đ_m$ and high end group fidelity at high conversion.

Due to the decreasing solubility with increasing chain length, PPF is a solid when its molecular mass is greater than 4000 Da. Viscosity of PPF is directly correlated to chain length and increases with increasing degree of polymerization (DP). The viscosity of pure PPF (~400 Da) at 40° C. is above 24,000 cP, which is much higher than the ideal viscosity for cDLP of between 2 cP and 200 cP. In general, the resin viscosity has to be less than 5 Pa see to print features with 200 μm struts and 400 μm pores using cDLP. Consequently, only low molecular mass (<3000 Da) oligomers are suitable for cDLP and the high viscosity of PPF limits it from being used its pure polymeric form for most 3D printing applications.

To take advantage of cDLP, the 3D printing material is formulated as a low viscosity resin that is typically composed of photosensitive oligomers, diluent and photoinitiators. In photochemistry-based 3D printing resins using PPF, diethyl fumarate (DEF) or another solvent is usually added to PPF oligomer as a diluent to reduce its viscosity and facilitate crosslinking. Historically, PPF resins have contained DEF as a reactive diluent at up to 50 wt. % to reach a printable viscosity. DEF not only acts as a solvent but is also is incorporated into the 3D printing reaction through its double bond and, depending upon the amount used, the DEF is incorporated into the network and can affect the mechanical properties of 3D printed scaffold. Also, because DEF can be toxic, unreacted, residual DEF must be removed from the cured scaffolds before they can be used in medical devices or applications. By reducing the viscosity of PPF, the amount of DEF required to make the 3D printable resin is also reduced.

Because the viscosity of the PPF is closely related to its degree of polymerization, it is important to control degree of polymerization and dispersity of PPF. Ring opening polymerization (ROP) and ring opening copolymerization (ROROP) are known to be an appropriate method to synthesize polymers with precise molecular mass and narrow molecular mass distributions. ROP and ROCOP require a catalyst and $Mg(BHT)_2(THF)_2$ has been found to be a good catalyst as it affords high activity (more than 95% conversion with less than 1.5 dispersity). However, the PPF that is polymerized with $Mg(BHT)_2(THF)_2$ catalyst has also been found in some cases to have high absorbance at the wavelength in which 3D printing is conducted, which can increases 3D printing times. The high absorbance of these PPF polymers can cause many problems, such as prolonging the production time, limiting production the amount, creating the potential for failure of 3D printing during manufacturing, creating the need for higher light power source, and increasing the consumption of energy. Moreover, since the wavelength of light used for 3D printing depends on the manufacturer of 3D printing machine, production of a PPF polymer that has a lower absorbance along the entire possible wavelength range is strongly desired.

What is needed in the art is a PPF polymer for use in 3D printing having a viscosity in a printable viscosity range and a low absorbance at curing wavelengths.

SUMMARY OF THE INVENTION

In various embodiments, the present invention is directed to a PPF based polymers and copolymers for 3D printing applications (and methods for is making and use) that have a viscosity in a 3D printable viscosity range and low absorbance values at curing wavelengths. As set forth above, the viscosity of the PPF is closely related to its degree of polymerization, so the degree of polymerization and dispersity of the PPF are carefully controlled. In various embodiments of the present invention, this is accomplished by obtaining lower viscosity of the PPF by the substitution of a portion of maleic anhydride with succinic anhydride, and then forming a PPF-based 3D printable polymer by the copolymerization of maleic anhydride and succinic anhydride with propylene oxide using $Mg(BHT)_2(THF)_2$ catalyzed ROP and ROCOP. Moreover, it has been found that by altering the order of addition of the reactive species of the $Mg(BHT)_2(THF)_2$ catalyzed ROP and ROCOP reactions, PPF-based 3D printable polymer having lower absorbance values at curing wavelengths can be produced. The copolymers of the present invention have lower viscosities and lower absorbance than known PPM and PPF polymers, while maintaining 3D printability. Further, because the PPF based polymers and copolymers of the present invention have lower viscosities, less diethyl fumarate (DEF) is required to prepare the 3D printing resin, while the mechanical properties can still be adjusted in the same ways as a PPF polymer prepared by ROP or ROCOP without the succinic anhydride. Moreover, the curing time of 3D printing for these PFF-based polymers is reduced compared with the PPF that are prepared without succinic anhydride using $Mg(BHT)_2(THF)_2$ as catalyst.

In a first aspect, the present invention is directed to a polymer composition comprising the one or more isomerized residues of maleic anhydride monomer, one or more residue of succinic anhydride monomer and one or more residues of propylene oxide monomer. In one or more embodiments, the polymer composition will comprise from about 1 to about 30 mole percent, preferably from about 1 to about 20 mole percent, and more preferably from about 1 to about 10 mole percent succinic anhydride residues. In some embodiments, the polymer composition will comprise about 50 mole percent propylene oxide residues.

In one or more embodiments, the polymer composition of the present invention a degree of polymerization (DP) of from about 5 to about 100, preferably from about 5 to about 50, and more preferably from about 5 to about 10. In one or more embodiments, the polymer composition of the present invention includes any one or more of the above referenced embodiments of the first aspect of the present invention having a number average molecular weight ($M_n$) of from about 0.5 kDa to about 100 kDa, preferably from about 0.5 kDa to about 50 kDa, and more preferably from about 0.5 kDa to about 5 kDa, as measured by size exclusion chromatography (SEC) or gel permeation chromatography (GPC). In one or more embodiments, the polymer composition of the present invention includes any one or more of the above referenced embodiments of the first aspect of the present invention having a mass distribution ($Đ_m$) of from about 1 to about 2, preferably from about 1 to about 1.5, and more preferably from about 1 to about 1.2.

In one or more embodiments, the polymer composition of the present invention includes any one or more of the above referenced embodiments of the first aspect of the present invention having a zero sheer viscosity of from about 500 Pa·s to about 10,000 Pa·s, preferably from about 1000 Pa·s to about 7,000 Pa·s, and more preferably from about 1000 Pa·s to about 5000 Pa·s, as measured by a rheometer. In one or more embodiments, the polymer composition of the present invention includes any one or more of the above referenced embodiments of the first aspect of the present invention having a zero sheer viscosity of from about 1.5 Pa·s to about 2.5 Pa·s, preferably from about 1.7 Pa·s to about 2.4 Pa·s, and more preferably from about 1.8 Pa·s to about 2.2 Pa·s, as measured by a rheometer when diluted with 30 weight percent DEF. In one or more embodiments, the polymer composition of the present invention includes any one or more of the above referenced embodiments of the first aspect of the present invention having an absorbance at wavelengths from about 305 nm to about 405 nm of from about 0.001 to about 0.3, preferably from about 0.001 to about 0.2, and more preferably from about 0.001 to about 0.1, as measured by a UV-Visible spectrometer.

In one or more embodiments, the polymer composition of the present invention includes any one or more of the above referenced embodiments of the first aspect of the present invention having the formula:

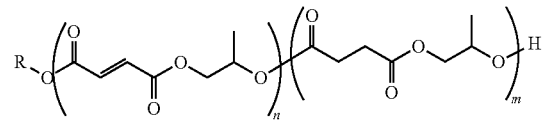

where R is alkyl, alkene, alkyne or aromatic group; n is a mole fraction from about 0.50 to about 0.99 and m is a mole fraction from about 0.01 to about 0.50.

In a second aspect, the present invention is directed to a polymer for use in 3D printable resins comprising the isomerized reaction product of maleic anhydride, succinic anhydride and propylene oxide. In one or more embodiments, the polymer for use in 3D printable resins will comprise from about 1 to about 30 mole percent, preferably from about 1 to about 20 mole percent, and more preferably from about 1 to about 10 mole percent succinic anhydride residues. In some embodiments, the polymer for use in 3D printable resins comprises about 50 mole percent propylene oxide residues.

In one or more embodiments, the polymer for use in 3D printable resins of the present invention includes any one or more of the above referenced embodiments of the second aspect of the present invention having a degree of polymerization (DP) of from about 5 to about 100, preferably from about 5 to about 50, and more preferably from about 5 to about 10. In one or more embodiments, the polymer for use in 3D printable resins of the present invention includes any one or more of the above referenced embodiments of the second aspect of the present invention having a number average molecular mass ($M_n$) of about 0.5 kDa to about 100 kDa, preferably from about 0.5 kDa to about 50 kDa, and more preferably from about 0.5 kDa to about 5 kDa, as measured by size exclusion chromatography (SEC) or gel permeation chromatography (GPC). In one or more embodiments, the polymer for use in 3D printable resins of the present invention includes any one or more of the above referenced embodiments of the $Ð_m$ second aspect of the present invention having a mass distribution (Ð) of from about 1 to about 2, preferably from about 1 to about 1.5, and more preferably from about 1 to about 1.2.

In one or more embodiments, the polymer for use in 3D printable resins of the present invention includes any one or more of the above referenced embodiments of the second aspect of the present invention having a zero sheer viscosity of from about 500 Pa·s to about 10,000 Pa·s, preferably from about 1000 Pa·s to about 7,000 Pa·s, and more preferably from about 1000 Pa·s to about 5000 Pa·s, as measured by a rheometer. In one or more embodiments, the polymer for use in 3D printable resins of the present invention includes any one or more of the above referenced embodiments of the second aspect of the present invention having a zero sheer viscosity of from about 1.5 Pa·s to about 2.5 Pa·s, preferably from about 1.7 Pa·s to about 2.4 Pa·s, and more preferably from about 1.8 Pa·s to about 2.2 Pa·s, as measured by a rheometer when diluted with 30 weight percent DEF. In one or more embodiments, the polymer for use in 3D printable resins of the present invention includes any one or more of the above referenced embodiments of the second aspect of the present invention having an absorbance at wavelengths from about 305 nm to about 405 nm of from about 0.001 to about 0.3, preferably from about 0.001 to about 0.2, and more preferably from about 0.001 to about 0.1, as measured by a UV-Visible spectrometer.

In one or more embodiments, the polymer for use in 3D printable resins of the present invention includes any one or more of the above referenced embodiments of the second aspect of the present invention having the formula:

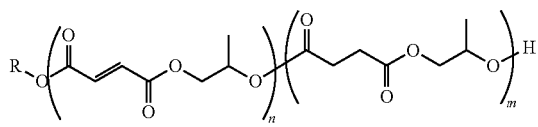

where R is alkyl, alkene, alkyne or aromatic group; n is a mole fraction from about 0.50 to about 0.99 and m is a mole fraction from about 0.01 to about 0.50.

In a third aspect, the present invention is directed to a method of making a polymer for use in 3D printable resins comprising: reacting maleic anhydride, succinic anhydride and propylene oxide and an initiating alcohol in the presence of a magnesium catalyst to form a poly(propylene maleate-co-succinate) copolymer intermediate having a maleic anhydride residue containing a cis double bond; and isomerizing the cis double bond in the maleic anhydride residue by reacting the poly(maleic anhydride-co-succinic anhydride-co-propylene oxide) polymer intermediate to form a poly (propylene fumarate-co-succinate) copolymer. In one or more of these embodiments, the method further comprises washing the solution with a buffer solution to remove any residual amine, and drying the product to recover the poly (propylene fumarate-co-succinate) copolymer.

In one or more embodiments, the initiating alcohol is selected from the group consisting of benzyl alcohol, propargyl alcohol, 4-hydroxybutan-2-one, 5-norbonen-2-ol, butanone, ethyl alcohol, isopropyl alcohol, tertiary butyl alcohol, and combinations thereof. In various embodiments, the magnesium catalyst is Mg(BHT)$_2$(THF)$_2$.

In one or more embodiments, the method for making a polymer for use in 3D printable resins of the present invention includes any one or more of the above referenced embodiments of the third aspect of the present invention wherein the step of reacting comprises: placing an initiating alcohol and Mg(BHT)$_2$(THF)$_2$ in a suitable sealed reaction vessel and then adding propylene oxide, maleic anhydride, succinic anhydride and a suitable solvent; heating the combination until substantially all of the maleic anhydride, succinic anhydride and propylene oxide have reacted to form a poly(propylene maleate-co-succinate) copolymer intermediate; precipitating the poly(propylene maleate-co-succinate) copolymer intermediate into an excess of a non-solvent for the poly(propylene maleate-co-succinate) copolymer intermediate; and drying the poly(propylene maleate-co-succinate) copolymer intermediate to remove remaining solvent. In one or more embodiments, the suitable solvent in the step of combing is selected from toluene, hexane, and combinations thereof.

In one or more embodiments, the method for making a polymer for use in 3D printable resins of the present invention includes any one or more of the above referenced embodiments of the third aspect of the present invention wherein the molar ratio of maleic anhydride to succinic anhydride in the step of combining is from about 100:1 to about 1:1, preferably from about 50:1 to about 1:1, and more preferably from about 2:1 to about 1:1. In one or more embodiments, the method for making a polymer for use in 3D printable resins of the present invention includes any one or more of the above referenced embodiments of the third aspect of the present invention wherein the step of heating comprises heating the combination to a temperature of from about 40° C. to about 80° C. for from about 1 hours to about 48 hours or until substantially all of the maleic anhydride, succinic anhydride, and propylene oxide monomers have reacted.

In one or more embodiments, the method for making a polymer for use in 3D printable resins of the present invention includes any one or more of the above referenced embodiments of the third aspect of the present invention wherein the step of precipitating comprises combing the product with an excess of diethyl ether to cause the poly (propylene maleate-co-succinate) copolymer intermediate to precipitate out of solution. In one or more embodiments, the method for making a polymer for use in 3D printable resins of the present invention includes any one or more of the above referenced embodiments of the third aspect of the present invention wherein the step of drying is performed by vacuum evaporation.

In one or more embodiments, the method for making a polymer for use in 3D printable resins of the present invention includes any one or more of the above referenced embodiments of the third aspect of the present invention wherein the step of isomerizing comprises: dissolving the poly(propylene maleate-co-succinate) copolymer intermediate in a suitable solvent; and adding diethylamine to the solution and heating it to a reflux temperature under an inert atmosphere to produce the poly(propylene fumarate-co-succinate) copolymer. In one or more embodiments, the method for making a polymer for use in 3D printable resins of the present invention includes any one or more of the above referenced embodiments of the third aspect of the present invention wherein the suitable solvent for the poly (propylene maleate-co-succinate) copolymer intermediate is selected from the group consisting of chloroform, dichloromethane, and combinations thereof. In one or more embodiments, the method for making a polymer for use in 3D printable resins of the present invention includes any one or more of the above referenced embodiments of the third aspect of the present invention wherein the solution is heated to a reflux temperature under an inert atmosphere for from about 1 to about 48 hours or until substantially all of poly(propylene maleate-co-succinate) copolymer intermediate has isomerized.

In one or more embodiments, the method for making a polymer for use in 3D printable resins of the present invention includes any one or more of the above referenced embodiments of the third aspect of the present invention wherein the buffer solution in the step of washing is a phosphate buffer solution. In one or more embodiments, the method for making a polymer for use in 3D printable resins of the present invention includes any one or more of the above referenced embodiments of the third aspect of the present invention wherein the step of drying is performed by vacuum evaporation.

BRIEF DESCRIPTION OF THE DRAWINGS

For a more complete understanding of the features and advantages of the present invention, reference is now made to the detailed description of the invention along with the accompanying figures in which:

(FIG. 8B);

FIG. 33A is a graph showing the evolution of $\ln([M_0]/[M_t])$ with time (triangle: Catalyst+Man and circles: Catalyst+alcohol); FIG. 33B is a graph showing the evolution of conversion with time (triangles: Catalyst+Man and circles: Catalyst+alcohol); FIG. 33C is a graph showing the evolution of molar mass and dispersity with the conversion for the Catalyst+Man system; and FIG. 33D is a graph showing the evolution of molar mass and dispersity with the conversion for the Catalyst+alcohol system. Calculations based on $^1$H NMR in $CDCl_3$ and dispersity values determined by SEC in DMF (polystyrene calibration)

DETAILED DESCRIPTION OF THE ILLUSTRATIVE EMBODIMENTS

Figure 1:
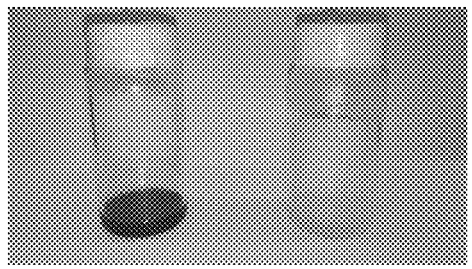
FIG. 1 is an image and associated description showing poly(propylene fumarate-co-succinate) copolymers made with different orders of addition for the reactive species.

In various embodiments, the present invention is directed to a PPF-based copolymer for 3D printing applications and methods for its making and use. These copolymers have a viscosity in a printable viscosity range and allow light transmittance at curing wavelengths. Viscosity is closely related with degree of polymerization and stoichiometry of the monomers, so the degree of polymerization and molecular mass distribution of the PPF or PPF-based copolymer must be carefully controlled. In various embodiments of the present invention, lower viscosity of the PPF is obtained by substitution of a portion of the maleic anhydride with succinic anhydride and then forming a poly(propylene fumarate-co-succinate) copolymer by the copolymerization of maleic anhydride and succinic anhydride with propylene oxide via $Mg(BHT)_2(THF)_2$ catalyzed ROCOP. While not wanting to be bound by theory, it is believed that addition of the succinic anhydride reduces the viscosity of PPF because it alters the chain-chain interaction of the polymer by modifying the stoichiometry or chain architecture. Further, because these PPF-based copolymers have lower viscosities, less diethyl fumarate (DEF) is required to prepare the 3D printing resin, while the mechanical properties can still be adjusted in the same manner as a PPF polymer prepared without the succinic anhydride.

Moreover, as set forth above, by altering the order of addition of the reactive species of the $Mg(BHT)_2(THF)_2$ catalyzed ROP and ROCOP reactions, PPF-based 3D printable polymer having lower absorbance values at curing wavelengths can be produced. It has been found that addition of the maleic anhydride and/or succinic anhydride before initiating alcohol produces a polymer with a relatively high absorbance (generally greater than 0.5). However, if the initiating alcohol the is added before the maleic anhydride and succinic anhydride, a PPF-based 3D printable polymer having much lower absorbance (generally less than 0.3) at curing wavelengths may be produced. Moreover, the curing time of 3D printing for these PFF-based polymers is reduced compared with the PPF that are prepared without succinic anhydride using $Mg(BHT)_2(THF)_2$ as catalyst.

The following terms may have meanings ascribed to them below, unless specified otherwise. As used herein, the terms "comprising" "to comprise" and the like do not exclude the presence of further elements or steps in addition to those listed in a claim. Similarly, the terms "a," "an" or "the" before an element or feature does not exclude the presence of a plurality of these elements or features, unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term "about."

It should be also understood that the ranges provided herein are a shorthand for all of the values within the range and, further, that the individual range values presented herein can be combined to form additional non-disclosed ranges. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

In a first aspect, the present invention is directed to a PPF-based 3D printable polymer composition comprising a poly(propylene fumarate-co-succinate) copolymer. In one or more embodiments, the PPF-based 3D printable polymer composition of the present invention will comprise the isomerized residues a maleic anhydride monomer, residues of succinic anhydride monomer and residues of a propylene oxide. As used herein, the term "residue(s)" is used to refer generally to the portion of a monomer or other chemical unit that has been incorporated into a polymer or other large molecule. As follows, the terms "residues of succinic anhydride monomer," "residues of succinic anhydride" and "succinic anhydride residue(s)" are all used herein to refer to the portion(s) of succinic anhydride monomer and the terms "residues of propylene oxide monomer," "residues of propylene oxide" and "propylene oxide residue(s)" are all used herein to refer to the portion(s) of propylene oxide monomer incorporated into the poly(propylene fumarate-co-succinate) copolymer. Similarly, the terms "isomerized residue of a maleic anhydride monomer," "isomerized residues of maleic anhydride monomer," "isomerized residue of a maleic anhydride," "isomerized residues of maleic anhydride," and "isomerized maleic anhydride residue(s)" are used interchangeably to refer to residue(s) of the maleic anhydride monomer incorporated into the poly(propylene fumarate-co-succinate) copolymer of the present invention in which the double bond has subsequently been isomerized from the cis (maleate) configuration to the trans (fumarate) configuration during formation of the poly(propylene fumarate-co-succinate) copolymer from the poly(propylene maleate-co-succinate) copolymer intermediate, as described below.

As will be apparent, the succinic anhydride molecule closely resembles the maleic anhydride, but lacks the photopolymerizable double bond. It has been found that succinic anhydride will polymerize with propylene oxide in much the same way as maleic anhydride, but produces copolymers having a lower viscosity and absorption than comparable polymers made with maleic anhydride. However, the lack of a double bond in the backbone of the succinic anhydride monomer ensures that it will not be crosslinked and does not need isomerization.

It has been found, however, that by replacing some portion of the maleic anhydride used in the synthesis of PPF by ROCOP with succinic anhydride, it is possible to produce a PPF-based polymer (poly(propylene fumarate-co-succinate)) having a lower viscosity and a lower adsorption, while still maintaining the good mechanical properties of pure PPF. In some of these embodiments, the copolymer composition of the present invention will comprise from about 1 to about 30 mole percent, preferably from about 1 to about 20 mole percent, and more preferably from about 1 to about 10 mole percent succinic anhydride residues. In some embodiments, the copolymer composition of the present invention will comprise from about 1 to about 25 mole percent, in other embodiments, from about 1 to about 15 mole percent, in other embodiments, from about 1 to about 5 mole percent, in other embodiments, from about 5 to about 30 mole percent, in other embodiments, from about 10 to about 30 mole percent, in other embodiments, from about 15 to about 30 mole percent, in other embodiments, from about 20 to about 30 mole percent, and in other embodiments, from about 25 to about 30 mole percent succinic anhydride residues. Here, as well as elsewhere in the specification and claims, individual range values can be combined to form additional non-disclosed ranges. As will be apparent, propylene oxide residues will comprise about 50 mole percent of these copolymers, with the balance being isomerized residues of maleic anhydride and residues of the initiating alcohols.

As set forth above, the degree of polymerization and dispersity of the PPF must be carefully controlled to obtain polymers having the desired viscosity. In one or more embodiments, the polymer composition of the present invention will have a degree of polymerization (DP) of from about 5 to about 100, preferably from about 5 to about 50, and more preferably from about 5 to about 10. In some embodiments, the polymer composition of the present invention will have a degree of polymerization (DP) of from about 1 to about 200, in other embodiments, from about 1 to about 100, in other embodiments, from about 1 to about 75, in other embodiments, from about 1 to about 50, in other embodiments, from about 1 to about 25, and in other embodiments, from about 1 to about 10. In some embodiments, the polymer composition of the present invention will have a degree of polymerization (DP) of from about 5 to about 200, in other embodiments, from about 10 to about 200, in other embodiments, from about 20 to about 200, in other embodiments, from about 50 to about 200, in other embodiments, from about 100 to about 200, and in other embodiments, from about 150 to about 200. Here, as well as elsewhere in the specification and claims, individual range values can be combined to form additional non-disclosed ranges.

In one or more embodiments, the polymer composition of the present invention will have a number average molecular weight ($M_n$) of from about 0.5 kDa to about 100 kDa, preferably from about 0.5 kDa to about 50 kDa, and more preferably from about 0.5 kDa to about 5 kDa, as measured by size exclusion chromatography (SEC) or MALDI mass spectrometry or gel permeation chromatography (GPC). In some embodiments, the polymer composition of the present invention will have a number average molecular weight ($M_n$) of from about 1 kDa to about 100 kDa, in other embodiments, from about 1 kDa to about 75 kDa, in other embodiments, from about 1 kDa to about 50 kDa, in other embodiments, from about 1 kDa to about 25 kDa, in other embodiments, from about 1 kDa to about 15 kDa, in other embodiments, from about 10 kDa to about 100 kDa, in other embodiments, from about 40 kDa to about 100 kDa, and in other embodiments, from about 60 kDa to about 100 kDa as measured by size exclusion chromatography (SEC) or MALDI mass spectrometry or gel permeation chromatography (GPC). In some embodiments, the polymer composition of the present invention will have a number average molecular weight ($M_n$) of from about 0.5 kDa to about 10 kDa, as measured by size exclusion chromatography (SEC), MALDI mass spectrometry or gel permeation chromatography (GPC). Here, as well as elsewhere in the specification and claims, individual range values can be combined to form additional non-disclosed ranges.

In one or more of these embodiments, the polymer composition of the present invention will have a mass distribution ($Đ_m$) of from about 1 to about 2, preferably from about 1 to about 1.5, and more preferably from about 1 to about 1.2. In some embodiments, the polymer composition of the present invention will have a mass distribution ($Đ_m$) of from about 1 to about 2, in other embodiments, from about 1.0 to about 1.8, in other embodiments, from about 1.0 to about 1.6, in other embodiments, from about 1.0 to about 1.4, in other embodiments, from about 1.0 to about 1.2, in other embodiments, from about 1.1 to about 2.0, in other embodiments, from about 1.3 to about 2.0, in other embodiments, from about 1.5 to about 2.0, in other embodiments, from about 1.7 to about 2.0, and in other embodiments, from about 1.9 to about 2.0. Here, as well as elsewhere in the specification and claims, individual range values can be combined to form additional non-disclosed ranges.

In one or more embodiments, the polymer composition of the present invention will have a zero sheer viscosity of from about 500 Pa·s to about 10,000 Pa·s, preferably from about 1,000 Pa·s to about 7,000 Pa·s, and more preferably from about 1,000 Pa·s to about 5,000 Pa·s, as measured by a rheometer. In some embodiments, the polymer composition of the present invention will have a zero sheer viscosity of from about 500 Pa·s to about 9,000 Pa·s, in other embodiments, from about 500 Pa·s to about 7,000 Pa·s, in other embodiments, from about 500 Pa·s to about 5,000 Pa·s, in other embodiments, from about 500 Pa·s to about 3,000 Pa·s, in other embodiments, from about 1000 Pa·s to about 10,000 Pa·s, in other embodiments, from about 3,000 Pa·s to about 10,000 Pa·s, in other embodiments, from about 6,000 Pa·s to about 10,000 Pa·s, and in other embodiments, from about 8,000 Pa·s to about 10,000 Pa·s, as measured by a rheometer.

In one or more embodiments, the polymer composition of the present invention in a 50% DEF solution by weight will have a zero sheer viscosity of from about 0.1 Pa·s to about 1.2 Pa·s, preferably from about 0.1 Pa·s to about 1.0 Pa·s, and more preferably from about 0.1 Pa·s to about 0.5 Pa·s, as measured by a rheometer. In some embodiments, the polymer composition of the present invention in a 50% DEF solution by weight will have a zero sheer viscosity of from about 0.2 Pa·s to about 1.2 Pa·s, in other embodiments, from about 0.4 Pa·s to about 1.2 Pa·s, in other embodiments, from about 0.6 Pa·s to about 2.0 Pa·s, in other embodiments, from about 0.8 Pa·s to about 2.0 Pa·s, in other embodiments, from about 1.0 Pa·s to about 2.0 Pa·s, in other embodiments, from about 0.1 Pa·s to about 1.1 Pa·s, in other embodiments, from about 0.1 Pa·s to about 0.9 Pa·s, in other embodiments, from about 0.1 Pa·s to about 0.7 Pa·s, in other embodiments, from about 0.1 Pa·s to about 0.5 Pa·s, and in other embodiments, from about 0.1 Pa·s to about 0.3 Pa·s, as measured by a rheometer. In one or more embodiments, the polymer composition of the present invention in a 70% polymer/30% DEF solution by weight will have a zero sheer viscosity of from about 1.5 Pa·s to about 2.5 Pa·s, preferably from about 1.8 Pa·s to about 2.4 Pa·s, and more preferably from about 1.9 Pa·s to about 2.2 Pa·s, as measured by a rheometer. Here, as well as elsewhere in the specification and claims, individual range values can be combined to form additional non-disclosed ranges.

Further, and as set forth above, the addition of the succinic anhydride residues to the polymer composition of the present invention reduces their absorbance in the wavelengths used for 3D printing. As will be apparent to those of skill in the art, the absorbance is calculated based on the measured transmittance using the formula:

$$A = -\log(\%T/100\%) \tag{Eq. 1}$$

where the transmittance (T) is the ratio of light that passes through the sample and absorbance (A) is the amount of light not transmitted (i.e. absorbed), relative to a reference standard. A high absorbance at the wavelength where the radical is generated by the photoinitiator reduces the number of available radicals for crosslinkling, resulting in a polymer that does not crosslink or print well.

In various embodiments, the polymer composition of the present invention may have an absorbance at 3D printable wavelengths from about 305 nm to about 405 nm of from about 0.001 to about 0.3, preferably from about 0.001 to about 0.2, and more preferably from about 0.001 to about 0.1, as measured by a UV-Visible spectrometer. In some embodiments, the polymer composition of the present invention may have an absorbance at 3D printable wavelengths from about 305 nm to about 405 nm of from about 0.003 to about 0.3, in other embodiments, from about 0.05 to about 0.3, in other embodiments, from about 0.1 to about 0.3, in other embodiments, from about 0.15 to about 0.3, in other embodiments, from about 0.2 to about 0.3, in other embodiments, from about 0.001 to about 0.25, in other embodiments, from about 0.001 to about 0.2, in other embodiments, from about 0.001 to about 0.1, in other embodiments, from about 0.001 to about 0.01, as measured by a UV-Visible spectrometer. Here, as well as elsewhere in the specification and claims, individual range values can be combined to form additional non-disclosed ranges.

In one or more embodiments, the polymer composition of the present invention may have the formula:

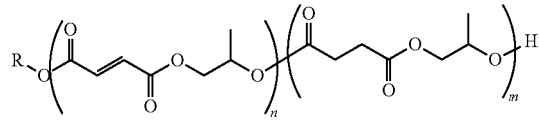

where R is alkyl, alkene, alkyne or aromatic group; n is a mole fraction from about 0.50 to about 0.99 and m is a mole fraction from about 0.01 to about 0.50. In some embodiments, n may be a mole fraction from about 0.50 to about 0.95, in other embodiments, from about 0.50 to about 0.85, in other embodiments, from about 0.50 to about 0.75, in other embodiments, from about 0.50 to about 0.65, in other embodiments, from about 0.50 to about 0.55, in other embodiments, from about 0.60 to about 0.99, in other embodiments, from about 0.70 to about 0.99, in other embodiments, from about 0.80 to about 0.99, in other embodiments, from about 0.90 to about 0.99, and in other embodiments, from about 0.95 to about 0.99. In some embodiments, m may be a mole fraction from about 0.01 to about 0.50, in other embodiments, from about 0.01 to about 0.40, in other embodiments, from about 0.01 to about 0.30, in other embodiments, from about 0.01 to about 0.20, in other embodiments, from about 0.01 to about 0.10, in other embodiments, from about 0.01 to about 0.05, in other embodiments, from about 0.05 to about 0.50, in other embodiments, from about 0.10 to about 0.50, in other embodiments, from about 0.15 to about 0.50, in other embodiments, from about 0.25 to about 0.50, in other embodiments, from about 0.35 to about 0.50, and in other embodiments, from about 0.45 to about 0.50. Here, as well as elsewhere in the specification and claims, individual range values can be combined to form additional non-disclosed ranges.

In one or more embodiments, R may be or comprise a functional group selected from the group consisting of alkyne groups, propargyl groups, allyl groups, alkene groups, 4-dibenzyocyclooctyne groups, cyclooctyne groups, ketone groups, aldehyde groups, tertiary halogen groups, and combinations thereof.

In a second aspect, the present invention is directed to a method of making the PPF-based 3D printable polymer composition described above by reacting maleic anhydride, succinic anhydride, propylene oxide and an initiating alcohol in the presence of a magnesium or other organometallic catalyst to form a poly(propylene maleate-co-succinate) polymer intermediate having a maleic anhydride residue containing a cis double bond, and then isomerizing the cis double bond by reacting the poly(propylene maleate-co-succinate) polymer intermediate to form a poly(propylene fumarate-co-succinate) copolymer.

The initiating alcohol is not particularly limited provided that it has an available hydroxyl functional group and is capable of initiating ring opening copolymerization of a maleic anhydride monomer, a succinic anhydride monomer and a polypropylene oxide monomer, in the presence of a magnesium catalyst. Suitable initiating alcohols may include, without limitation, benzyl alcohol, propargyl alcohol, 4-hydroxybutan-2-one, 5-norbonen-2-ol, butanone, ethyl alcohol, isopropyl alcohol, tertiary butyl alcohol, or a combination thereof. In some embodiments, the initiating alcohol is a primary alcohol. In one more embodiments, the initiating alcohol may include a functional group to permit the addition of bioactive compounds or other useful moieties. Suitable functional groups may include, without limitation, alkyne groups, propargyl groups, allyl groups, alkene groups, 4-dibenzyocyclooctyne groups, cyclooctyne groups, ketone groups, aldehyde groups, tertiary halogen groups, or a combination thereof. As used herein, the terms "bioactive molecule(s)" and "bioactive material(s) are used interchangeably to refer to substances that influence cellular function and may include, without limitation, peptides, carbohydrates, proteins, oligonucleotides and small molecule drugs. The term "other useful moieties" refers to substances other than bioactive materials that provide an added benefit, such as fluorescent and other markers, small molecule dyes, and/or halide atoms. In some of these embodiments, the initiating alcohol may be, without limitation, propargyl alcohol, allyl alcohol, 4-dibenzyocyclooctynol, 4-hydroxybutan-2-one, 3-hydroxypropan-2-one, 5-hydroxypentan-2-one, 6-hydroxyhexan-2-one, 7-hydroxyheptan-2-one, 8-hydroxyoctan-2-one, 5-norbornen-2-ol, α-bromoisobtyryl 4-methanol benzylmethanoate, or a combination thereof. In various embodiments, the magnesium catalyst may be $Mg(BHT)_2(THF)_2$ or $MgEt_2$, but is preferably $Mg(BHT)_2(THF)_2$.

In one or more of these embodiments, the maleic anhydride, succinic anhydride and propylene oxide are combined in a suitable sealed reaction vessel with an initiating alcohol, $Mg(BHT)_2(THF)_2$, and a suitable solvent. One of ordinary skill in the art will be able to select, configure or create a suitable reaction vessel without undue experimentation. In one or more of these embodiments, maleic anhydride and succinic anhydride are combined at a molar ratio of maleic anhydride to succinic anhydride of from about 100:1 to about 1:1, preferably from about 50:1 to about 1:1, and more preferably from about 2:1 to about 1:1. In some embodiments, the molar ratio of maleic anhydride to succinic anhydride from about 25:1 to about 1:1, in other embodiments, from about 10:1 to about 1:1, in other embodiments, from about 8:1 to about 1:1, in other embodiments, from about 6:1 to about 1:1, in other embodiments, from about 4:1 to about 1:1, and in other embodiments, from about 3:1 to about 1:1. Here, as well as elsewhere in the specification and claims, individual range values can be combined to form additional non-disclosed ranges.

As set forth above, the order in which the initiating alcohol, the maleic anhydride, succinic anhydride, propylene oxide and magnesium catalyst are combined has been found to affect color, and with it the absorbance, of the PPF-based 3D printable polymer composition of the present invention. (See FIG. 1) It has been found that bringing the catalyst into contact with either of the anhydride reagents (the maleic anhydride and succinic anhydride) prior to the addition of the initiating alcohol can result in adverse changes in the coordination chemistry of the catalyst, causing a darkening of the PPF-based 3D printable polymer produced thereby. Accordingly, in these embodiments, the alcohol is added to the reaction vessel first, followed by the catalyst, and then the other reagents. In some other embodiments, the catalyst is added to the reaction vessel first, followed by the alcohol, and then the other reagents. The order in which the propylene oxide is added, however, does not appear to have an effect on the absorbance of the polymer.

In these embodiments, the combination is heated until substantially all of the maleic anhydride, succinic anhydride and propylene oxide have reacted to form the poly(propylene maleate-co-succinate) copolymer intermediate. In one or more embodiments, the poly(propylene maleate-co-succinate) copolymer intermediate may have the formula:

cyclooctyne groups, cyclooctyne groups, ketone groups, aldehyde groups, tertiary halogen groups, and combinations thereof.

Suitable solvents for this purpose are not particularly limited provided that the reaction proceeds and may include, without limitation, toluene, pentane, hexane, heptane, octane, THF, or a combination thereof. As will be apparent to those of skill in the art, the degree of polymerization may be controlled by controlling the available moles of initiator and/or the time and temperature of the polymerization reaction. In embodiments where the polymerization reaction is allowed to go to completion (where substantially all of the monomers have been reacted), the degree of polymerization may be controlled by controlling the available moles of initiating alcohol as a function of the total moles of available monomer. In some other embodiments, the degree of polymerization may be controlled by controlling ratio of the moles of initiating alcohol to either the moles of propylene oxide or the total moles of maleic anhydride and succinic anhydride used to form the copolymer.

In one or more of these embodiments, the sealed reaction vessel then is heated to a temperature of from about 40° C. to about 80° C. for from about 1 hours to about 48 hours (or until essentially all of the monomer is consumed) to produce a cis isomer poly(propylene maleate-co-succinate) intermediate of the poly(propylene fumarate-co-succinate) copolymer composition of the present invention. In some embodiments, the sealed reaction vessel is heated to a temperature of from about 40° C. to about 75° C., in other embodiments, from about 40° C. to about 70° C., in other embodiments, from about 40° C. to about 65° C., in other embodiments, from about 40° C. to about 60° C., in other embodiments, from about 50° C. to about 80° C., in other embodiments, from about 55° C. to about 80° C., and in other embodiments, from about 60° C. to about 80° C. In some embodiments, the sealed reaction vessel is heated for from about 1 hours to about 50 hours, in other embodiments, from about 1 hours to about 36 hours, in other embodiments, from about 1 hours to about 30 hours, in other embodiments, from about 1 hours to about 24 hours, in other embodiments, from about 6 hours to about 48 hours, in other embodiments, from about 12 hours to about 48 hours, and in other embodiments, from about 24 hours to about 48 hours. Here, as well as elsewhere in the specification and claims, individual range values can be combined to form additional non-disclosed ranges.

The poly(propylene maleate-co-succinate) copolymer intermediate may then be recovered by any suitable method known in the art for that purpose. In some embodiments, the

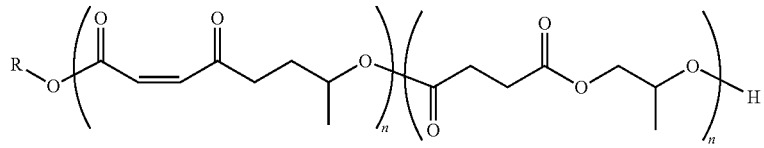

where R is alkyl, alkene, alkyne or aromatic group; n is a mole fraction from about 0.50 to about 0.99 and m is a mole fraction from about 0.01 to about 0.50. In various embodiments, n and m may be any of the mole fractions or range of mole fractions described above. As will be apparent, R will be or comprise the residue of the initiating alcohol. In some embodiments, R may be or comprise a functional group selected from the group consisting of alkyne groups, propargyl groups, allyl groups, alkene groups, 4-dibenzyopoly(propylene maleate-co-succinate) copolymer intermediate may be recovered by precipitation into an excess of a non-solvent for the poly(propylene maleate-co-succinate) copolymer intermediate, such as diethyl ether, isopropyl alcohol, ethyl alcohol, hexane, or a combination thereof.

The recovered poly(propylene maleate-co-succinate) copolymer intermediate is then dried to remove remaining solvent. The poly(propylene maleate-co-succinate) copolymer intermediate may be dried using any suitable method known in the art including, but not limited to vacuum evaporation, air drying, rotary evaporation, or a combination thereof.

As set forth above, the cis double bonds in the maleic anhydride residues of the poly(propylene maleate-co-succinate) copolymer intermediate are next isomerized to arrive at the PPF based copolymer composition described above. As used herein, the terms "isomerize" and "isomerization" refer broadly to the conversion of the cis-isomer (PPM) to its trans-isomer (PPF) form or, in the context of a chemical reaction or process (an "isomerization reaction") to a reaction or process that converts the cis-isomer (PPM) to its trans-isomer (PPF) form. And as set forth above, the terms "isomerized residue of a maleic anhydride monomer," "isomerized residues of maleic anhydride monomer," "isomerized residue of a maleic anhydride" and "isomerized residues of maleic anhydride" specifically refers to one or more residues of the maleic anhydride monomer used to form the PPF-based 3D printable polymer composition of the present invention wherein the double bond has been isomerized from the cis (maleate) configuration to the trans (fumarate) configuration during formation of the poly(propylene fumarate-co-succinate) copolymer from the poly (propylene maleate-co-succinate) copolymer intermediate, as described below. While the isomerization of the poly (propylene maleate-co-succinate) copolymer intermediate does result in some other changes to the polymer, it should be understood that most general characteristics of the PPF-based 3D printable polymer composition of the present invention, such as the approximate $M_n$, $Đ_m$, and $T_g$ ranges, are determined in the initial ROCOP reaction and do not change during the isomerization reaction.

In one or more of these embodiments, the poly(propylene maleate-co-succinate) copolymer intermediate is first dissolved in a suitable organic solvent. Suitable solvents for this purpose are not particularly limited provided that the reaction proceeds and may include, without limitation, chloroform, dichloromethane or a combination thereof. In one or more embodiments, the poly(propylene maleate-co-succinate) copolymer intermediate is dissolved in chloroform. Next, a quantity of an organic base, such as diethylamine, trimethylamine, or pyridine is added to the solution and it is heated to reflux temperature under an inert atmosphere to produce the poly(propylene fumarate-co-succinate) copolymer of the present invention.

In some of these embodiments, the solution is heated it to a reflux temperature under an inert atmosphere for from about 1 to about 48 hours (or until substantially all of poly(propylene maleate-co-succinate) copolymer intermediate has isomerized) to produce the poly(propylene fumarate-co-succinate) copolymer of the present invention. In some embodiments, the solution is refluxed for from about 1 hours to about 36 hours, in other embodiments, from about 1 hours to about 30 hours, in other embodiments, from about 1 hours to about 24 hours, in other embodiments, from about 6 hours to about 48 hours, in other embodiments, from about 12 hours to about 48 hours, in other embodiments, from about 18 hours to about 48 hours, in other embodiments, from about 24 hours to about 48 hours, and in other embodiments, from about 36 hours to about 48 hours to produce the poly(propylene fumarate-co-succinate) copolymer of the present invention.

Finally, the poly(propylene fumarate-co-succinate) copolymer composition of the present invention may be washed with a buffer solution, such as a phosphate buffer solution, to remove residual monomer and amine and then dried to recover the poly(propylene fumarate-co-succinate) copolymer of the present invention. In one or more embodiments, the poly(propylene fumarate-co-succinate) copolymer composition of the present invention may be washed with a phosphate buffer solution and then dried by vacuum evaporation. The poly(propylene fumarate-co-succinate) copolymer may be purified by any suitable method known in the art for that purpose. In some of these embodiments, the poly (propylene fumarate-co-succinate) copolymer is purified by repeated washing in an excess of phosphate buffer saline solution or a suitable acid solution, combining the organic layers, and drying the resulting polymer in vacuo to produce the purified polymer.

EXPERIMENTAL

In order to evaluate and further reduce them to practice, the poly(propylene fumarate-co-succinate) copolymers of the present invention were synthesized and characterized as follows.

Materials

All materials were purchased from Millipore-Sigma and used are received unless noted below. $Mg(BHT)_2(THF)_2$ was synthesized using a modified preparation. (See, e.g., WO 2018/142384 and WO 2018/144849, and the disclosures of which are incorporated herein by reference in their entirety.) All solvents were purchased from Fisher and dried using an Pure Solv MD-3 solvent purification system (Innovative Technology Inc.) and degassed prior to use. Benzyl alcohol and propargyl alcohol were distilled over calcium hydride and degassed. Maleic anhydride was sublimated and dried in vacuo over $P_2O_5$ for one week. Succinic anhydride was dried in vacuo over $P_2O_5$ for one week.

Instrumental Methods

Proton $^1H$ nuclear magnetic resonance (NMR) spectra were recorded using a Varian Mercury 300 spectrometer. Carbon $^{13}C$ NMR spectra were recorded using a Varian NMRS 500 spectrometer. All chemical shifts were recorded in parts per million (ppm) relative to the reference peak of chloroform solvent at δ=7.26 and 77.16 ppm for $^1H$ and $^{13}C$ spectra, respectively. Molecular masses were determined through size exclusion chromatography (SEC) using a Tosho EcoSec HLC-8320 GPC on TSKgel SuperMultiporeHZ-M columns in series with refractive index (RI) detector. Molecular masses were calculated using a calibration curve determined from poly(styrene) standards with tetrahydrofuran (THF) as the eluent flowing at 1.0 mL min$^{-1}$ and a sample concentration of 10.0 mg mL$^{-1}$.

MALDI-ToF mass spectra were recorded on a Bruker Ultra-Flex III MALDI-ToF/ToF mass spectrometer equipped with a Nd:YAG laser emitting at 355 nm. The instrument was operated in positive ion mode. All samples were dissolved in THF at a final concentration of 10 mg mL$^{-1}$. Trans-2-[3-(4-tert-butylphenyl)-2-methyl-2-propenylidene]malononitrile (DCTB) (20 mg mL-1) served as a matrix and sodium trifluoroacetate (NaTFA) (10 mg mL-1) as cationizing agent were prepared and mixed in the ratio 10:1. Matrix and sample solutions were applied onto the MALDI-ToF target plate by the sandwich method. FlexAnalysis software was used to analyze MALDI-ToF data.

General Synthesis of Cis-Copolymer
[Poly(Propylene Maleate-Co-Propylene Succinate)]

In a glovebox, 2.524 g (25.7 mmol) of maleic anhydride, 0.286 g (2.86 mmol) of succinic anhydride, 2.00 mL (28.6 mmol) of propylene oxide, 330 L (2.86 mmol) of propargyl alcohol as a initiator, 0.175 g (0.286 mmol) of Mg(BHT)$_2$(THF)$_2$ as a catalyst and 8.2 mL of toluene were placed in a Schlenk tube. The Schlenk tube was sealed with a PTFE plug and removed from the glovebox and heated to 80° C. in a preheated aluminum block for 24 h. After the designated reaction time, the mixture was quenched with 4 mL of chloroform and precipitated with excess amount of diethyl ether. The copolymer (3.60 g; 80.5%) was recovered after vacuum drying. $^1$H NMR (300 MHz, 298 K, CDCl$_3$): δ=6.40-6.16 (m, 25.7H, C=OCHCHC=O), 5.34-5.05 (m, 12.5H, CH$_2$CHCH$_3$O), 4.80-4.74 (m, 2H, CCH$_2$O), 4.37-3.89 (m, 27.8H, OCH$_2$CHCH$_3$), 2.77-2.54 (m, 3.5H, OCH2CHCH3), 2.54-2.49 (m, 0.8H, CHC), 1.40-1.08 (m, 42.9, CHCH$_3$) ppm.

General Isomerization Procedure of Cis-Copolymer to Trans-Copolymer [Poly(Propylene Fumarate-Co-Propylene Succinate)]

To the solution of 3.00 g of poly(propylene maleate-co-propylene succinate) that were dissolved in 20 mL of chloroform, 300 L (2.9 mmol) of diethyl amine was added and refluxed for 18 h under nitrogen atmosphere. The organic layer was washed with a 1M aqueous potassium phosphate solution (pH 6) and the polymer was recovered by vacuum drying. $^1$H NMR (300 MHz, 298 K, CDCl$_3$): δ=6.97-6.78 (m, 19.6H, C=OCHCHC=O), 5.39-5.05 (m, 11.6H, CH$_2$CHCH$_3$O), 4.82 (d, 2.0H, CCH$_2$O), 4.45-4.00 (m, 24.8H, OCH$_2$CHCH$_3$), 2.58-2.49 (s, 1.2H, CHC), 1.40-1.03 (m, 40.0, CHCH$_3$) ppm.

3D Printing Fabrication

The specimens for tensile testing were fabricated using an EnvisionTEC (Dearborn, MI) Perfactory 3 printer (λ=405 nm). The design files were created using SolidWorks software (Dassault Systems SolidWorks Corp., Waltham, MA). For tensile measurements, ASTM D360 type V tensile bars were printed with half sized x, y, z dimensions. The 3D printing resins were produced according to previously reported formula of photo initiators and light scattering agents (4.1 wt. %) with modification in the mixing ratio of copolymer and DEF. (See, Luo, Y.; Dolder, C. K.; Walker, J. M.; Mishra, R.; Dean, D.; Becker, M. L. Synthesis and Biological Evaluation of Well-Defined Poly(Propylene Fumarate) Oligomers and Their Use in 3D Printed Scaffolds. *Biomacromolecules* 2016, 17 (2), 690-697, the disclosure of which is incorporated herein by reference in its entirety.) After 3D printing, the tensile bars were briefly washed sequentially with isopropyl alcohol, a mixture of 50 wt. % acetone and deionized water and acetone, dried in air for 30 minutes and then post-cured for one hour in UV oven (λ=390-420 nm).

The viscosity of the resin formulations was measured at 50-70 wt % polymer in diethyl fumarate (DEF) solution using an AERS-G2 rheometer. The premixed resin was placed on parallel plates (25 mm diameter) using a 1 mm gap and data was collected via a frequency sweep ranging from 0.05 rad s$^{-1}$ to 100 rad s$^{-1}$ at 10% strain while maintaining temperature at 25° C. Due to the fluctuation of data in low frequency, data from 3.15 rad s$^{-1}$ to 100 rad s$^{-1}$ was collected and the intercept of the regression curve was chosen as a representative viscosity of the resin formulation.

The mechanical properties measurements were conducted using Instron 5567 Series Universal Testing System. The force was measured with 10 kN load cell at 5 mm min$^{-1}$ crosshead speed at room temperature. The elastic modulus was determined from the slope of the initial linear region. The values reported were obtained from the average of three measurements.

The swelling ratio of 3D printed product was measured using modified method of previous method. (See, Fisher, J. P.; Dean, D.; Mikos, A. G. Photocrosslinking Characteristics and Mechanical Properties of Diethyl Fumarate/Poly(Propylene Fumarate) Biomaterials. *Biomaterials* 2002, 23(22), 4333-4343, the disclosure of which is incorporated herein by reference in its entirety.) The tensile bars were placed into the 20 mL scintillation vial and immersed in 15 mL of toluene. After 48 hours, the samples were weighted ($W_s$) after wiping out the toluene on the surface. The weight of dried sample ($W_d$) is measured after 72 hours drying under vacuum. The swelling ration was calculated by the formula:

$$\text{Swelling ratio} = \frac{ws - wd}{ws} \quad \text{(Eq. 2)}$$

Results and Discussions

Figure 2A:
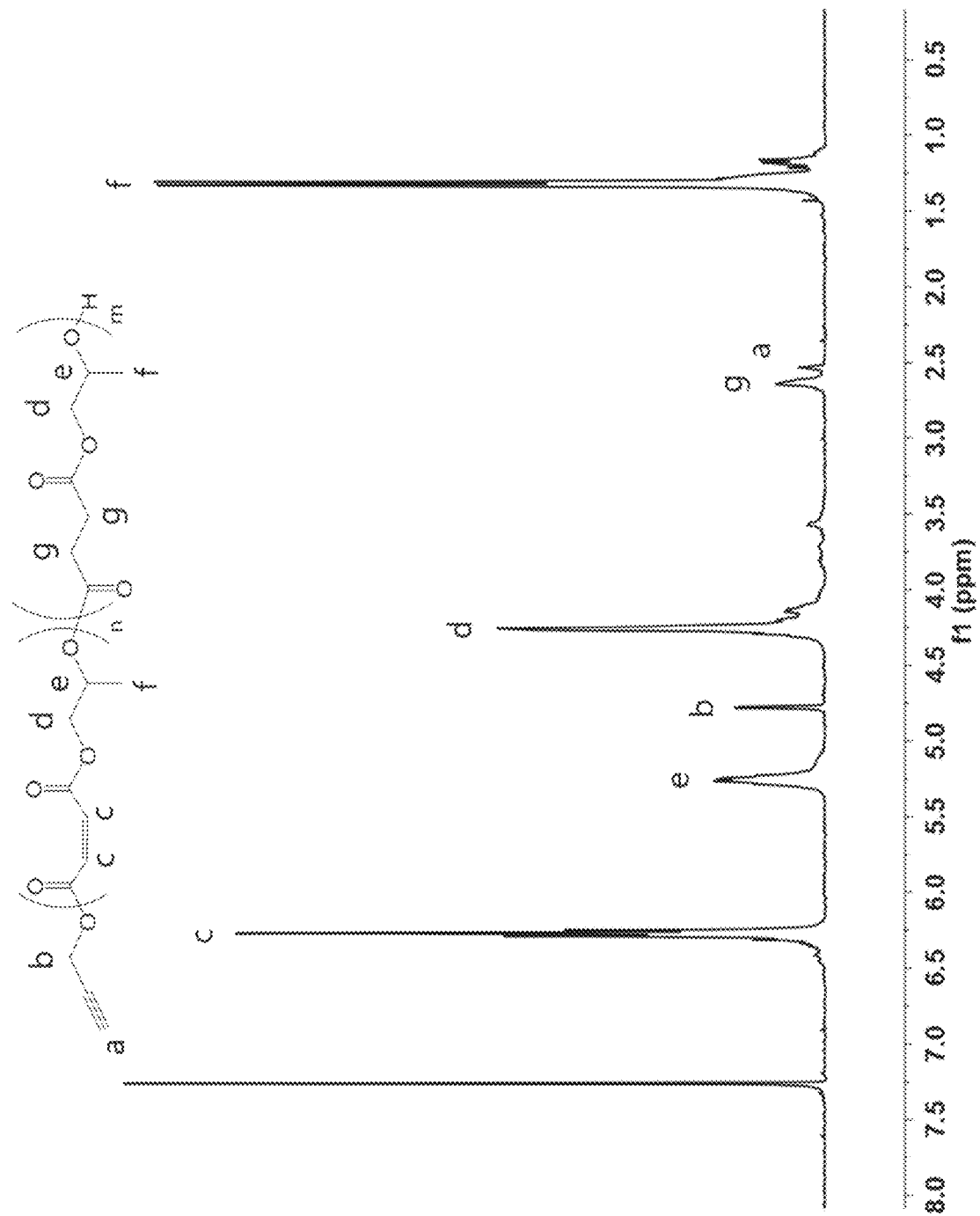
FIGS. 2A-C are a $^1$H NMR spectrum of poly(propylene maleate-co-propylene succinate) with 10 mol % succinate and a degree of polymerization (DP) of 10 initiated with propargyl alcohol (300 MHz, 303 K, CHCl$_3$) (FIG. 2A); a $^1$H NMR spectrum of the corresponding poly(propylene fumarate-co-propylene succinate) following isomerization (FIG. 2B); and a Diffusion Ordered Spectroscopy (DOSY) NMR (500 MHz, 303 K, CHCl$_3$) spectrum of poly(propylene maleate-co-propylene succinate) indicating single diffusing species without homopolymer contamination (FIG. 2C)

The ROCOP of maleic anhydride, succinic anhydride and propylene oxide was investigated at 7M concentration in toluene with Mg(BHT)$_2$(THF)$_2$ as a catalyst and benzyl alcohol or propargyl alcohol as a initiator at 80° C. After 24 hours, the reaction mixture was precipitated into diethyl ether and the resulting cis-copolymer (poly(propylene maleate-co-propylene succinate)) (PPMPS) was isomerized using a catalytic amount of diethyl amine in chloroform (See, Scheme 1). The independent ROCOP of anhydrides and propylene oxide has been reported previously. However, this is the first attempt to use two different anhydrides in a one pot reaction. $^1$H NMR spectroscopic analysis of PPMPS showed proton resonance peaks at 6=6.27 and 2.64 ppm, corresponding to cis alkene protons of the maleate unit and methylene protons of the succinate unit, respectively. Resonance peaks at 6=4.78 and 2.53 correspond to the methylene and alkyne protons on initiator propargyl alcohol, respectively (FIG. 2A). The preference of alternating copolymerization of anhydrides and propylene oxide was confirmed by the lack of significant numbers of proton resonances corresponding to the homopolymerization of propylene oxide (6=3.3-3.5), which were noted in previous studies. (See, e.g., Wilson, J. A.; Luong, D.; Kleinfehn, A. P.; Sallam, S.; Wesdemiotis, C.; Becker, M. L. Magnesium Catalyzed Polymerization of End Functionalized Poly(Propylene Maleate) and Poly(Propylene Fumarate) for 3D Printing of Bioactive Scaffolds. *J. Am. Chem. Soc.* 2018, 140 (1), 277-284, the disclosure of which is incorporated herein by reference in its entirety.)

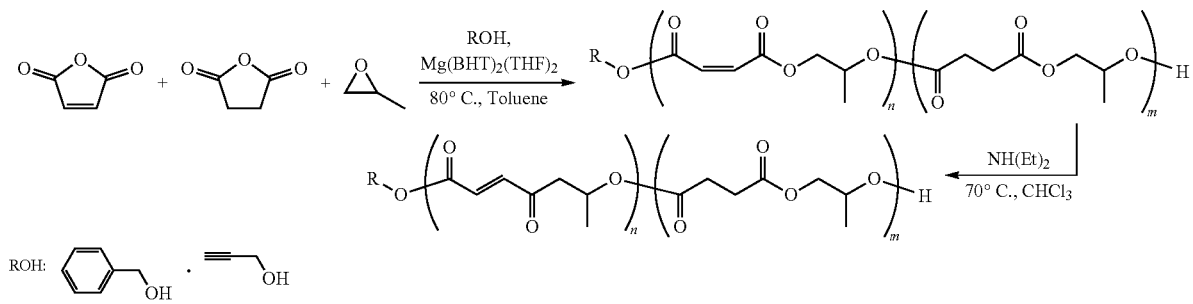

Figure 3:
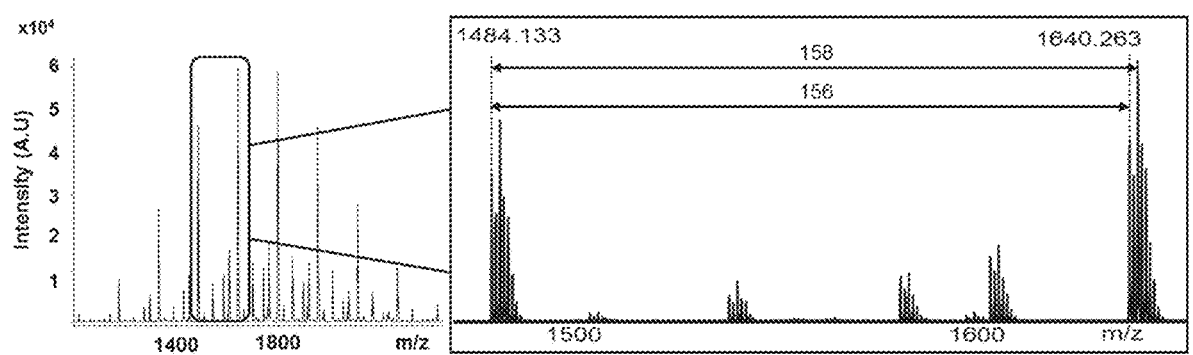
FIG. 3 is a of MALDI-ToF MS spectrum for the cis-copolymer (poly(propylene maleate-co-propylene succinate) polymer intermediate with an insert enlarging the area from about 1450 Da to about 1700 Da showing an observed mass of 156 Da between two adjacent peaks that revealed that the major repeat unit was propylene maleate and a highest peak that is 2 Da from the initial monoisotopic mass, which indicates a repeating unit 158 Da that corresponds to propylene succinate unit is present in polymer chain.
Figure 4:
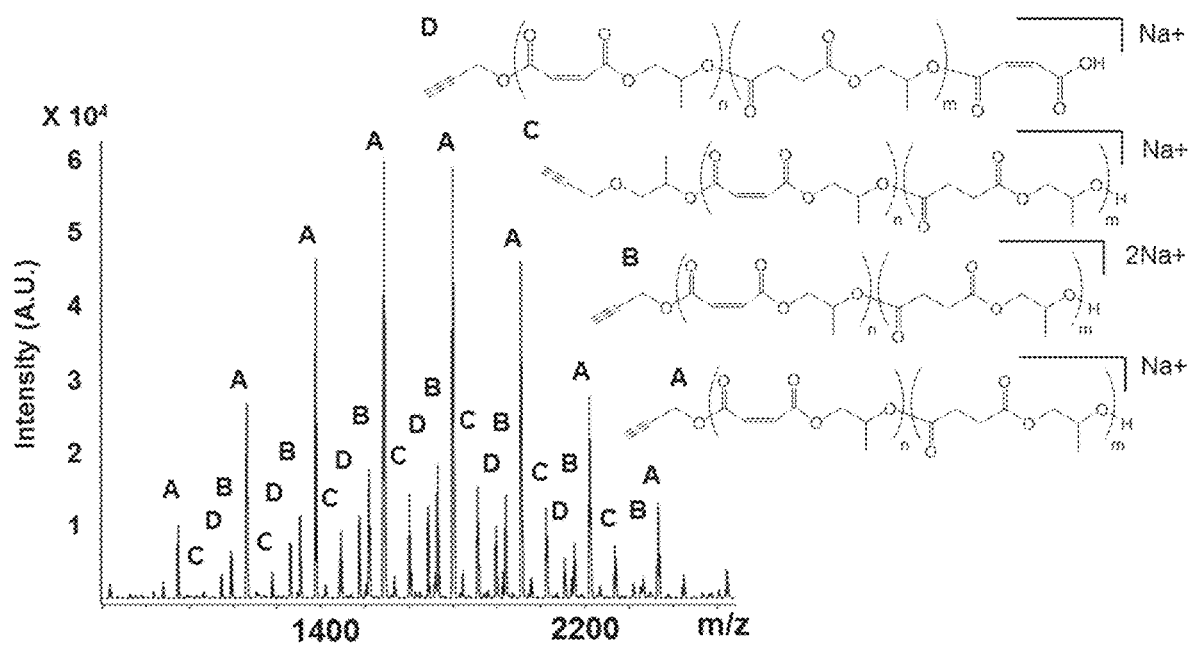
FIG. 4 is a matrix-assisted laser desorption/ionization time-of-flight mass spectrometry (MALDI-ToF MS) plot of propargyl alcohol initiated poly(propylene maleate-co-propylene succinate) of DP 10 with 10 mol % succinate.

Matrix-assisted laser desorption/ionization time-of-flight mass spectroscopy (MALDI-ToF MS) was performed to confirm the end-group and structure of polymer. The observed mass of 156 Da between two adjacent peaks revealed that the major repeat unit was propylene maleate. The magnification of one of these intensities showed that an addition of 2 Da from the initial monoisotopic mass to the next monoisotopic mass, which indicates a singular incorporation of succinate unit in the polymer chain (FIG. 3). There were several distributions in the polymer chain that coincided with the expectation of an alternating copolymerization system, which are attributed to full polymeric repeating units or a half polymeric repeating units (i.e., one extra maleic anhydride or propylene oxide incorporated in the chain end). End group analysis showed that the polymer chains were initiated with alcohol initiator (FIG. 4). FIG. 5 is a MALDI-ToF MS plot of propargyl alcohol initiated poly(propylene maleate-co-propylene succinate) of DP 10 with 10 mol % succinate. These analysis results supported that the intended copolymer was synthesized successfully.

The monomer conversions were determined using $^1$H NMR spectroscopy through integration of the monomeric anhydride resonances in crude reaction mixture. The conversions of maleic anhydride were higher than those of succinic anhydride, which were consistent with $^1$H NMR spectroscopic analysis of the polymer after purification that showed lower succinate percentage compared with the maleate. The molecular masses of the polymers calculated based on $^1$H NMR spectra were close to the targeted values regardless of the molar ratios of anhydrides, which demonstrates a high degree of control over the polymerization (Table 1).

TABLE 1

Properties of poly (propylene maleate-co-propylene succinate) polymers produced using Mg(BHT)$_2$(THF)$_2$ as a catalyst with different alcohol initiators, target DPs and succinate content.[a]

| Entry | [MAn]:[SAn]:[I]:[Cat.] | Initiator | MAn conv. (%)[b] | SAn conv. (%)[b] | Actual [MAn]:[SAn][c] | $M_n$ (kDa)[c] | $M_n$ (kDa)[d] | $Đ_M$[d] |
|---|---|---|---|---|---|---|---|---|
| 1 | 100:0:5:1 | Benzyl alcohol | >99 | — | 100:0 | 4.0 | 2.9 | 1.40 |
| 2 | 95:5:5:1 | Benzyl alcohol | 98 | 63 | 97:3 | 3.9 | 2.6 | 1.36 |
| 3 | 90:10:5:1 | Benzyl alcohol | >99 | 78 | 94:6 | 3.7 | 2.5 | 1.36 |
| 4 | 80:20:5:1 | Benzyl alcohol | >99 | 71 | 89:11 | 3.7 | 2.4 | 1.36 |
| 5 | 70:30:5:1 | Benzyl alcohol | 95 | 91 | 77:23 | 3.7 | 2.6 | 1.42 |
| 6 | 50:50:5:1 | Propargyl alcohol | 99 | 98 | 58:42 | 3.5 | 2.4 | 1.77 |
| 7 | 0:100:5:1 | Propargyl alcohol | — | 97 | 0:100 | 4.5 | 1.9 | 1.39 |
| 8 | 90:10:10:1 | Benzyl alcohol | >99 | >99 | 94:6 | 2.3 | 1.6 | 1.35 |
| 9 | 80:20:10:1 | Benzyl alcohol | >99 | 98 | 84:16 | 1.7 | 1.6 | 1.25 |
| 10 | 90:10:10:1 | Propargyl alcohol | >99 | 97 | 94:6 | 2.0 | 1.6 | 1.37 |
| 11 | 80:20:10:1 | Propargyl alcohol | >99 | 95 | 86:14 | 1.8 | 1.8 | 1.27 |

[a][Anhydride] = [PO] = 3.5M in toluene, Temp$_{rxn}$ = 80° C., T$_{rxn}$ = 24 h, Cat. = Mg(BHT)$_2$(THF)$_2$.
[b]Determined by $^1$H NMR spectroscopy of crude reaction mixture.
[c]Determined by end-group analysis of $^1$H NMR spectroscopy of final reaction product.
[d]Determined by SEC in THF against poly(styrene) standards.

Figure 5A:
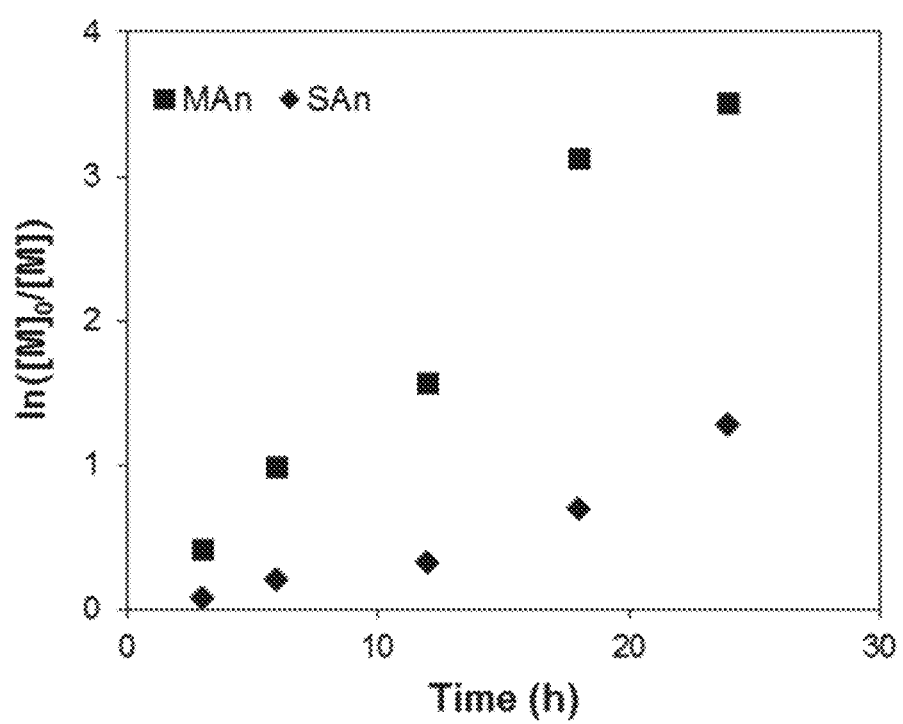
FIGS. 5A-B are a kinetic plot for the copolymerization of maleic anhydride, succinic anhydride and propylene oxide, conducted at 80° C. in toluene with [MAn]$_0$: [SAn]$_0$:[PO]$_0$: [PA]$_0$: [Cat]$_0$=80:20:100:10:1, total monomer concentration=7 M (FIG. 5A) and a graph showing changes in number-average molecular mass (M$_n$) and Đ$_M$ over increasing monomer conversion for the same copolymerization, determined by SEC against poly(styrene) standards (FIG. 5B)
Figure 5B:
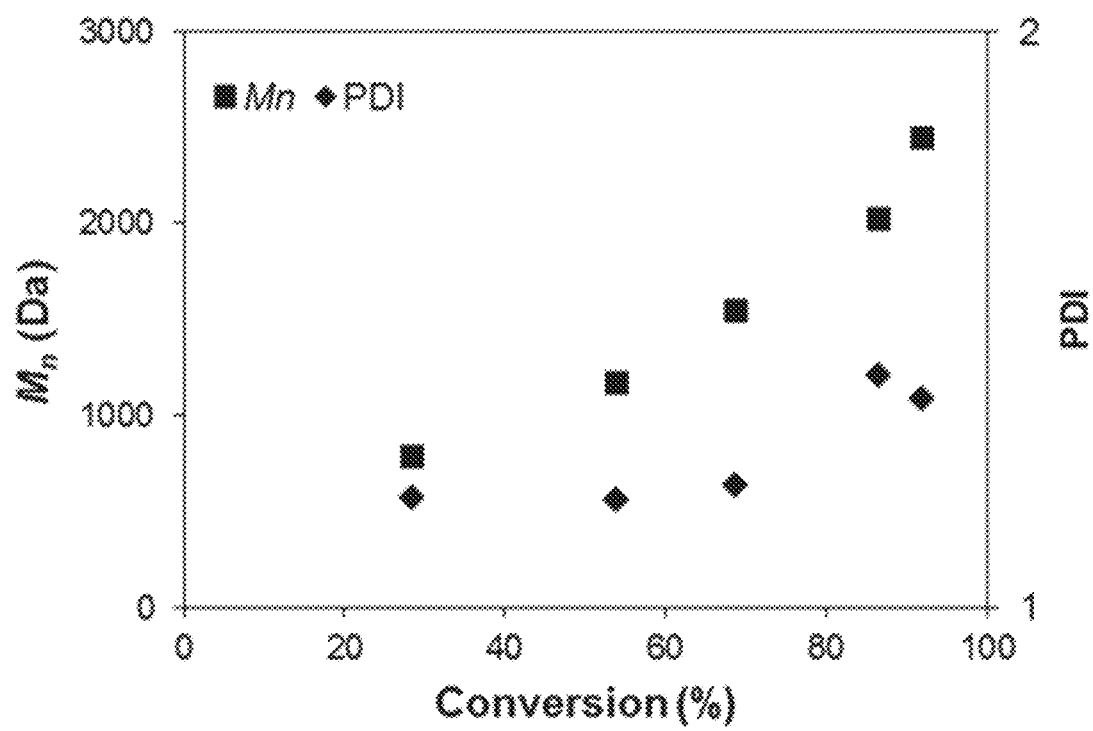

To understand the structure of resulting copolymer further, a kinetic study of 4:1 ratio of maleic anhydride and succinic anhydride composition was conducted with a targeted degree of polymerization (DP) of 10. The conversion of anhydrides was pseudo-first order, indicating the controlled character of copolymerization. The slope of the first order monomer conversion versus time for maleic anhydride was higher than that of succinic anhydrides, demonstrating the incorporation of maleic anhydride into polymer chain was faster than that of succinic anhydride (FIG. 5A). Accordingly, the composition of maleate repeat units in the polymer chain was higher than the succinate composition (Table 2). These results suggested that the sequencing of the resulting copolymer was a gradient copolymer in nature rather than a random copolymer, wherein the polymer chain has higher maleate content at the beginning of the reaction and succinate content increased toward the end of the reaction. Molecular mass growth over monomer conversion was pseudo-linear with a maintained low $Đ_M$ further enforcing the ability of for controlled copolymerization in line with previous studies (FIG. 5B).

TABLE 2

Kinetic study data of DP10, 20% succinic anhydride reaction

| | Anhydride | Time (h) | | | | |
|---|---|---|---|---|---|---|
| | | 3 | 6 | 12 | 18 | 24 |
| Conversion (%) | MAn | 33.9 | 62.8 | 79 | 95.6 | 97 |
| | SAn | 7.1 | 18.9 | 27.6 | 50 | 71.9 |
| Mole fraction in copolymer (%) | MAn | 95.0 | 94.4 | 92.4 | 90.7 | 89.2 |
| | SAn | 5.0 | 5.6 | 7.6 | 9.3 | 10.8 |

Figure 2B:
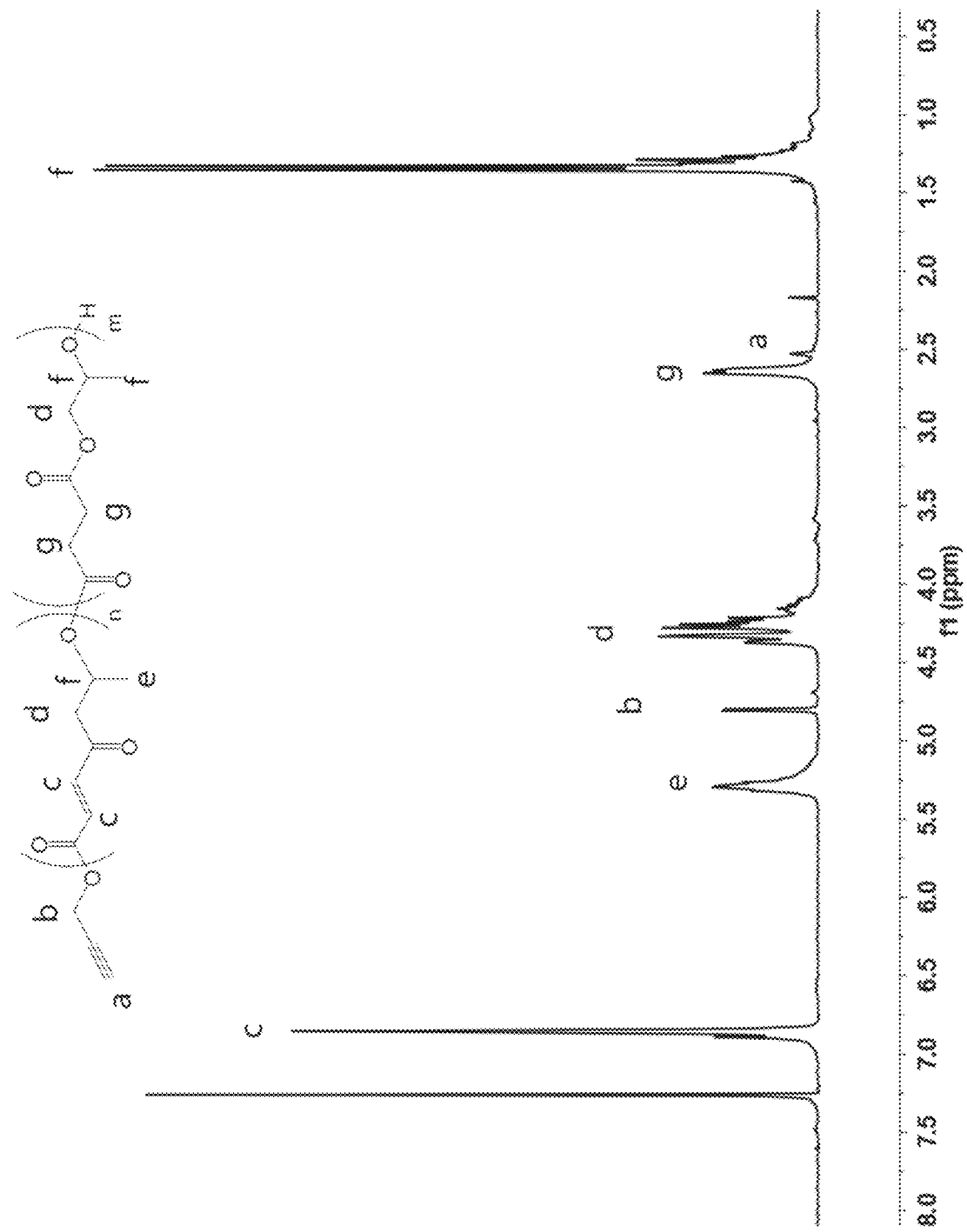
Figure 2C:
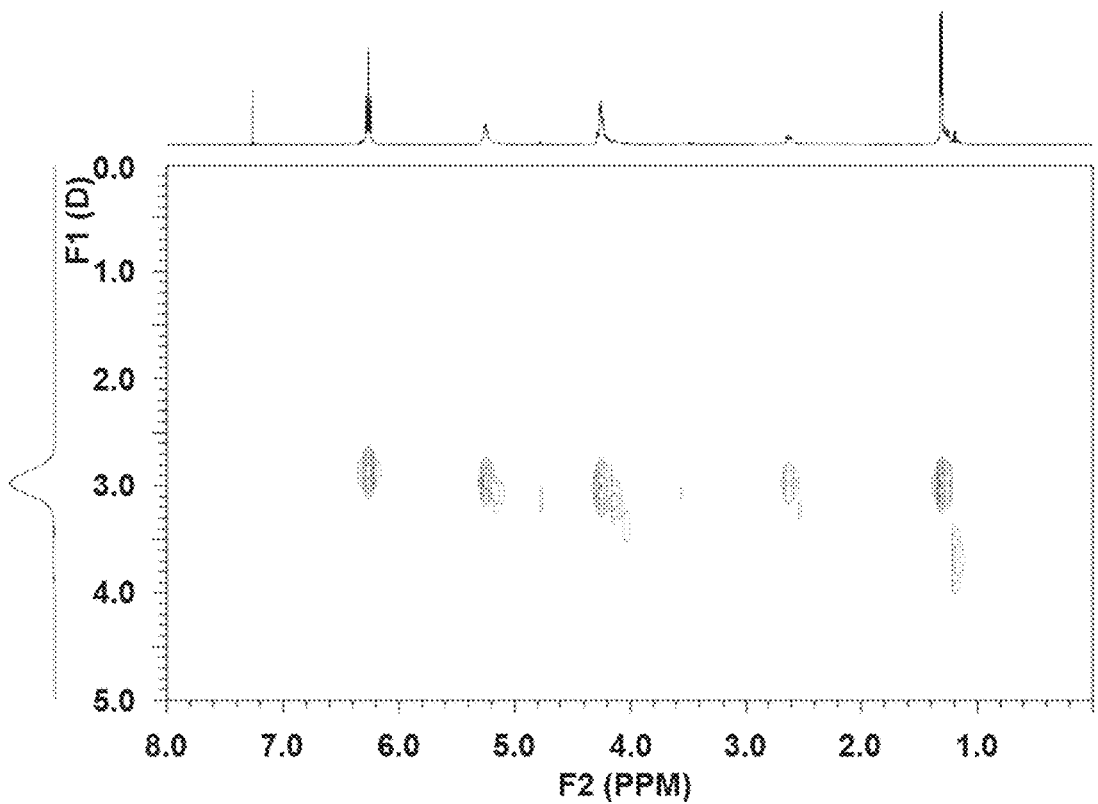
Figure 6:
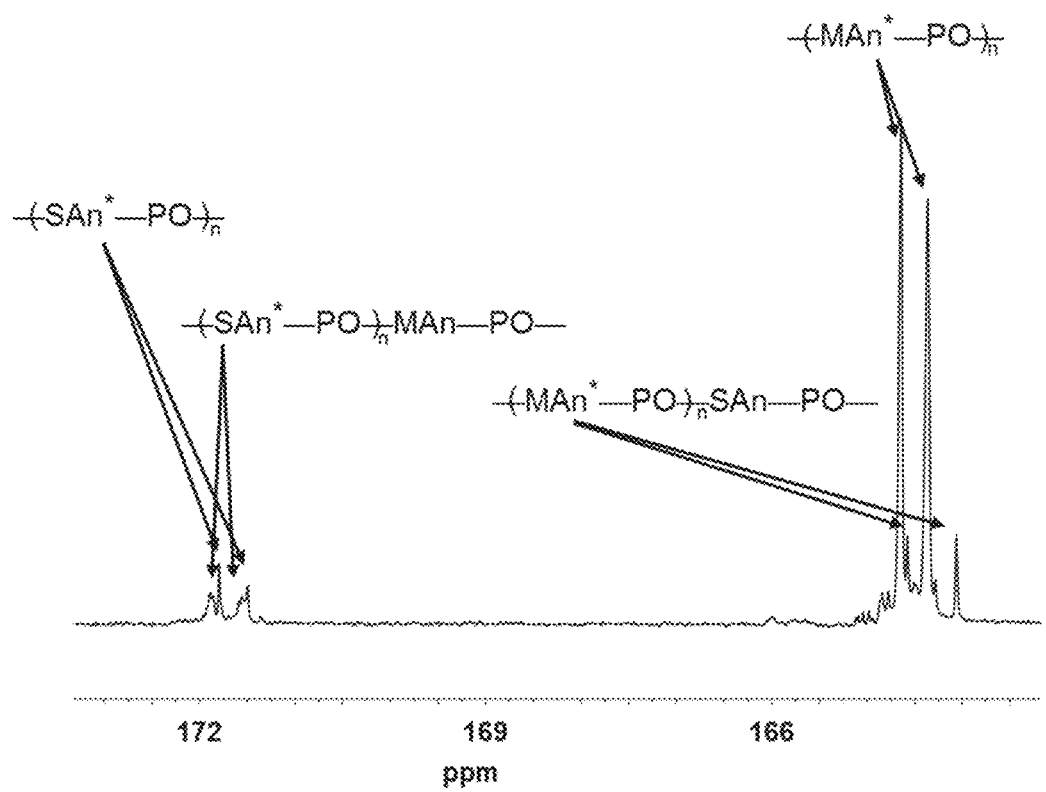
FIG. 6 is a quantitative $^{13}$C NMR of DP10 20% copolymer.

The diffusion ordered NMR spectroscopy (DOSY-NMR) shows one dominant distribution, indicating one polymer species as opposed to individual polymer chains from each anhydride polymerized (FIG. 2C). The $^{13}$C NMR spectra showed that the resonance peaks corresponding to the carbonyl units of anhydrides are split to several peaks, rather than two peaks in the case of block or separated chain copolymers confirming that both anhydrides are incorporated in the polymer (FIG. 6).

Figure 7:
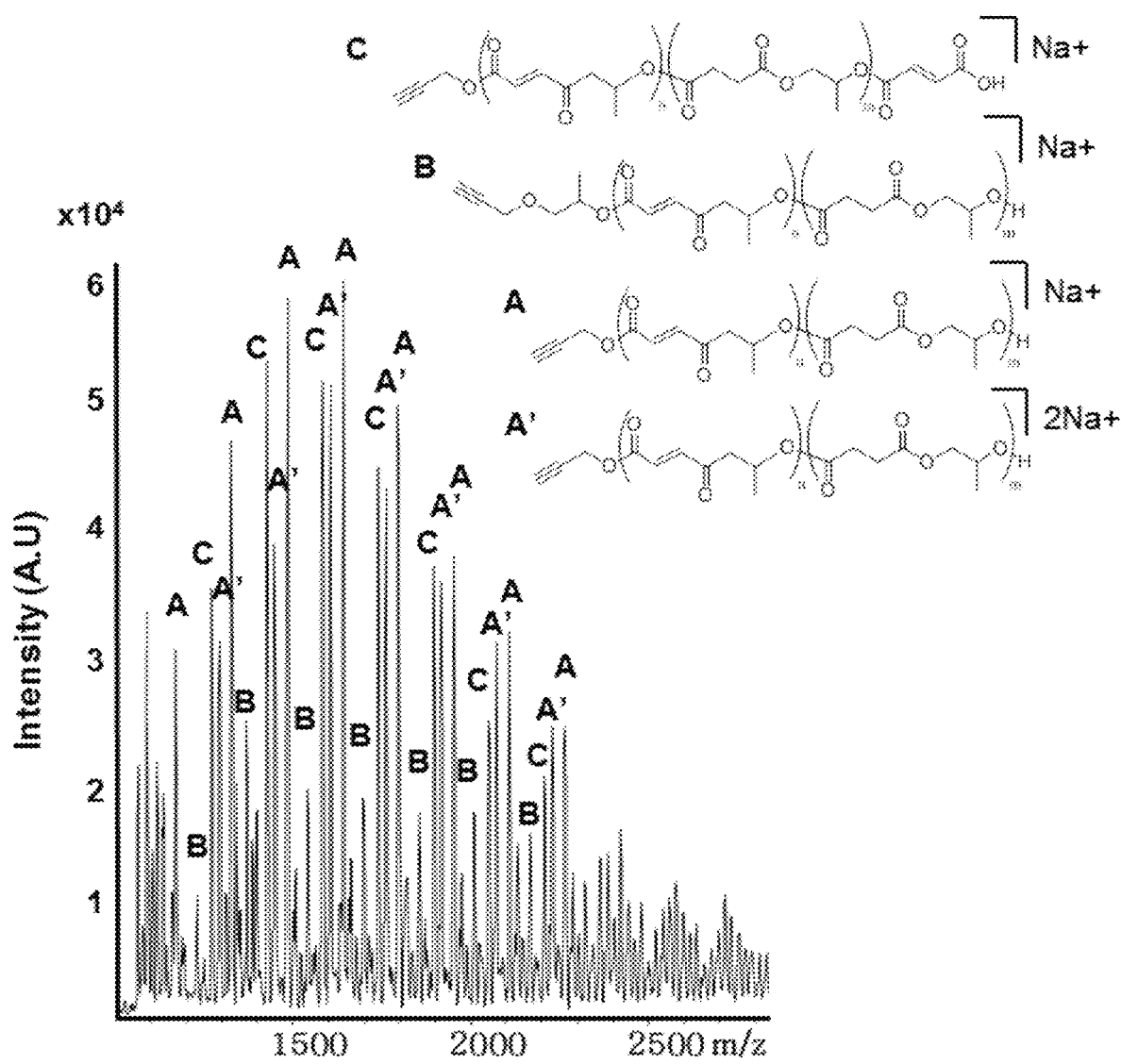
FIG. 7 MALDI-ToF MS of the trans-copolymer.

The proton resonance peak at δ=6.27 ppm attributed to the cis-alkene proton environments of the maleate repeat units disappeared and a new proton resonance peak at δ=6.85 ppm corresponding to the trans-alkene proton environments of the fumarate units appeared, demonstrating complete isomerization of cis-copolymer to trans-copolymer (FIG. 2B). MALDI-ToF MS data showed that sequence and end group fidelity of the copolymer are maintained after isomerization reaction (FIG. 7). Considering all data, maleic anhydride and succinic anhydride units are incorporated into one polymer species and the sequence of the polymer is a gradient copolymer composed of propylene fumarate repeat units and followed by propylene succinate repeat units with retained end-group fidelity.

Figure 8A:
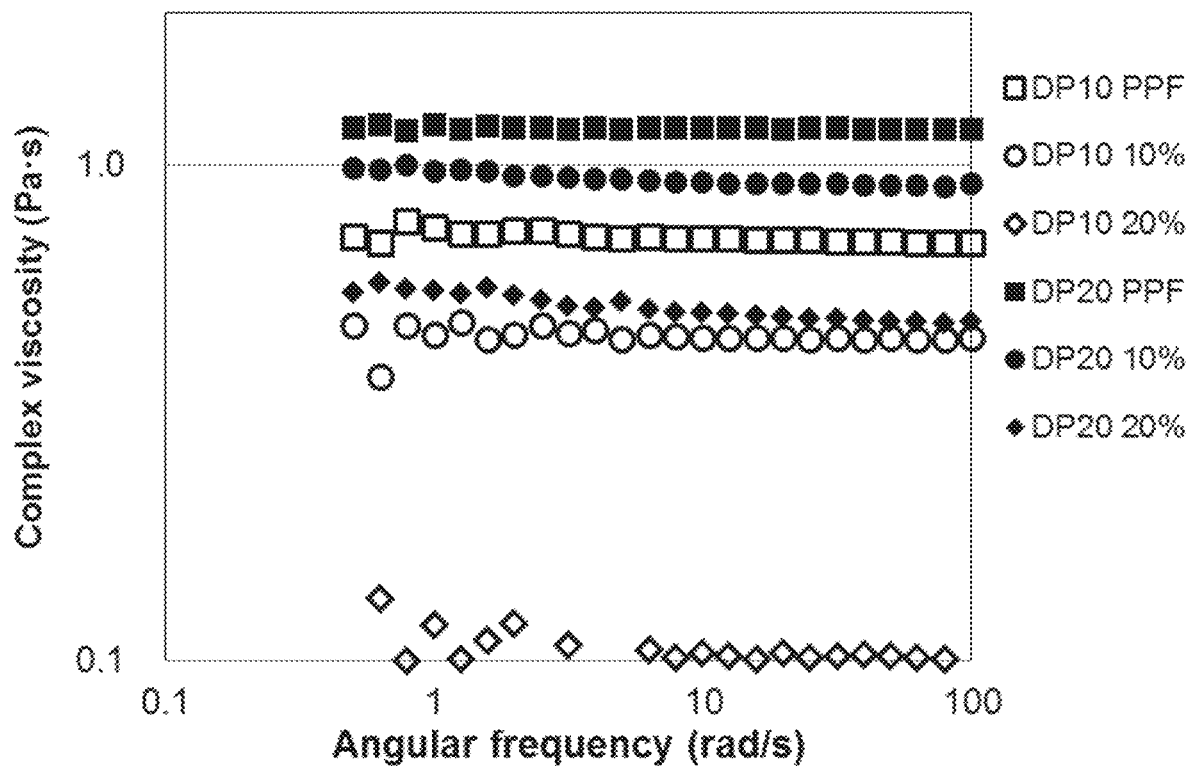
FIGS. 8A-B are a plot showing complex viscosity data for poly(propylene fumarate) resins (50 wt % DEF) possessing a degree of polymerization of 10 (open symbols) and 20 (solid symbols) repeat units without succinate (squares) and with approximately 10 (circles) and 20 mole (diamonds) percent succinate incorporation, respectively (FIG. 8A) and a plot showing viscosity of uncrosslinked resin formulations possessing different polymer/DEF weight ratios at 25° C.
Figure 8B:
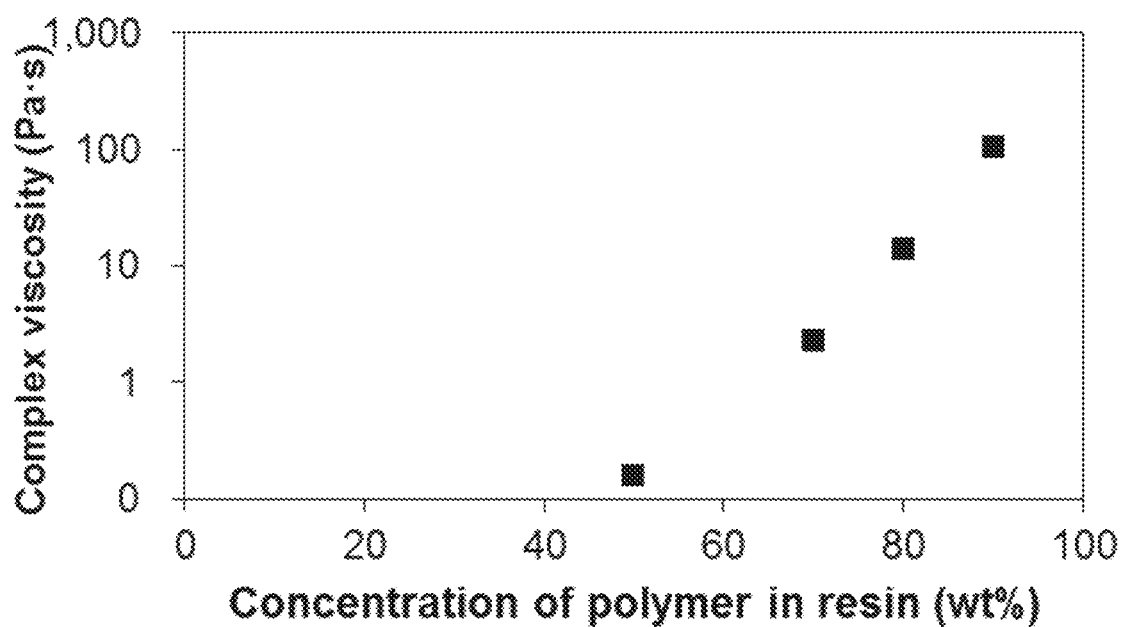
Figure 9:
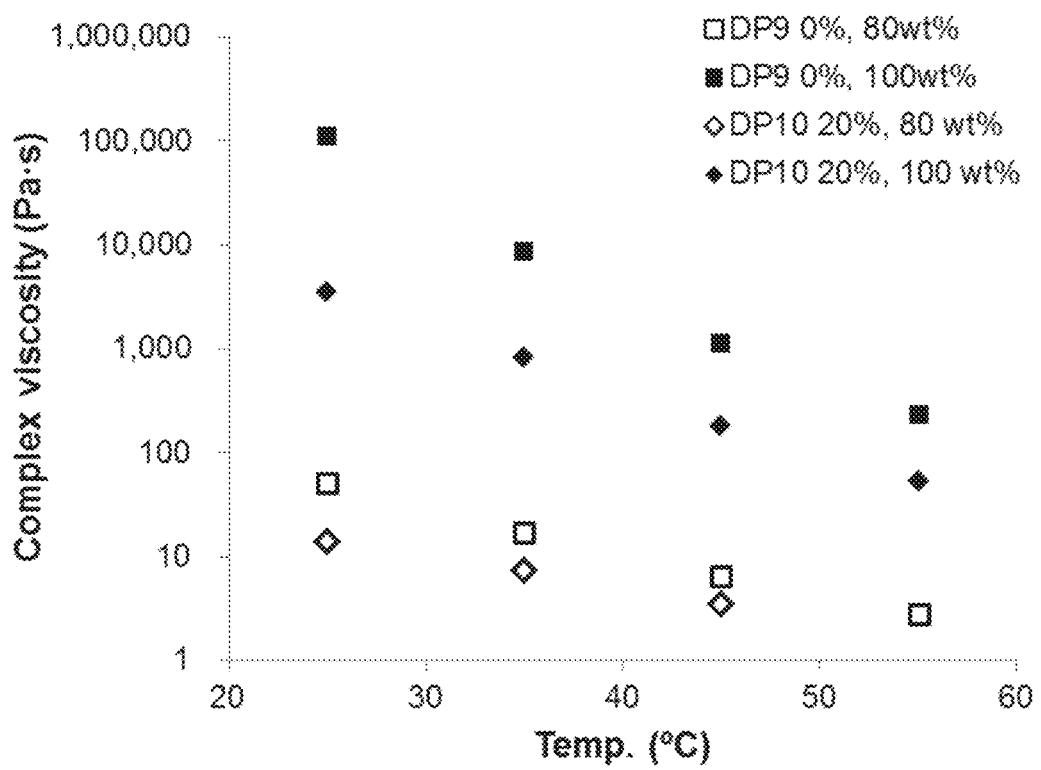
FIG. 9 is a graph showing complex viscosity data of 80 wt % and 100 wt % of poly(propylene fumarate) resins without succinate (square) and 20 mole (diamond) percent succinate incorporation at different temperature.

In order to investigate the effect of copolymerization on the rheological properties of the copolymer, complex viscosity measurements were on the various poly(propylene fumarate) and poly(propylene fumarate-co-succinate) resin formulations (50 wt % DEF) at 25° C. In previous studies, resin formulations containing 1000 to 2500 Da PPF in 50 wt % DEF solutions were used for photochemical 3D printing. (See, e.g., Luo, Y.; Dolder, C. K.; Walker, J. M.; Mishra, R.; Dean, D.; Becker, M. L. Synthesis and Biological Evaluation of Well-Defined Poly(Propylene Fumarate) Oligomers and Their Use in 3D Printed Scaffolds. *Biomacromolecules* 2016, 17 (2), 690-697; Wilson, J. A.; Luong, D.; Kleinfehn, A. P.; Sallam, S.; Wesdemiotis, C.; Becker, M. L. Magnesium Catalyzed Polymerization of End Functionalized Poly (Propylene Maleate) and Poly(Propylene Fumarate) for 3D Printing of Bioactive Scaffolds. *J. Am. Chem. Soc.* 2018, 140 (1), 277-284; and Walker, J. M.; Bodamer, E.; Krebs, O.; Luo, Y.; Kleinfehn, A.; Becker, M. L.; Dean, D. Effect of Chemical and Physical Properties on the In Vitro Degradation of 3D Printed High Resolution Poly(Propylene Fumarate) Scaffolds. *Biomacromolecules* 2017, 18 (4), 1419-1425, the disclosures of which are incorporated herein by reference in their entirety.) Therefore resins containing DP 10 (1500 Da) and DP 20 (3000 Da) copolymers each possessing with succinate contents of 10 and 20 mole % were prepared in 50 wt % DEF solution. These resins were compared to formulations (50 wt % DEF) containing pure poly(propylene fumarate), DP 10 and DP 20, respectively. The frequency sweep data showed that the complex viscosity decreased with increasing succinate content in the poly (propylene fumarate-co-succinate) copolymer from 0% to 20%, in both DP 10 and DP 20 copolymer resins. The viscosity drop was more significant when succinate content was increased from 10% to 20% than compared to the difference in 0% from 10% succinate content (FIGS. 8A-B). The complex viscosity of the copolymer resins was measured with DP 10, 20% succinate copolymer at increasing polymer concentrations. The viscosity was observed to increase as the polymer concentration in the resin formulation increased. While the viscosity limitation for photochemical 3D printing is highly dependent of the printer and print geometry, a survey of the literature values notes that the viscosity limitation in cDLP is around 2 Pa·s above which the print failures increase significantly. The viscosity of resin was determined to be 1.6 Pa·s at 70 wt % polymer in the resin, affording a 20% increase in polymer content compared to resin containing pure DP 10 PPF. The viscosity of the resin was measured at elevated temperatures with 80 wt % and 100 wt % resin for 0% and 20% succinate copolymers. (See FIG. 9) The viscosity of succinate copolymer was lower than PPF and the viscosity decreased as the temperature increased. However, the reduction of viscosity was not significant enough to print the resin with DLP without elevating temperature more than 55° C. This present a potential issue of changing the properties of the resin, such as viscosity and stability of photoinitiators, over the 3D printing process.

The 3D printing of a series of resin formulations (50, 60 and 70 wt % polymer) was performed to demonstrate that the resin could be 3D printed through cDLP into tensile bars according to ASTM D360 type V. The lengths of the x, y and z directions of the tensile bar were reduced to half because of the size limitation in the build plate of the 3D printer. The successful 3D printing of these resin formulations into tensile bars showed the retained 3D printability of the copolymers.

TABLE 3

Tensile measurement result of 3D printed tensile bars with different polymer content resins.

| Succinate content (%) | Polymer content (%) | $E_0$ (MPa) | UTS (MPa) | $\varepsilon_{Break}$ (%) |
|---|---|---|---|---|
| 0 | 50 | 224 ± 8 | 15.9 ± 1.5 | 8.6 ± 1.4 |
| 10% | 50 | 213 ± 69 | 18.3 ± 2.0 | 12.4 ± 5.2 |
| 10% | 60 | 177 ± 25 | 15.6 ± 1.1 | 14.6 ± 0.1 |
| 10% | 70 | 132 ± 5 | 14.3 ± 1.1 | 21.5 ± 3.9 |
| 20% | 50 | 188 ± 6 | 13.4 ± 1.8 | 15.6 ± 4.5 |
| 20% | 60 | 126 ± 6 | 13.5 ± 0.8 | 23.1 ± 3.6 |
| 20% | 70 | 98 ± 6 | 12.2 ± 0.5 | 27.5 ± 2.6 |

Figure 10A:
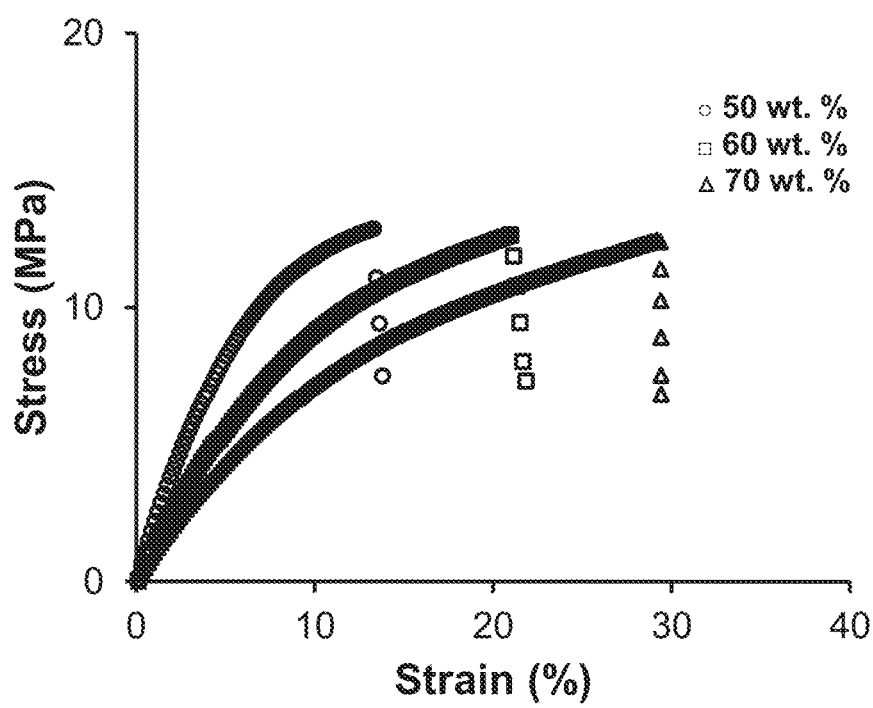
FIGS. 10A-B are a graph showing stress/strain curves for 3D printed tensile bars with 50 wt %, 60 wt % and 70 wt % copolymer resins of DP10, 20% copolymer (FIG. 10A) and a plot showing tensile properties measurement of 3D printed tensile bars with 50 wt %, 60 wt % and 70 wt % copolymer resins for 10 mole % (open symbols) and 20 mole % (solid symbols) succinate copolymer with degree of polymerization of 10 (FIG. 10B)
Figure 10B:
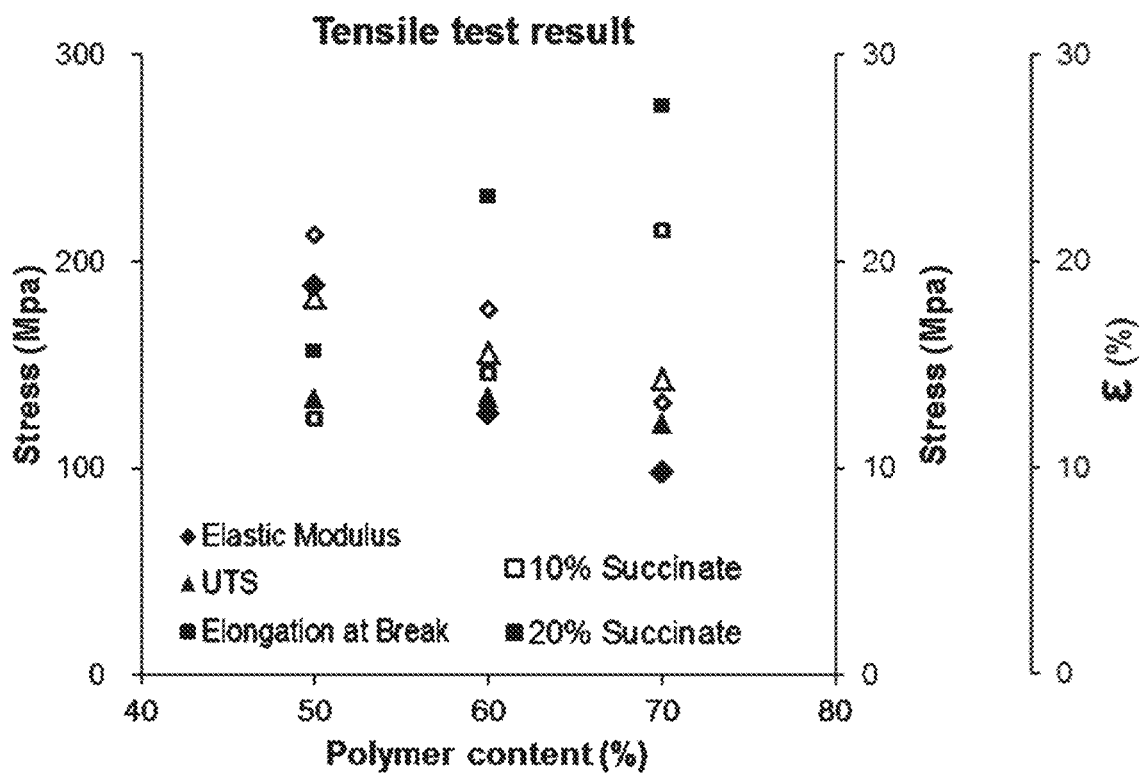

To test the mechanical properties of 3D printed products, tensile modulus measurement were conducted after 1 hour post-curing in UV oven and compared with those of 3D printed tensile bars with 50 wt % of pure PPF polymer resin. In previous studies, (see, e.g., Fisher, J. P.; Dean, D.; Mikos, A. G. Photocrosslinking Characteristics and Mechanical Properties of Diethyl Fumarate/Poly(Propylene Fumarate) Biomaterials. *Biomaterials* 2002, 23 (22), 4333-4343, the disclosure of which is incorporated herein by reference in its entirety) the elastic modulus ($E_0$) is in the range of 100~200 MPa, ultimate strength (UTS) is 10-13 MPa and ultimate strain is about 9%. In this study, the elastic modulus of these tensile bars are 213 MPa and 188 MPa for 10% succinate and 20% succinate contents copolymer in 50 wt % polymer resin formula, respectively and its values are comparable to that of pure PPF (224 MPa). The elongation at break ($\varepsilon_{Break}$) for those bars are 12.4±5.2% and 15.6±4.5% for 10% succinate and 20% succinate contents copolymer in 50 wt % polymer resin formula, respectively, and are higher than that of pure PPF resin (8.6%±1.4) (FIGS. 10A-B, Table 3). Comparing with previous data, $E_0$ and UTS are in similar range and Break is higher value, indicates the promise of PPFS for bone tissue engineering application. In 10% succinate copolymer, $E_0$ are 213, 177 and 132, and Break 12.4, 14.6 and 21.5 for 50 wt %, 60 wt % and 70 wt % polymer contents in the resin, respectively. Similar trend is found for 20% succinate copolymer. This shows that as increasing the polymer contents in the resin, $E_0$ is decreasing and $\varepsilon_{Break}$ is increasing while the UTS remains similar. These trends indicate that by changing the polymer content in the 3D printing resin, the elastic modulus and strain at break can be modulated (FIG. 10B).

Figure 11:
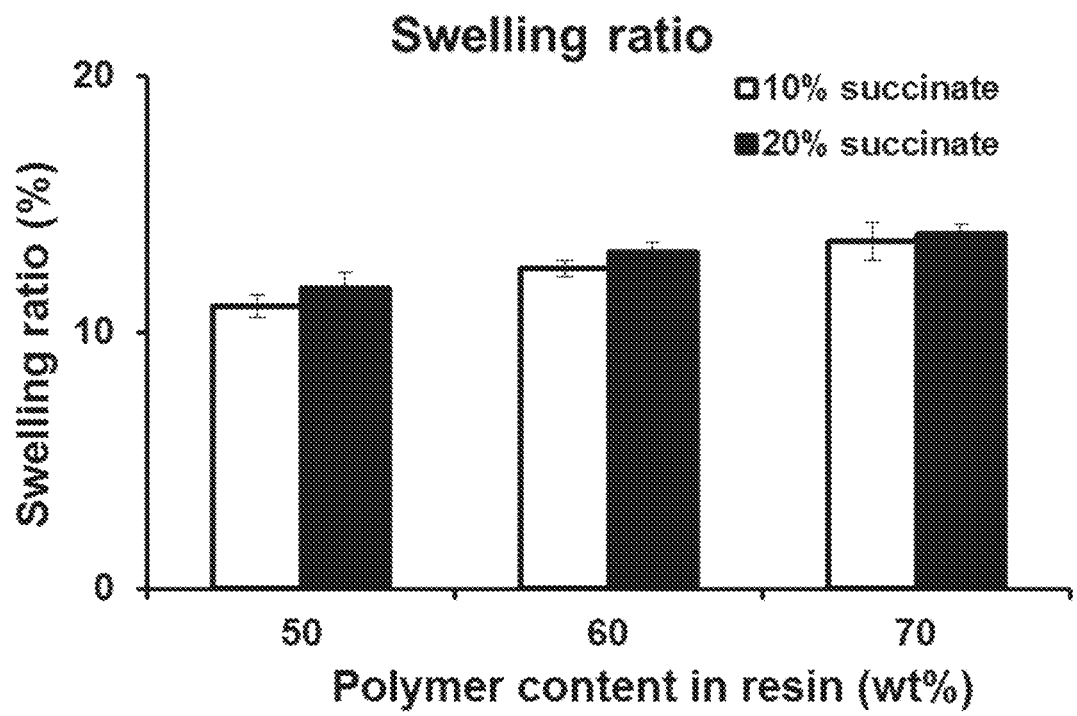
FIG. 11 is a graph showing swelling test results of 3D printed tensile bars for 10 mole % and 20 mole % succinate copolymer with 50 wt %, 60 wt % and 70 wt % copolymer in the printed resin.

To understand the origin of this trend, swelling test was conducted using the 3D printed tensile bar and the swelling ratio are calculated by modification of the previous study. (See, Fisher, J. P.; Dean, D.; Mikos, A. G. Photocrosslinking Characteristics and Mechanical Properties of Diethyl Fumarate/Poly(Propylene Fumarate) Biomaterials. *Biomaterials* 2002, 23 (22), 4333-4343, the disclosure of which is incorporated herein by reference in its entirety.) The swelling ratio is related to the crosslinking density, so when crosslinking density is higher, then the swelling ratio is lower (FIG. 11). The swelling ratio of tensile bar are between 11 and 13% which is consistent regardless of the succinate contents in copolymer and the polymer contents in the resin formula, which means the crosslinking density is nearly consistent for all 3D printed tensile bars. This reveals that the mechanical property of the 3D printed product is mainly originated from the intrinsic properties of succinate unit rather than the crosslinking density difference. Comparing to the rigid double bond of fumarate unit, succinate has flexible saturated bond, therefore, as increasing succinate contents in the resin formula, the modulus is lower and the elongation at break is increasing.

Conclusions

In this been demonstrated herein that the ROCOP of propylene oxide, MAn and SAn using $Mg(BHT)_2(THF)_2$ yield copolymers with narrow molar mass distribution. A series of copolymers from renewable monomer feedstocks with various compositions, molecular mass and initiators were synthesized, isomerized and characterized. The MALDI-ToF MS, $^{13}C$ NMR analysis and kinetic studies revealed the resulting copolymers possess gradient sequencing. In has also been demonstrated that the incorporation of succinate units into poly(propylene fumarate) chains reduces the viscosity of copolymer. In turn, this reduction decreases the amount of DEF needed to 3D print the resin using stereolithographic methods, while the copolymer maintains photochemical printability. The mechanical properties of 3D printed product are modulated by the amount of succinate unit in the polymer and the contents of polymer in the resin formula. The retention of functionality of the initiating alcohol shows the possibility of post-functionalization of copolymer for additional bioactivity.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Materials

All materials were purchased from Millipore-Sigma. The $Mg(BHT)_2(THF)_2$ was synthesized as using a modification of a previous reported method. (See, Wilson, J. A.; Hopkins, S. A.; Wright, P. M.; Dove, A. P., *Polym. Chem.*, 2014, 5, 2691-2694, the disclosure of which is incorporated herein by reference in its entirety.) All solvent were purchased from Fisher and dried using a Pure Solv MD-3 solvent purification system (Innovative Technology Inc.) and degassed prior to use. Benzyl alcohol and propargyl alcohol were distilled over calcium hydride and degassed. Maleic anhydride was sublimated and dried in vacuo over $P_2O_1$ for one week. Succinic anhydride was dried in vacuo over $P_2O_5$ for one week. All other materials were used as received.

Instrumental Methods

Proton ($^1H$) NMR spectra were recorded using a Varian Mercury 300 spectrometer. All chemical shifts were recorded in parts per million (ppm) relative to the reference peak of chloroform solvent at $\delta=7.26$. Molecular masses were determined through size exclusion chromatography (SEC) using a Tosho EcoSec HLC-8320 GPC on TSKgel GMHHR-M columns in series with refractive index (RI) detector. Molecular masses were calculated using a calibration curve determined from poly(styrene) standards with tetrahydrofuran (THF) as the eluent flowing at 1.0 mL min-1 and a sample concentration of 10.0 mg mL-1. MALDI-ToF mass spectra were recorded on a Bruker Ultra-Flex III MALDI-ToF/ToF mass spectrometer equipped with a Nd:YAG laser emitting at 355 nm. The instrument was operated in positive ion mode. All samples were dissolved in THF at a final concentration of 10 mg/mL. Trans-2-[3-(4-tert-butylphenyl)-2-methyl-2-propenylidene]malononitrile (DCTB) (20 mg mL-1) served as a matrix and sodium trifluoroacetate (NaTFA) (10 mg mL-1) as cationizing agent were prepared and mixed in the ratio 10:1. Matrix and sample solutions were applied onto the MALDI-ToF target plate by the sandwich method. FlexAnalysis software was used to analyze MALDI-ToF data. Complex viscosity data were obtained using TA instrument ARES-R2 rheometer with 25 mm diameter plate under frequency sweep mode. Complex viscosities are measured at room temperature at 10% strain in 0.5 to 100 rad/s angular frequency range. Zero sheer viscosity is calculated by intercept of regression curve using the data ranging from 3 to 100 rad/s. UV-Vis data were collected using a BioTek Synergy Mx microplate reader (UV visible spectrometer) at 1% concentration in THF solution.

General Synthesis of PPM Copolymer

In a glovebox, 28.6 mmol of maleic anhydride, 28.6 mmol of propylene oxide, dedicated amount of alcohol (ranging from 2.86 to 1.43 mmol) as a initiator, 0.286 mmol of Mg(BHT)$_2$(THF)$_2$ as a catalyst and 8.2 mL of toluene were placed in the vacuum Schlenk tube. The Schlenk tube was sealed with PTFE plug and removed from the glovebox and heated to 80° C. in the preheated heating block for 24 hours. After designed reaction time, the mixture was precipitated with excess amount of diethyl ether and the precipitated solid was dried under vacuum.

Comparative Example 1

Polymerization for DP 10 poly(propylene maleate) (PPM)

Figure 12:
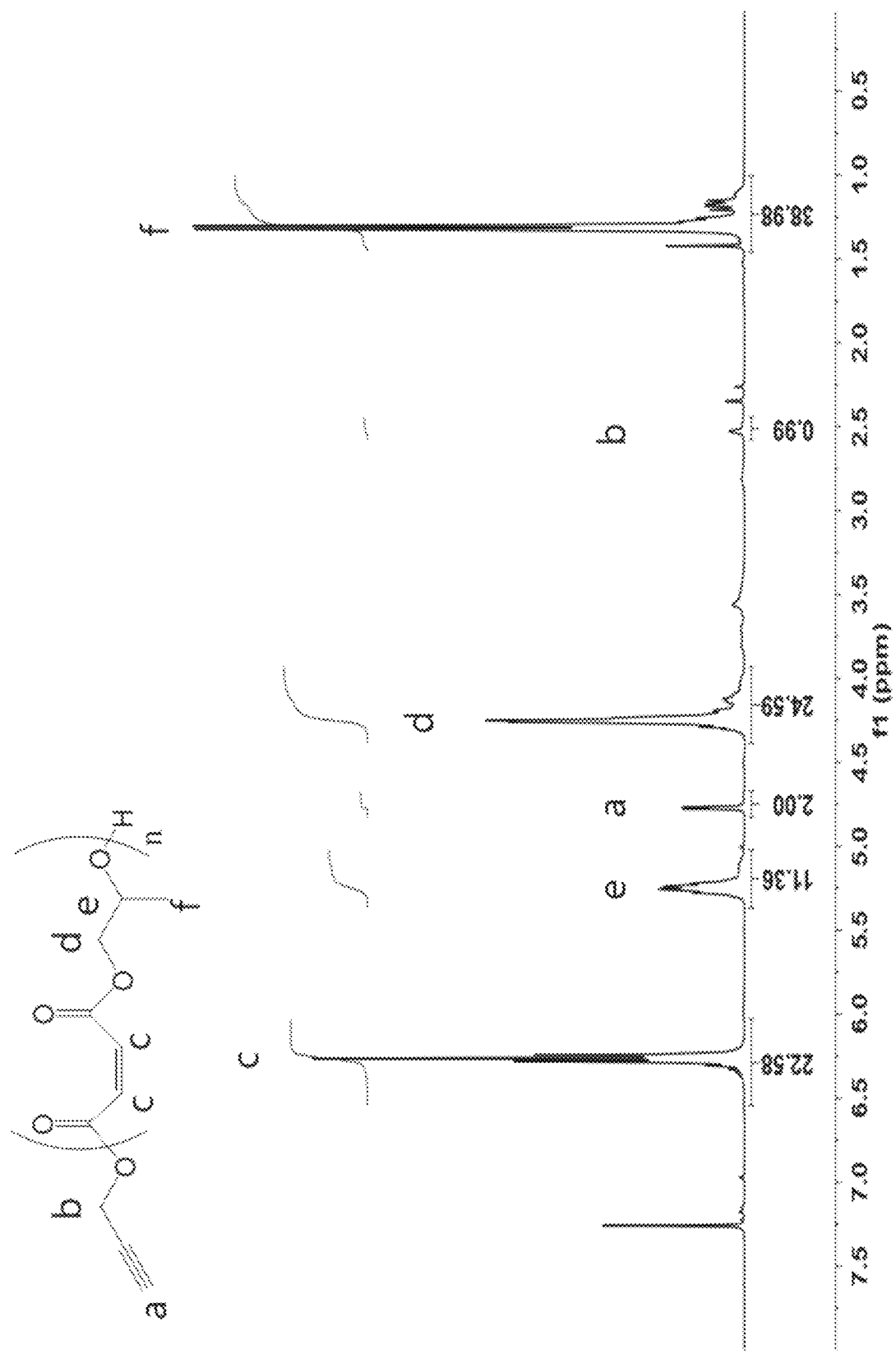
FIG. 12 is a $^1$H NMR spectrum of DP 10 PPM.

In a glove box, maleic anhydride (2.80 g, 28.5 mmol), propylene oxide (2.00 mL, 28.5 mmol), propargyl alcohol (164.8 uL, 2.85 mmol), Mg(BHT)$_2$(THF)$_2$ (348 mg, 0.573 mmol), and 8.2 mL of toluene were added to a Schlenk tube. The Schlenk tube was sealed with cap and heated to 80° C. for 24 hours. The resulting copolymer was precipitated into 200 mL of diethyl ether. After removing the solvent and drying under vacuum, 4.06 g (91.0%) of PPM was recovered. The resulting copolymer was characterized by $^1$H NMR ((300 MHz, 298 K, CDCl$_3$): 6.36-6.18 (m, 22.75H, C=OCHCHC=O), 5.35-5.14 (m, 11.4H, CH$_2$CHCH$_3$O), 4.82 (d, 2.0H, CCH$_2$O), 4.37-4.00 (m, 24.8H, OCH$_2$CHCH$_3$), 2.58-2.49 (s, 0.9H, CHC), 1.40-1.08 (m, 77.9, CHCH$_3$)) The $^1$H NMR spectrum of the DP 10 PPM polymer is shown as FIG. 12. The degree of polymerization was confirmed by nuclear magnetic resonance imagery (NMR) and the number average molecular weight (M$_n$) and mass distribution (Đ$_m$) for the copolymer were measured by gel permeation chromatography (GPC). The results are reported on Table 4, below.

Comparative Example 2

Polymerization for DP 20 poly(propylene maleate) (PPM)

Figure 13:
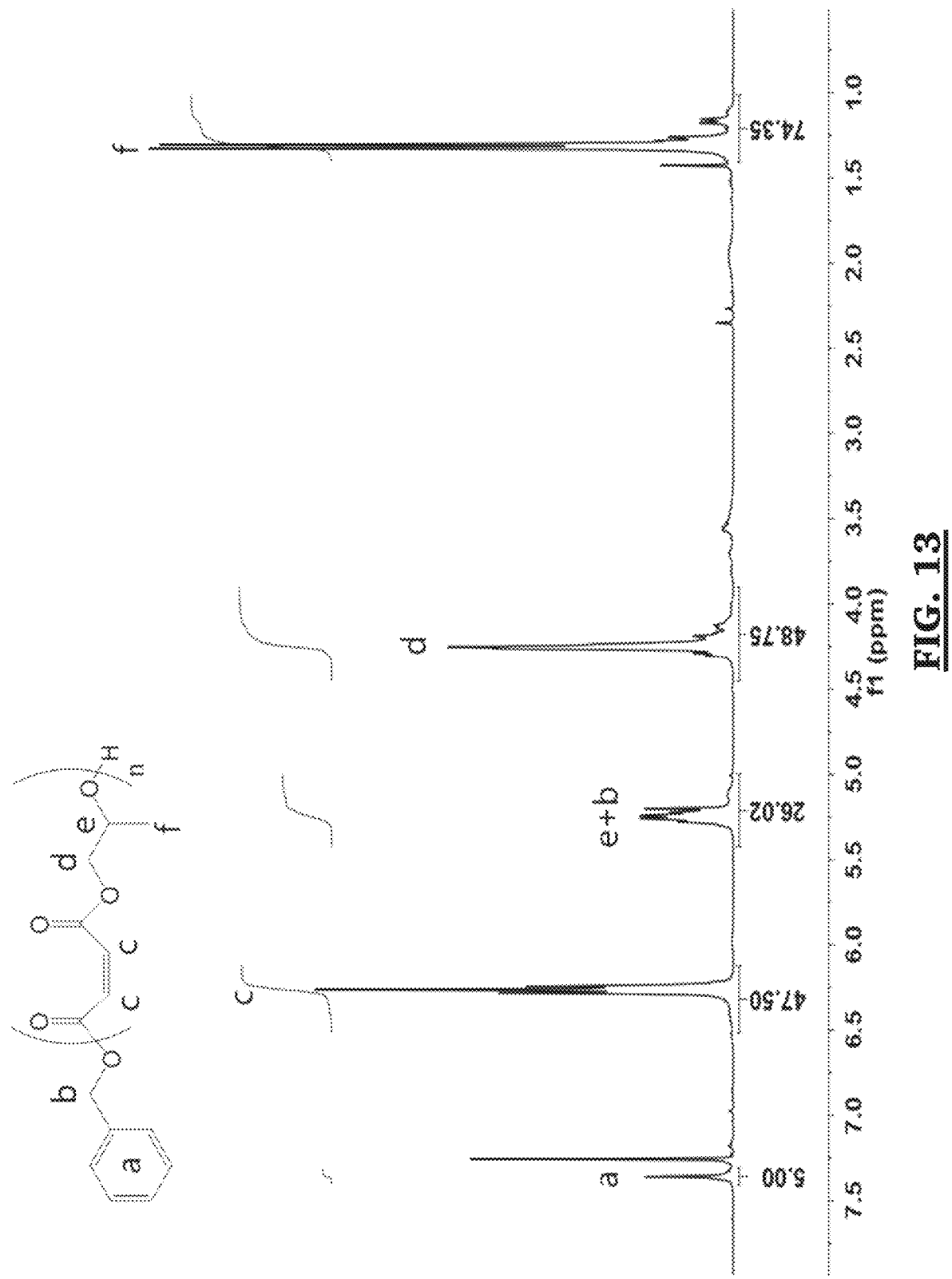
FIG. 13 is a $^1$H NMR spectrum of DP 20 PPM.

A DP 20 poly(propylene maleate) (PPM) was synthesized using the method set forth in Comparative Example 1, except 148.2 uL of benzyl alcohol was added (i.e., 2.80 g of maleic anhydride, 2 mL of propylene oxide, 148.6 uL of benzyl alcohol, 174 mg of Mg(BHT)$_2$(THF)$_2$ were used) and 4.02 g (90.0%) of PPM copolymer was recovered. The resulting copolymer was characterized by $^1$H NMR ((300 MHz, 298 K, CDCl$_3$): 7.36 (s, 5H, Ar), 6.36-6.18 (m, 47.5H, C=OCHCHC=O), 5.35-5.14 (m, 26.4H, CH$_2$CHCH$_3$O), 4.37-4.00 (m, 49.4H, OCH$_2$CHCH$_3$), 1.40-1.08 (m, 75.9, CHCH$_3$)). The $^1$H NMR spectrum of the DP 20 PPM copolymer is shown as FIG. 13. The degree of polymerization was confirmed by NMR and the number average molecular weight (M$_n$) and mass distribution (Đ$_m$) for the copolymer were measured by gel permeation chromatography (GPC). The results are reported on Table 4, below.

Example 1

Figure 14:
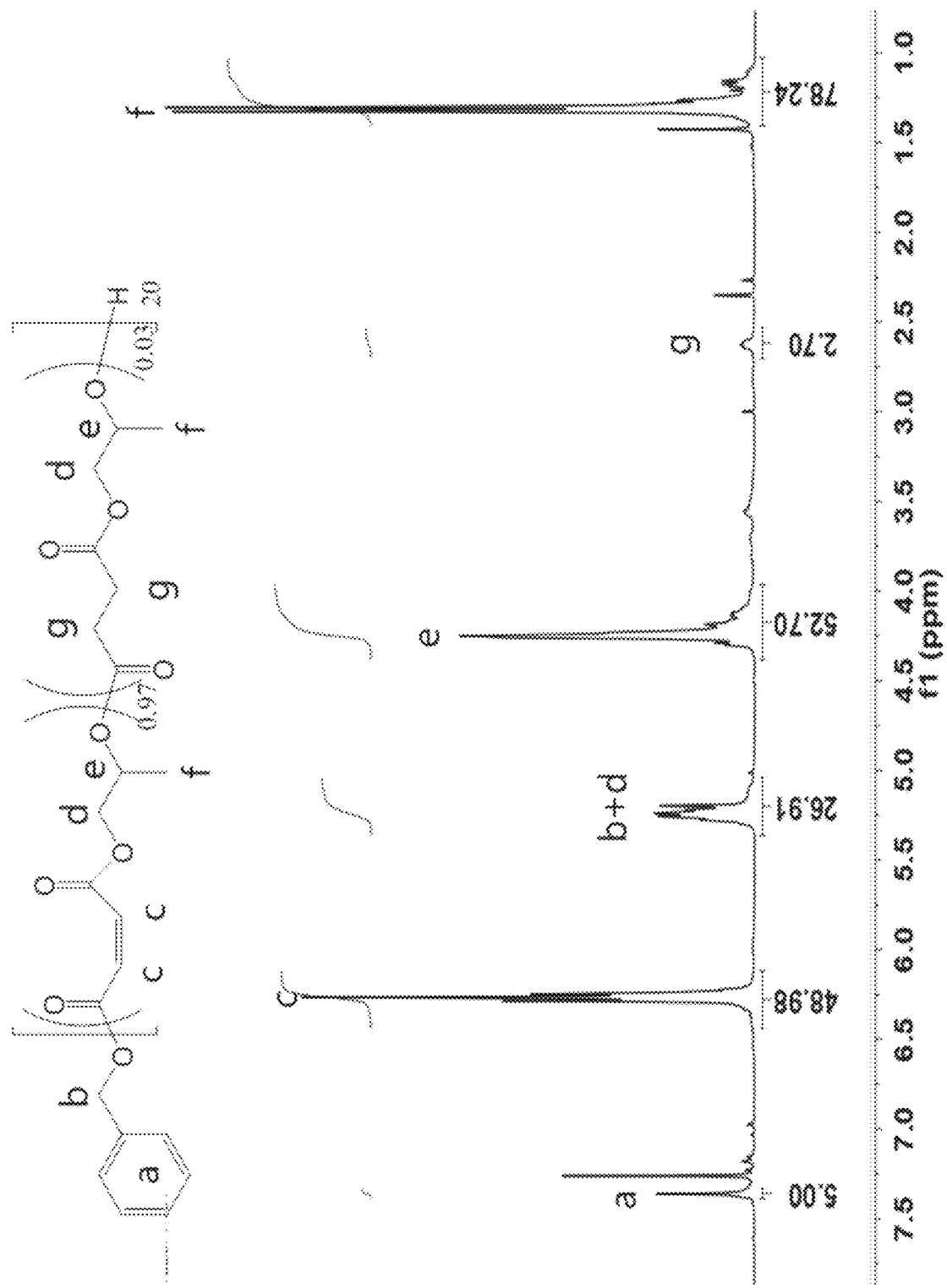
FIG. 14 is a $^1$H NMR spectrum of DP 20, 5 mol % succinic anhydride feed copolymer.

Copolymer Synthesis for DP 20 Polymer with a 5 Mol % Succinic Anhydride Feed Ratio A DP 20 polymer with a 5 mol % succinic anhydride feed ratio was synthesized following same procedure shown in Comparative Example 1, except that 2.664 g of maleic anhydride and 143.2 mg of succinic anhydride were added instead of 2.80 g maleic anhydride (i.e., 2.664 g of maleic anhydride, 0.143 g of succinic anhydride, 2 mL of propylene oxide, 148.6 uL of benzyl alcohol, 174 mg of Mg(BHT)$_2$(THF)$_2$), 4.42 g (99.0%) of copolymer was recovered. The resulting copolymer was characterized by $^1$H NMR ((300 MHz, 298 K, CDCl$_3$): 7.36 (s, 5.0H, Ar), 6.36-6.18 (m, 49.0H, C=OCHCHC=O), 5.35-5.14 (m, 26.9H, CH$_2$CHCH$_3$O), 4.37-4.00 (m, 52.7H, OCH$_2$CHCH$_3$), 2.67-2.55 (m, 2.7H, C=OCH$_2$CH$_2$C=O), 1.40-1.08 (m, 77.9, CHCH$_3$)). A $^1$H NMR spectrum for the DP 20 copolymer with 5 mol % succinic anhydride is shown as FIG. 14. The degree of polymerization was confirmed by NMR and the Đ$_m$ number average molecular weight (M$_n$) and mass distribution (Đ$_m$) for the copolymer were measured by gel permeation chromatography (GPC). The results are reported on Table 4, below.

Example 2

Polymerization for DP 20 and 10 Mol % Succinic Anhydride Feed Ratio

Figure 15:
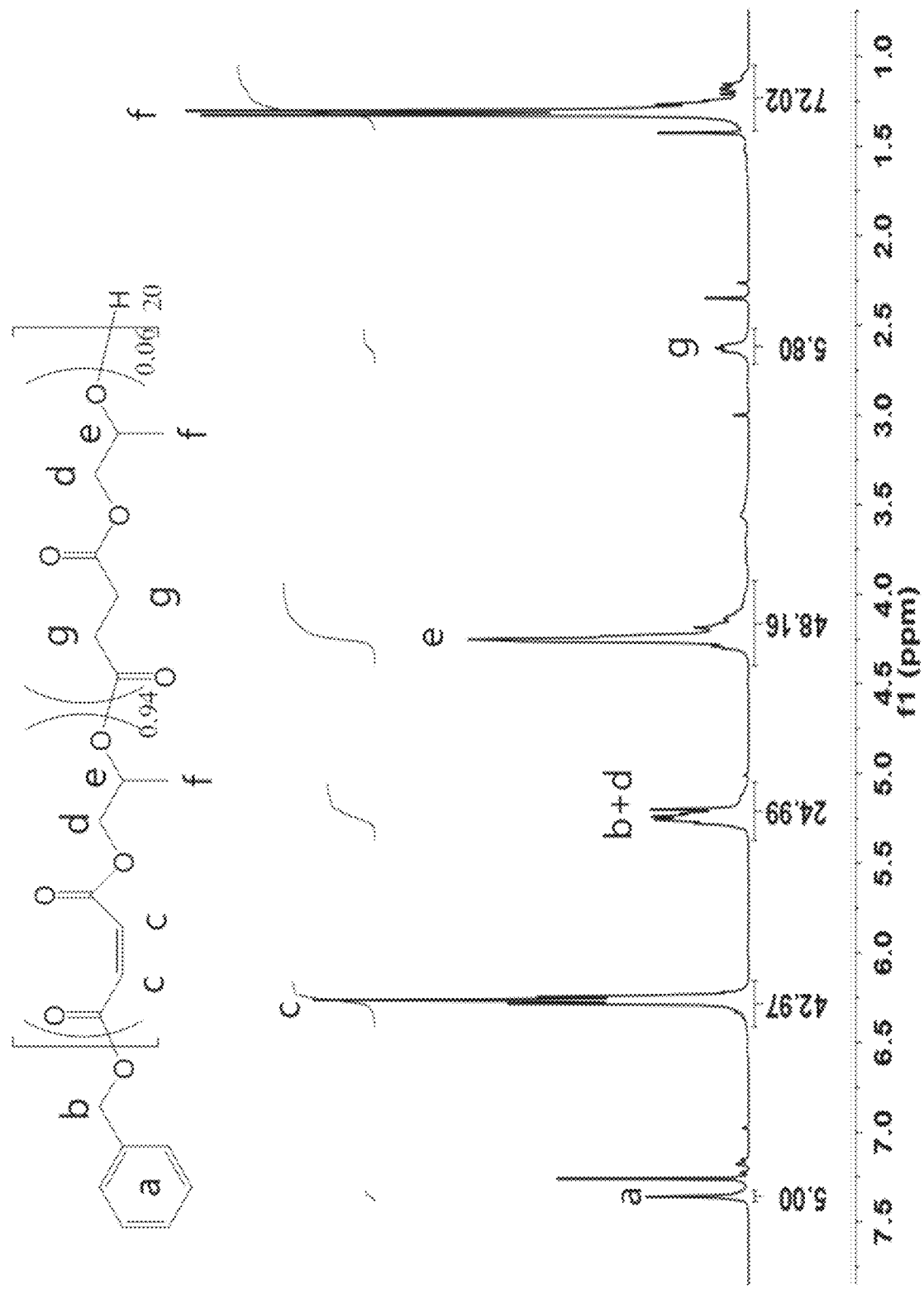
FIG. 15 is a $^1$H NMR spectrum of DP 20, 10 mol % succinic anhydride feed copolymer.

A DP 20 copolymer with a 10 mol % succinic anhydride feed ratio was synthesized following the procedure shown in Comparative Example 1, except that 2.524 g of maleic anhydride and 286 mg of succinic anhydride were used instead of 2.80 g maleic anhydride (i.e., 2.524 g of maleic anhydride, 0.286 g of succinic anhydride, 2 mL of propylene oxide, 148.6 uL of benzyl alcohol, 174 mg of Mg(BHT)$_2$(THF)$_2$ were used). 4.46 g (99.8%) of copolymer was recovered. The resulting copolymer was characterized by $^1$H NMR ((300 MHz, 298 K, CDCl$_3$): 7.36 (s, 5.0H, Ar), 6.36-6.18 (m, 43.0H, C=OCHCHC=O), 5.35-5.14 (m, 25.0H, CH$_2$CHCH$_3$O), 4.37-4.00 (m, 48.2H, OCH$_2$CHCH$_3$), 2.67-2.55 (m, 5.8H, C=OCH$_2$CH$_2$C=O), 1.40-1.08 (m, 72.0, CHCH$_3$)). A $^1$H NMR spectrum for the DP 20, 10 mol % succinic anhydride copolymer is attached hereto as FIG. 15. The degree of polymerization was confirmed by NMR and the number average molecular weight (M$_n$) and mass distribution (Đ$_m$) for the copolymer were measured by gel permeation chromatography (GPC). The results are reported on Table 4, below.

Example 3

Polymerization for DP 20 and 20 Mol % Succinic Anhydride Feed Ratio

Figure 16:
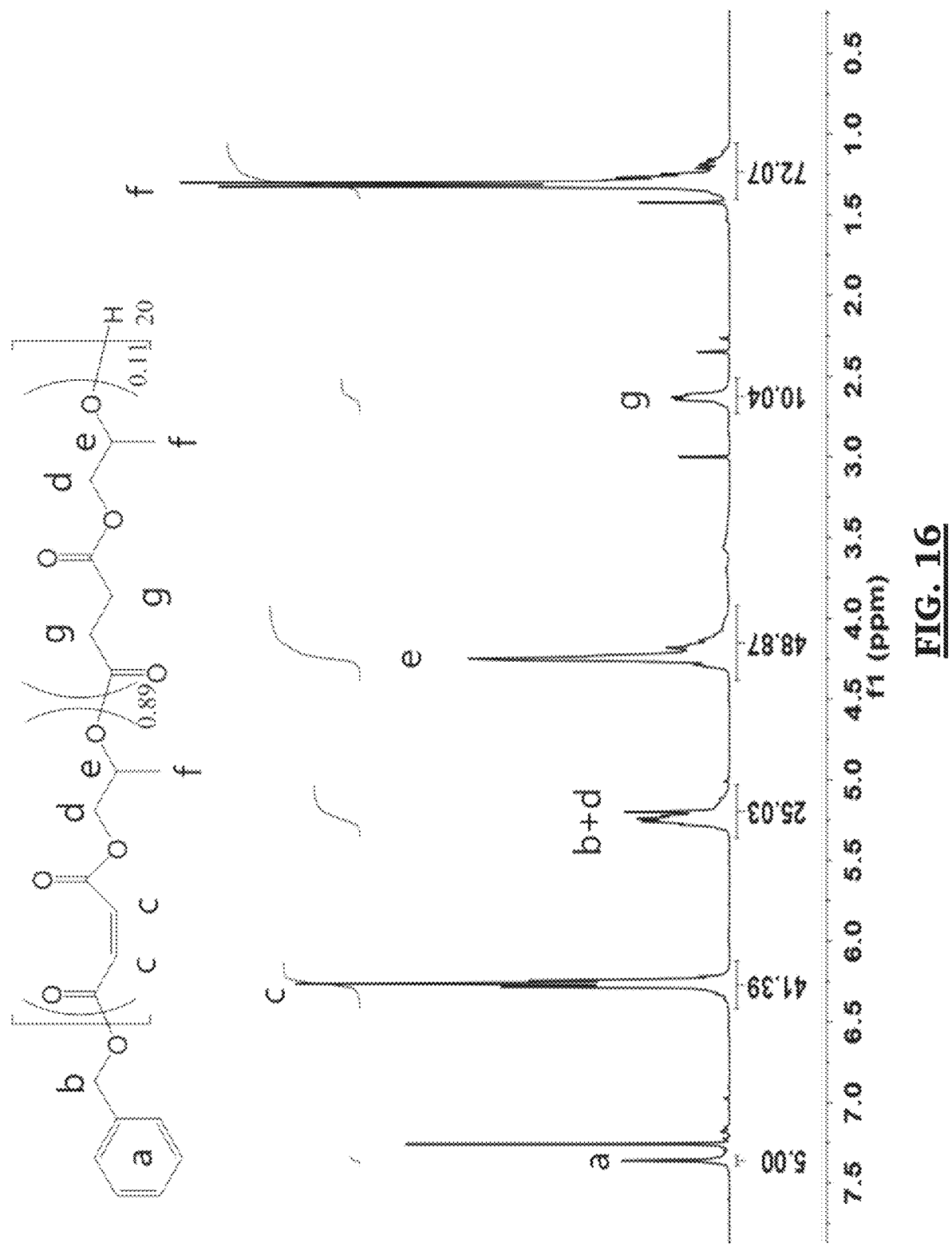
FIG. 16 is a $^1$H NMR spectrum of DP 20, 20 mol % succinic anhydride feed copolymer.

A DP 20 polymer with a 20 mol % succinic anhydride feed ratio was synthesized following same procedure shown in Comparative Example 1, except 2.244 g of maleic anhydride and 572 mg of succinic anhydride were added instead of 2.80 g maleic anhydride (i.e., 2.244 g of maleic anhydride, 0.572 g of succinic anhydride, 2 mL of propylene oxide, 148.6 uL of benzyl alcohol, 174 mg of Mg(BHT)$_2$(THF)$_2$ were used). 4.41 g (98.6%) of the copolymer were recovered. The resulting copolymer was characterized by $^1$H NMR ((300 MHz, 298 K, CDCl$_3$): 7.36 (s, 5.0H, Ar), 6.36-6.18 (m, 41.4H, C=OCHCHC=O), 5.35-5.14 (m, 25.0H, CH$_2$CHCH$_3$O), 4.37-4.00 (m, 48.9H, OCH$_2$CHCH$_3$), 2.67-2.55 (m, 10.0H, C=OCH$_2$CH$_2$C=O), 1.40-1.08 (m, 72.1, CHCH$_3$). A $^1$H NMR spectrum of the DP 20, 20 mol % succinic anhydride feed copolymer is shown at FIG. 16. The degree of polymerization was confirmed by NMR and the number average molecular weight (M$_n$) and mass distribution (Đ$_m$) for the copolymer were measured by gel permeation chromatography (GPC). The results are reported on Table 4, below.

Example 4

Polymerization for DP 20 and 30 Mol % Succinic Anhydride Feed Ratio

Figure 17:
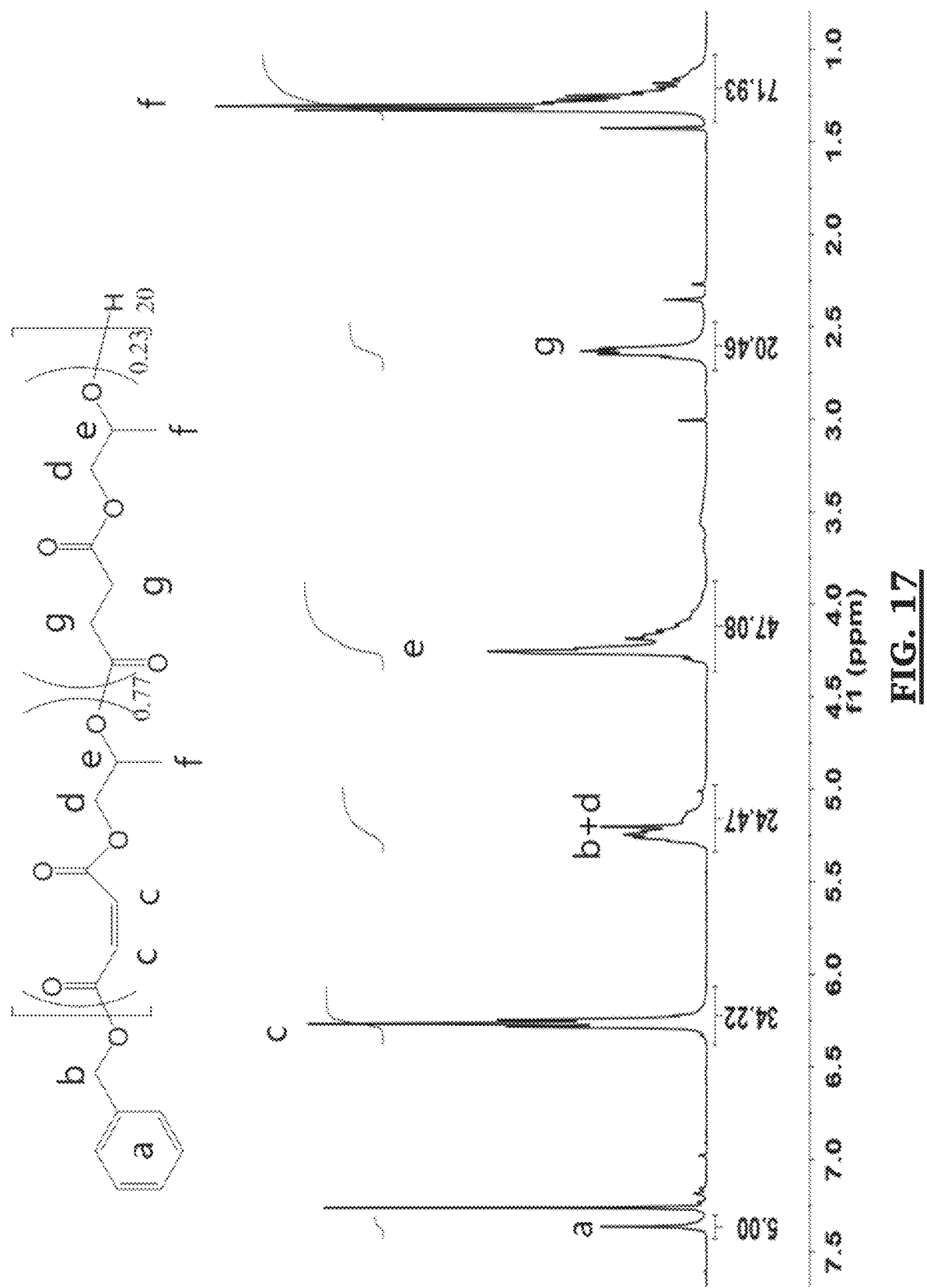
FIG. 17 is a $^1$H NMR spectrum of DP 20, 30 mol % succinic anhydride feed copolymer.

A DP 20 polymer with a 30 mol % succinic anhydride feed ratio was synthesized following same procedure shown in Comparative Example 1, except that 1.964 g of maleic anhydride and 858 mg of succinic anhydride were added instead of 2.80 g maleic anhydride (i.e., 1.964 g of maleic anhydride, 0.858 g of succinic anhydride, 2 mL of propylene oxide, 148.6 uL of benzyl alcohol, 174 mg of $Mg(BHT)_2(THF)_2$ were used). 4.40 g (98.2%) of copolymer was recovered. The resulting copolymer was characterized by $^1H$ NMR ((300 MHz, 298 K, $CDCl_3$): 7.36 (s, 5.0H, Ar), 6.36-6.18 (m, 34.2H, C=OCHCHC=O), 5.35-5.14 (m, 24.5H, $CH_2CHCH_3O$, $ArCH_2O$), 4.37-4.00 (m, 47.1H, $OCH_2CHCH_3$), 2.67-2.55 (m, 20.5H, $C=OCH_2CH_2C=O$), 1.40-1.08 (m, 71.9, $CHCH_3$). A $^1H$ NMR spectrum for the DP 20, 30 mol % succinic anhydride feed copolymer is shown in FIG. 17. The degree of polymerization was confirmed by NMR and the number average molecular weight ($M_n$) and mass distribution ($Đ_m$) for the copolymer were measured by gel permeation chromatography (GPC). The results are reported on Table 4, below.

Example 5

Polymerization for DP 20 and 50 Mol % Succinic Anhydride Feed Ratio

Figure 18:
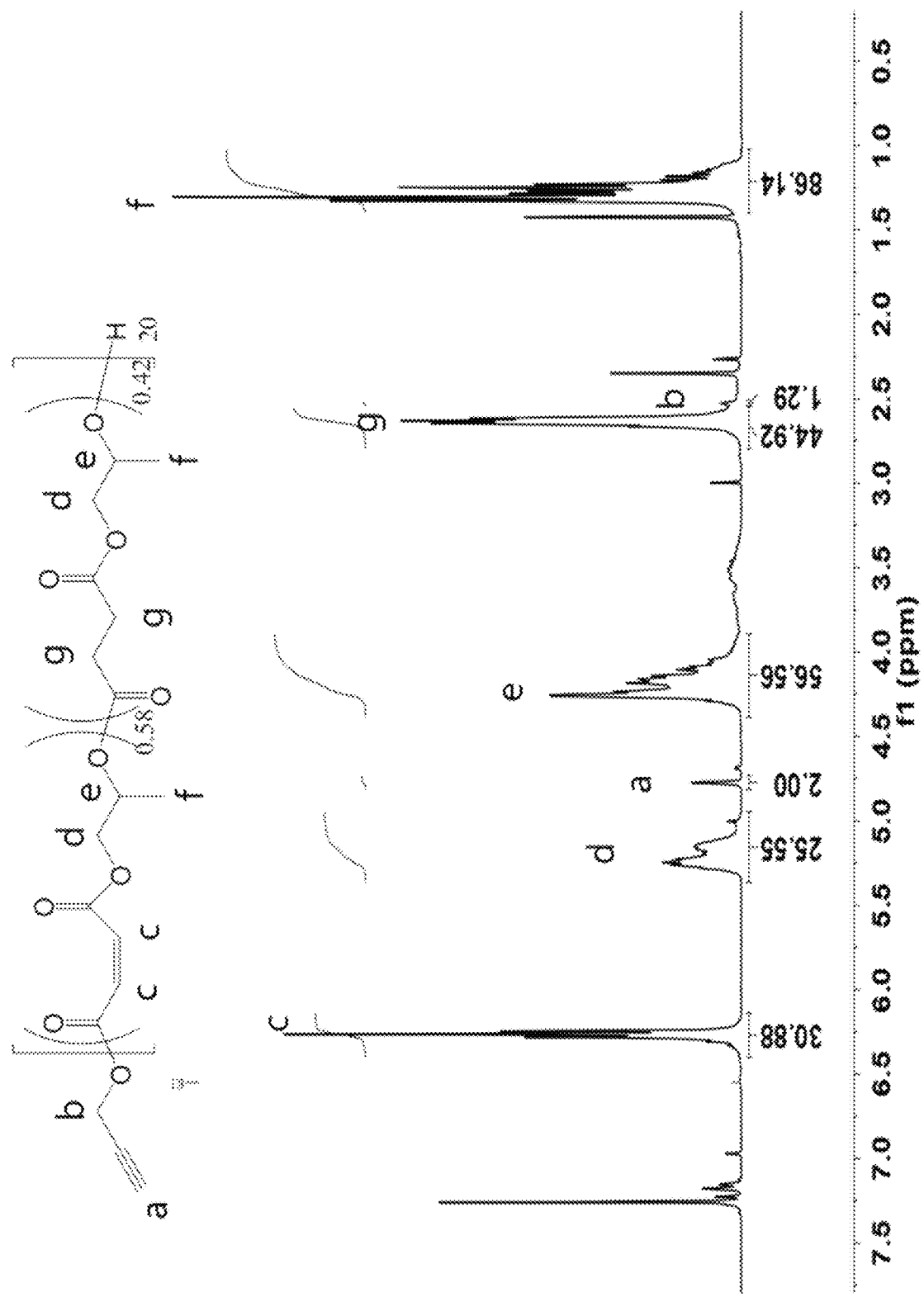
FIG. 18 is a $^1$H NMR spectrum of DP 20, 50 mol % succinic anhydride feed copolymer.

A DP 20 polymer with a 50 mol % succinic anhydride feed ratio was synthesized following same procedure shown in Comparative Example 1, except that 1.40 g of maleic anhydride and 1.43 g of succinic anhydride was added instead of 2.80 g maleic anhydride and 82.5 uL of propargyl alcohol was added instead of benzyl alcohol (i.e., 1.40 g of maleic anhydride, 1.43 g of succinic anhydride, 2 mL of propylene oxide, 148.6 uL of benzyl alcohol, 174 mg of $Mg(BHT)_2(THF)_2$ were used). 4.15 g (92.4%) of copolymer was recovered. The resulting copolymer was characterized by $^1H$ NMR ((300 MHz, 298 K, $CDCl_3$): 6.40-6.16 (m, 30.9H, C=OCHCHC=O), 5.34-5.05 (m, 25.6H, $CH_2CHCH_3O$), 4.80-4.74 (m, 2H, $CCH_2O$), 4.37-3.89 (m, 56.6H, $OCH_2CHCH_3$), 2.77-2.54 (m, 44.9H, $OCH_2CHCH_3$), 2.54-2.49 (m, 1.3H, CHC), 1.40-1.08 (m, 77.9, $CHCH_3$). A $^1H$ NMR spectrum for the DP 20, 50 mol % succinic anhydride feed copolymer is shown in FIG. 18. The degree of polymerization was confirmed by NMR and the number average $Đ_m$ molecular weight ($M_n$) and mass distribution ($Đ_m$) for the copolymer were measured by gel permeation chromatography (GPC). The results are reported on Table 4, below.

Example 6

Polymerization for DP 20 and 100 Mol % Succinic Anhydride Feed Ratio

Figure 19:
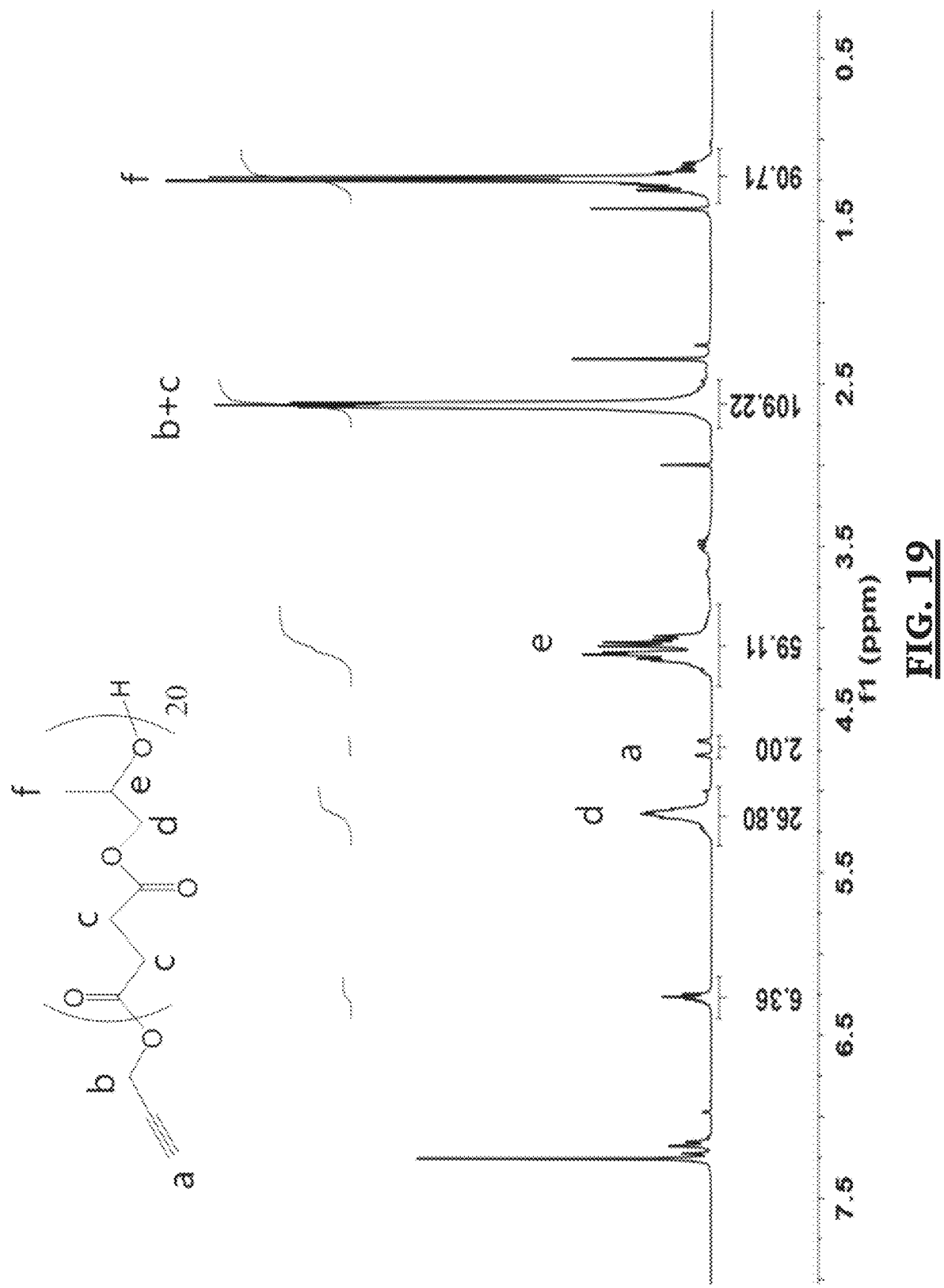
FIG. 19 is a $^1$H NMR spectrum of DP 20, 100 mol % succinic anhydride feed copolymer.

A DP 20 polymer with a 100 mol % succinic anhydride feed ratio was synthesized following same procedure shown in Comparative Example 1, except that 2.86 g of succinic anhydride was added instead of 2.80 g maleic anhydride and 82.5 uL of propargyl alcohol was added instead of benzyl alcohol (i.e., 2.86 g of succinic anhydride, 2 mL of propylene oxide, 82.5 uL of propargyl alcohol, 174 mg of $Mg(BHT)_2(THF)_2$ were used). 4.15 g (92.4%) of copolymer was recovered. The resulting copolymer was characterized by $^1H$ NMR ((300 MHz, 298 K, $CDCl_3$): 6.40-6.16 (m, 6.4H, C=OCHCHC=O), 5.34-5.05 (m, 26.8H, $CH_2CHCH_3O$), 4.80-4.67 (m, 2H, $CCH_2O$), 4.37-3.89 (m, 59.1H, $OCH_2CHCH_3$), 2.77-2.49 (m, 109.2H, $OCH_2CHCH_3$, CHC), 1.40-1.08 (m, 90.7, $CHCH_3$). A $^1H$ NMR spectrum for the DP 20, 100 mol % succinic anhydride feed copolymer is shown in FIG. 19.

Example 7

Polymerization for DP 10 and 10 Mol % Succinic Anhydride Feed Ratio

Figure 20:
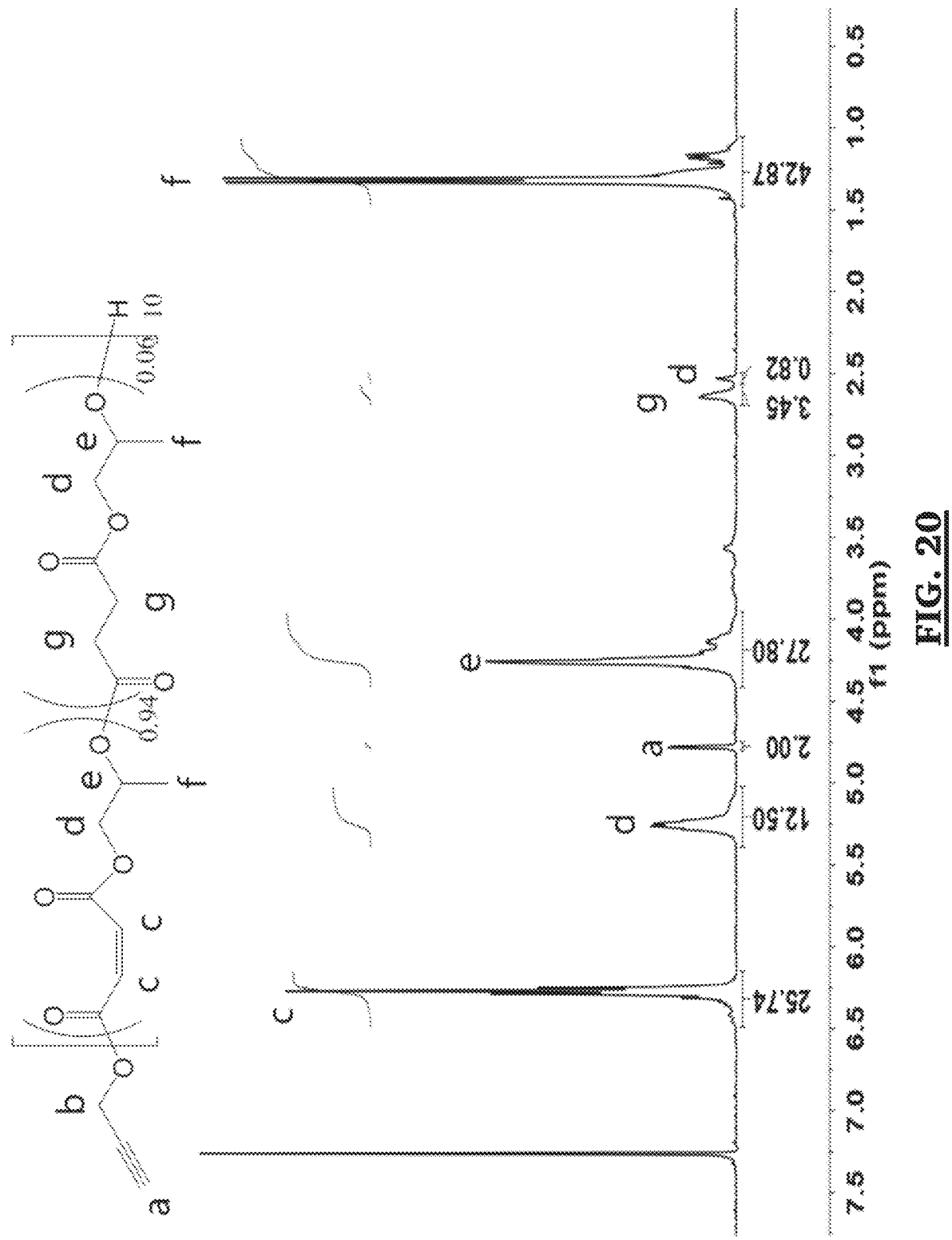
FIG. 20 is a $^1$H NMR spectrum of DP 10, 10 mol % succinic anhydride feed copolymer.

A DP 10 polymer with a 10 mol % succinic anhydride feed ratio was synthesized following same procedure shown in Comparative Example 1, except that 2.524 g of maleic anhydride and 286 mg of succinic anhydride were added instead of 2.80 g maleic anhydride and 165 µL of propargyl alcohol was added instead of benzyl alcohol (i.e., 2.524 g of maleic anhydride, 0.286 g of succinic anhydride, 2 mL of propylene oxide, 330 µL of propargyl alcohol, 174 mg of $Mg(BHT)_2(THF)_2$ were used). 3.60 g (80.5%) of copolymer was recovered. The resulting copolymer was characterized by $^1H$ NMR ((300 MHz, 298 K, $CDCl_3$): 6.40-6.16 (m, 25.7H, C=OCHCHC=O), 5.34-5.05 (m, 12.5H, $CH_2CHCH_3O$), 4.80-4.74 (m, 2H, $CCH_2O$), 4.37-3.89 (m, 27.8H, $OCH_2CHCH_3$), 2.77-2.54 (m, 3.5H, $OCH_2CHCH_3$), 2.54-2.49 (m, 0.8H, CHC), 1.40-1.08 (m, 42.9, $CHCH_3$). A $^1H$ NMR spectrum for the DP 10, 10 mol % succinic anhydride feed copolymer is shown at FIG. 20. The degree of polymerization was confirmed by NMR and the number average molecular weight ($M_n$) and mass distribution ($Đ_m$) for the copolymer were measured by gel permeation chromatography (GPC). The results are reported on Table 4, below.

Example 8

Polymerization for DP 10 and 20 Mol % Succinic Anhydride Feed Ratio

Figure 21:
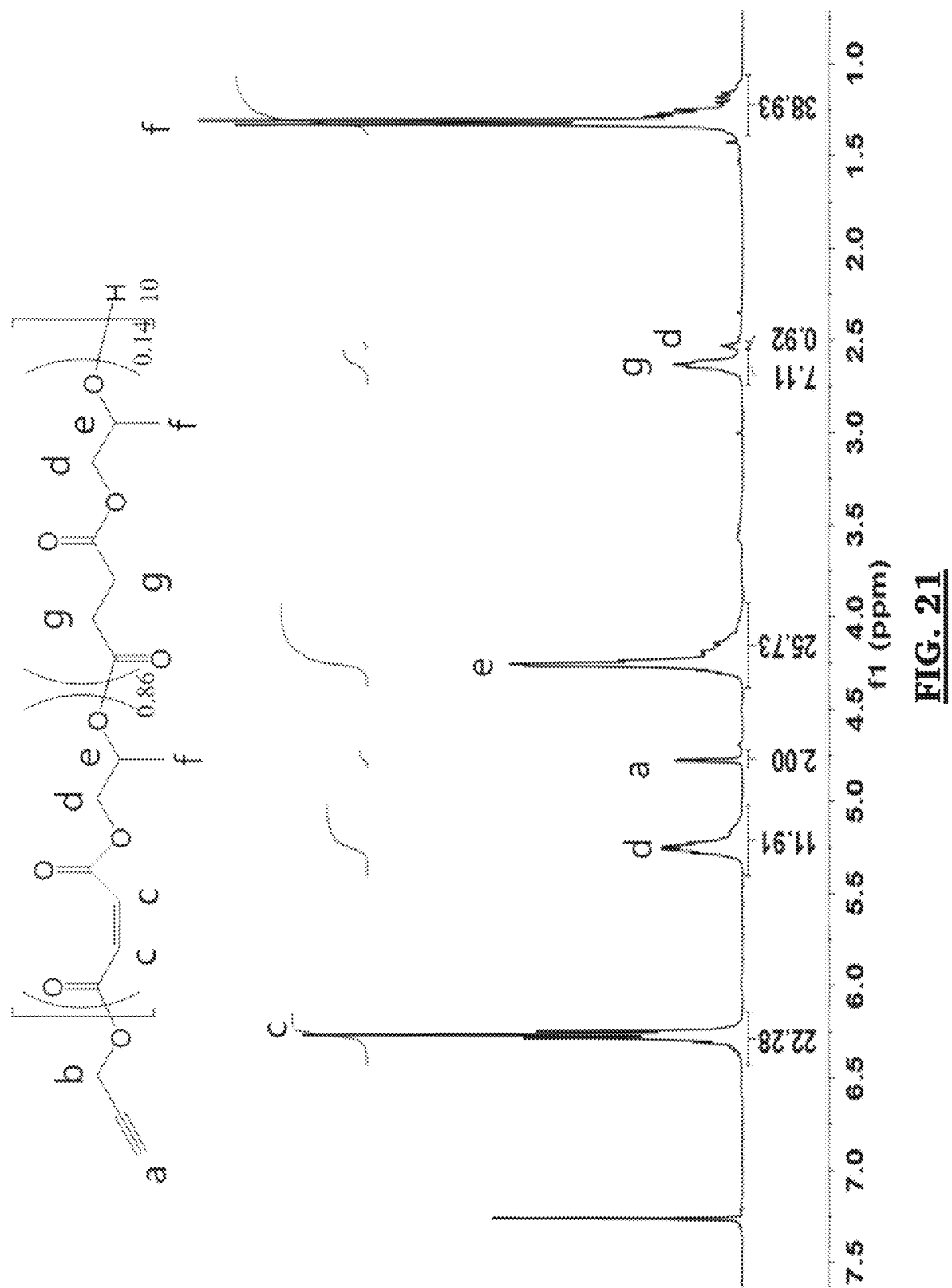
FIG. 21 is a $^1$H NMR spectrum of DP 10, 20 mol % succinic anhydride feed copolymer.

A DP 10 polymer with a 20 mol % succinic anhydride feed ratio was synthesized following same procedure shown in Comparative Example 1, except that 2.244 g of maleic anhydride and 572 mg of succinic anhydride were added instead of 2.80 g maleic anhydride and 165 µL of propargyl alcohol was added instead of benzyl alcohol (i.e., 2.244 g of maleic anhydride, 0.572 g of succinic anhydride, 2 mL of propylene oxide, 165 µL of propargyl alcohol, 174 mg of $Mg(BHT)_2(THF)_2$ were used). 4.35 g (97.2%) of copolymer was recovered. The resulting copolymer was characterized by $^1H$ NMR ((300 MHz, 298 K, $CDCl_3$): 6.40-6.16 (m, 22.3H, C=OCHCHC=O), 5.34-5.05 (m, 11.9H, $CH_2CHCH_3O$), 4.80-4.74 (m, 2H, $CCH_2O$), 4.37-3.89 (m, 25.7H, $OCH_2CHCH_3$), 2.77-2.54 (m, 7.1H, $OCH_2CHCH_3$), 2.54-2.49 (m, 0.9H, CHC), 1.40-1.08 (m, 38.9, $CHCH_3$). A $^1H$ NMR spectrum for the DP 10, 20 mol % succinic anhydride feed copolymer is shown as FIG. 21. The degree of polymerization was confirmed by NMR and the number average molecular weight ($M_n$) and mass distribution ($Đ_m$) for the copolymer were measured by gel permeation chromatography (GPC). The results are reported on Table 4, below.

TABLE 4

Polymer analysis data for Examples 1-9 and Comparative Examples 1-2

| Entry | Feed Ratio | | Composition | | Degree Polymerization | | GPC | |
|---|---|---|---|---|---|---|---|---|
| | MAn | SAn | MAn | SAn | Expected | NMR | $M_n$ (kDa) | $Đ_M$ |
| C. Example 1 | 100 | — | 100 | 0 | 10 | 11 | 2.0 | 1.30 |
| C. Example 2 | 100 | — | 100 | 0 | 20 | 24 | 2.9 | 1.29 |
| Example 1 | 95 | 5 | 97 | 3 | 20 | 24 | 2.6 | 1.36 |
| Example 2 | 90 | 10 | 94 | 6 | 20 | 23 | 2.5 | 1.36 |
| Example 3 | 80 | 20 | 89 | 11 | 20 | 23 | 2.4 | 1.36 |
| Example 4 | 70 | 30 | 77 | 23 | 20 | 23 | 2.6 | 1.42 |
| Example 5 | 50 | 50 | 58 | 42 | 20 | 25 | 2.4 | 1.77 |
| Example 6 | 0 | 100 | 0 | 100 | 20 | 28 | 1.9 | 1.39 |
| Example 7 | 90 | 10 | 94 | 6 | 10 | 13 | 1.6 | 1.37 |
| Example 8 | 80 | 20 | 86 | 14 | 10 | 12 | 1.8 | 1.27 |

General Procedure for Isomerization of Copolymer

To the solution of 3 g of copolymer that were dissolved in 20 mL of chloroform, 300 μL of diethyl amine was added and refluxed for 18 hours under nitrogen atmosphere. The organic layer was washed with 1M sodium phosphate aqueous solution and the polymer was recovered by evaporation under vacuum.

Comparative Example 3

PPF Synthesis (Isomerization of the Polymer of Comparative Example 1)

Figure 22:
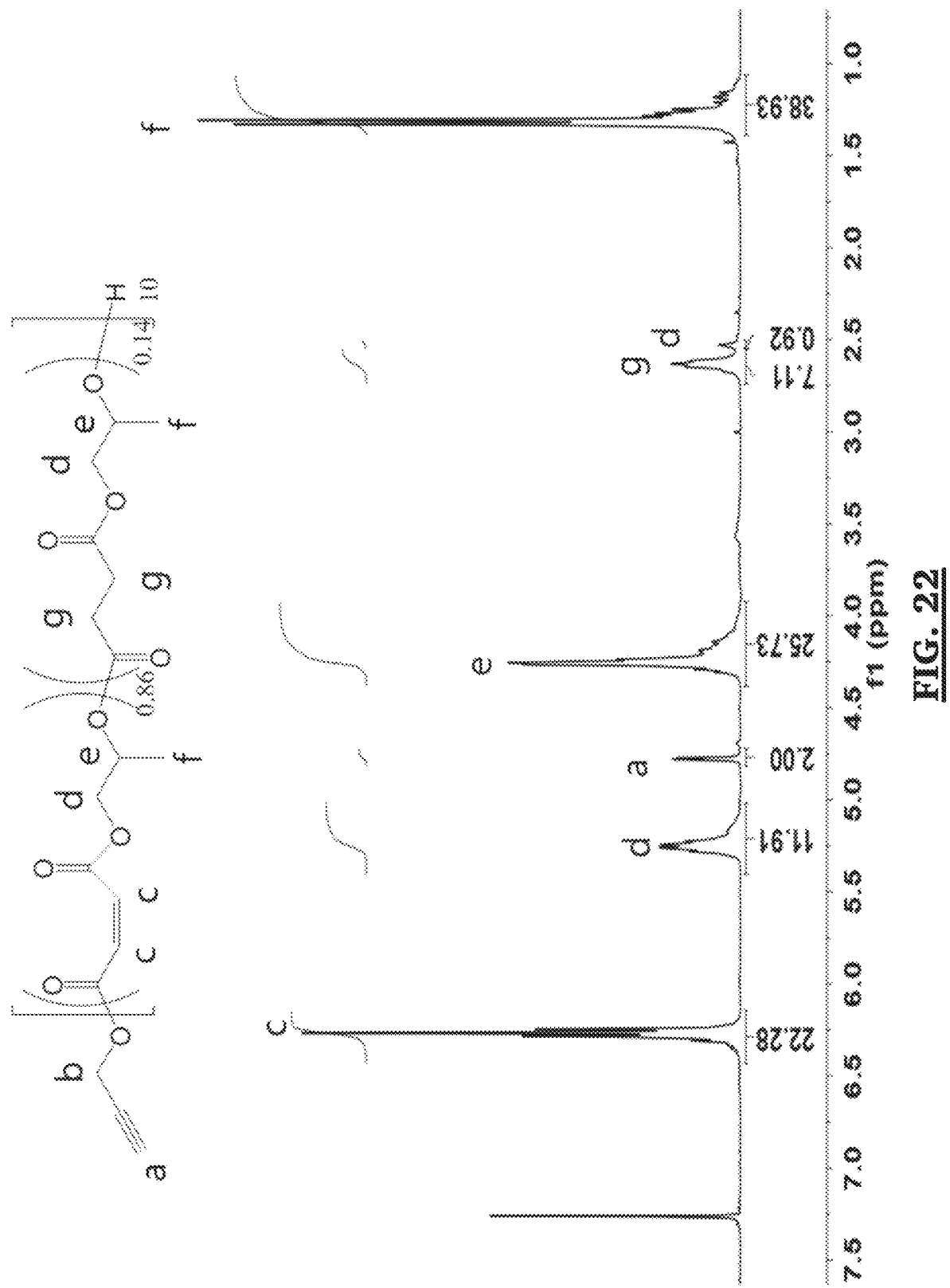
FIG. 22 is a $^1$H NMR spectrum of DP 10 poly(propylene fumarate) (PPF)

3 g of the polymer that was recovered from Comparative Example 1 was dissolved in 20 mL of chloroform and 0.30 mL of diethylamine was added to the solution. The solution was heated to reflux under nitrogen flow for 12 hours. The organic solution was then washed with phosphate buffer solution and the isomerized polymer was recovered by vacuum evaporation. The resulting copolymer was characterized by $^1$H NMR ((300 MHz, 298 K, CDCl$_3$): 6.97-6.78 (m, 19.6H, C=OCHCHC=O), 5.39-5.05 (m, 11.6H, CH$_2$CHCH$_3$O), 4.82 (d, 2.0H, CCH$_2$O), 4.45-4.00 (m, 24.8H, OCH$_2$CHCH$_3$), 2.58-2.49 (s, 1.2H, CHC), 1.40-1.03 (m, 40.0H, CHCH$_3$). A $^1$H NMR spectrum of DP 10 poly (propylene fumarate) (PPF) is attached hereto as FIG. 22. The degree of polymerization was confirmed by NMR, the number average molecular weight (M$_n$) and mass distribution (Đ$_m$) for the copolymer were measured by gel permeation chromatography (GPC), the complex viscosity of polymer in 50% DEF solution (by weight) was measured using TA instrument ARES-R2 rheometer with 25 mm diameter plate under frequency sweep mode at room temperature at 10% strain in 0.5 to 100 rad/s angular frequency range and the zero sheer viscosity was calculated by finding the y intercept of a regression curve of frequency sweep data in the range from 3 rad/s to 100 rad/s, as set forth above. The results are reported on Table 5, below.

Comparative Example 4

PPF Synthesis (Isomerization of the Polymer of Comparative Example 2)

Figure 23:
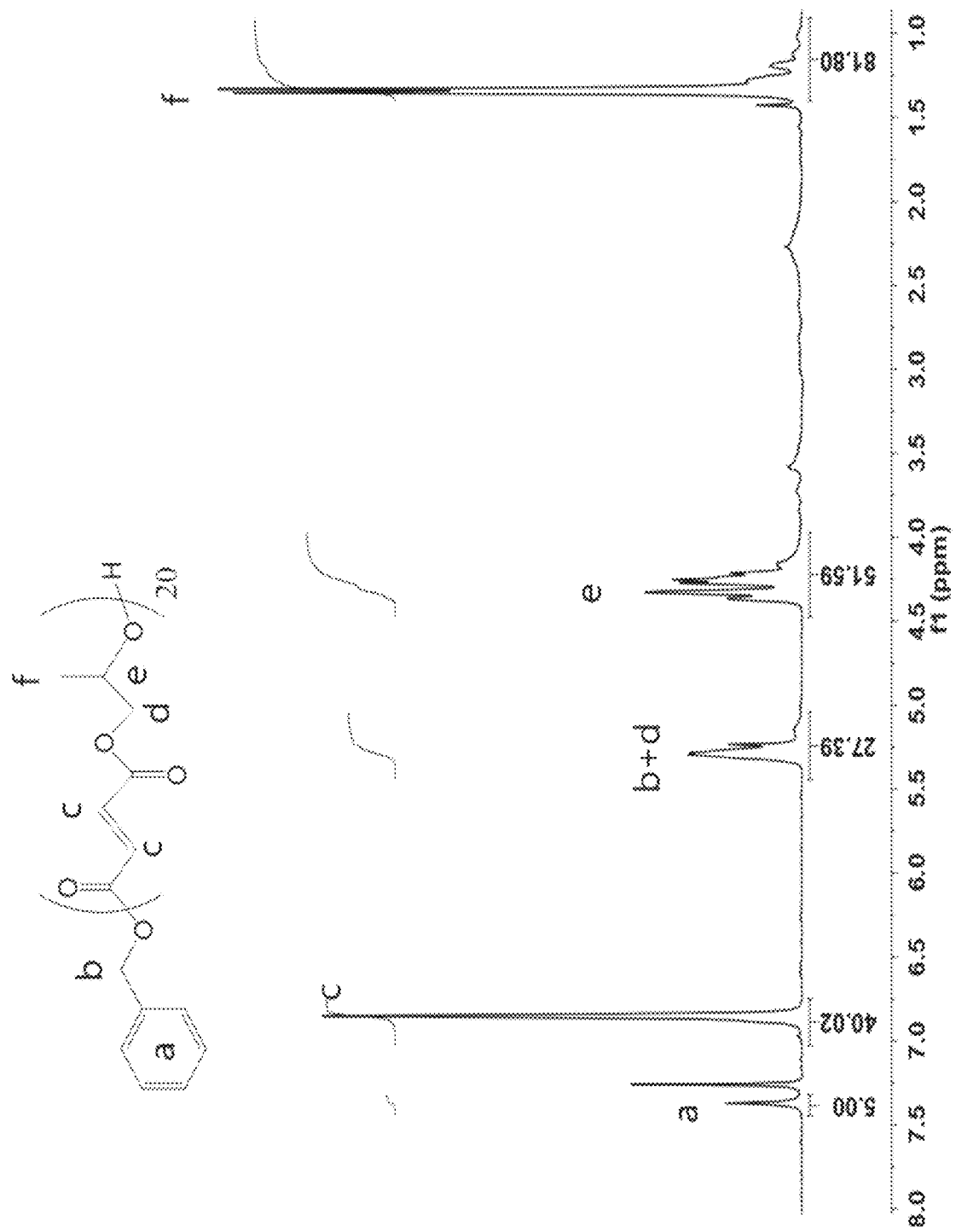
FIG. 23 is a $^1$H NMR spectrum of DP 20 poly(propylene fumarate) (PPF)

A DP 20 PPF polymer was synthesized following same procedure shown in Comparative Example 3, except that the polymer that was recovered from Comparative Example 2 was used (rather than the polymer recovered from Comparative Example 1) and the isomerized polymer was recovered. The resulting copolymer was characterized by $^1$H NMR ((300 MHz, 298 K, CDCl$_3$): 7.36 (s, 5H, Ar), 7.02-6.78 (m, 39.4H, C=OCHCHC=O), 5.37-5.07 (m, 25.1H, CH$_2$CHCH$_3$O), 4.47-4.00 (m, 47.0H, OCH$_2$CHCH$_3$), 1.40-0.98 (m, 74.5, CHCH$_3$). A $^1$H NMR spectrum of DP 20 poly(propylene fumarate) (PPF) polymer is shown in FIG. 23. The degree of polymerization was confirmed by NMR, the number average molecular weight (M$_n$) and mass distribution (Đ$_m$) for the copolymer were measured by gel permeation chromatography (GPC), and the complex viscosity of polymer in 50% DEF solution (by weight) was measured using TA instrument ARES-R2 rheometer with 25 mm diameter plate under frequency sweep mode at room temperature at 10% strain in 0.5 to 100 rad/s angular frequency range and the zero sheer viscosity was calculated by finding the y intercept of a regression curve of frequency sweep data in the range from 3 rad/s to 100 rad/s, as set forth above. The results are reported on Table 5.

Example 9

10%, DP=10 Copolymer Isomerization

Figure 24:
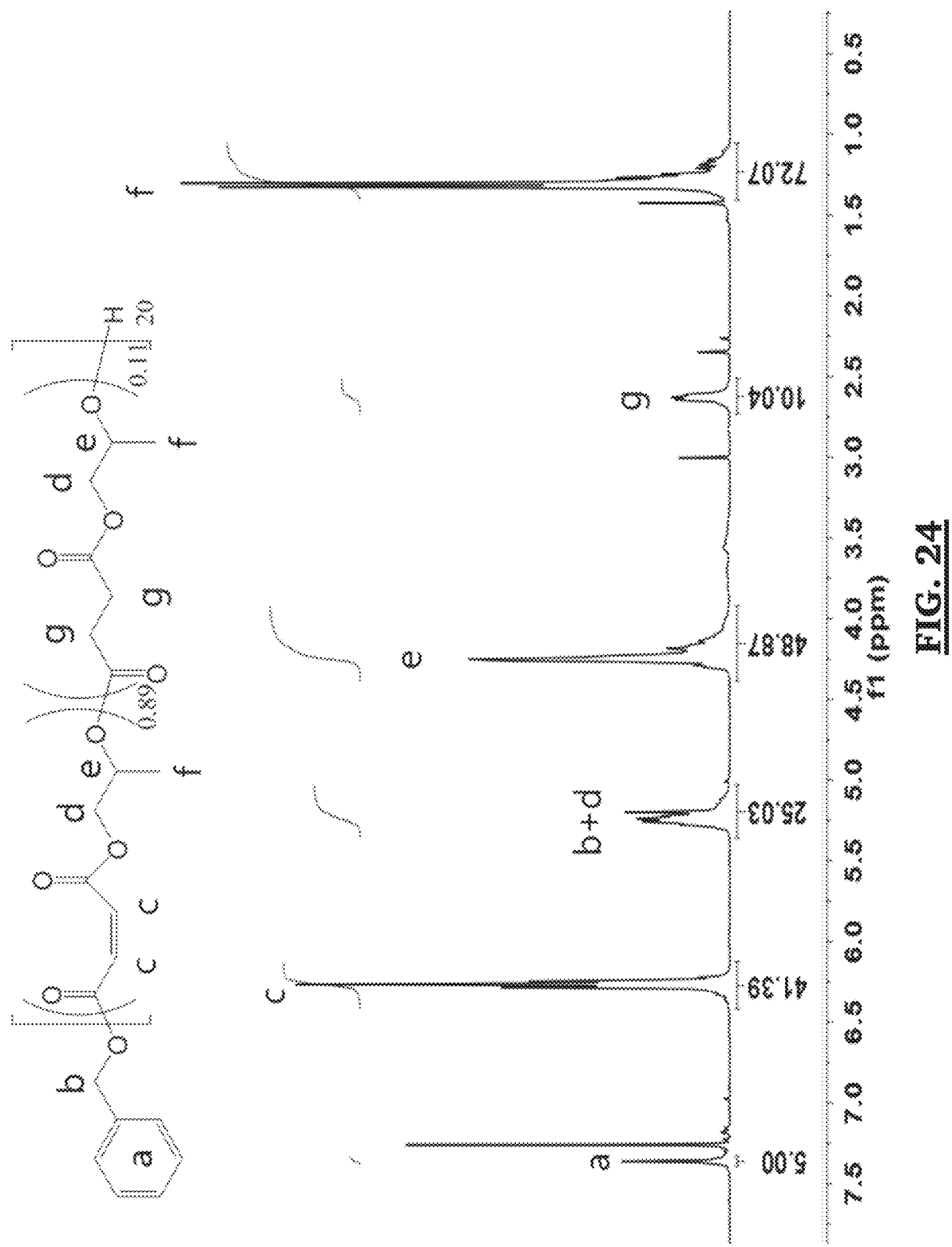
FIG. 24 is a $^1$H NMR spectrum of DP 10 and 10 mol % succinic anhydride feed copolymer after isomerization.

The polymer that was recovered from Example 7 was isomerized following procedures used in Comparative Example 3, above, and the isomerized polymer was recovered. The resulting copolymer was characterized by $^1$H NMR ((300 MHz, 298 K, CDCl$_3$): 6.99-6.76 (m, 22.1H, C=OCHCHC=O), 5.36-5.05 (m, 13.2H, CH$_2$CHCH$_3$O), 4.80-4.74 (m, 2H, CCH$_2$O), 4.40-3.98 (m, 29.7H, OCH$_2$CHCH$_3$), 2.73-2.56 (m, 5.7H, OCH$_2$CHCH$_3$), 2.56-2.49 (m, 1.0H, CHC), 1.40-0.98 (m, 48.8, CHCH$_3$). A $^1$H NMR spectrum of DP 10 with a 10 mol % succinic anhydride feed ratio copolymer after isomerization is shown in FIG. 24. In addition, the degree of polymerization was confirmed by NMR, the number average molecular weight (M$_n$) and mass distribution (Đ$_m$) for the copolymer were measured by gel permeation chromatography (GPC), and the complex viscosity of polymer in 50% DEF solution (by weight) was measured using TA instrument ARES-R2 rheometer with 25 mm diameter plate under frequency sweep mode at room temperature at 10% strain in 0.5 to 100 rad/s angular frequency range and the zero sheer viscosity was calculated by finding the y intercept of a regression curve of frequency sweep data in the range from 3 rad/s to 100 rad/s, as set forth above. The results are reported on Table 5, below.

Example 10

20%, DP=10 Copolymer Isomerization

Figure 25:
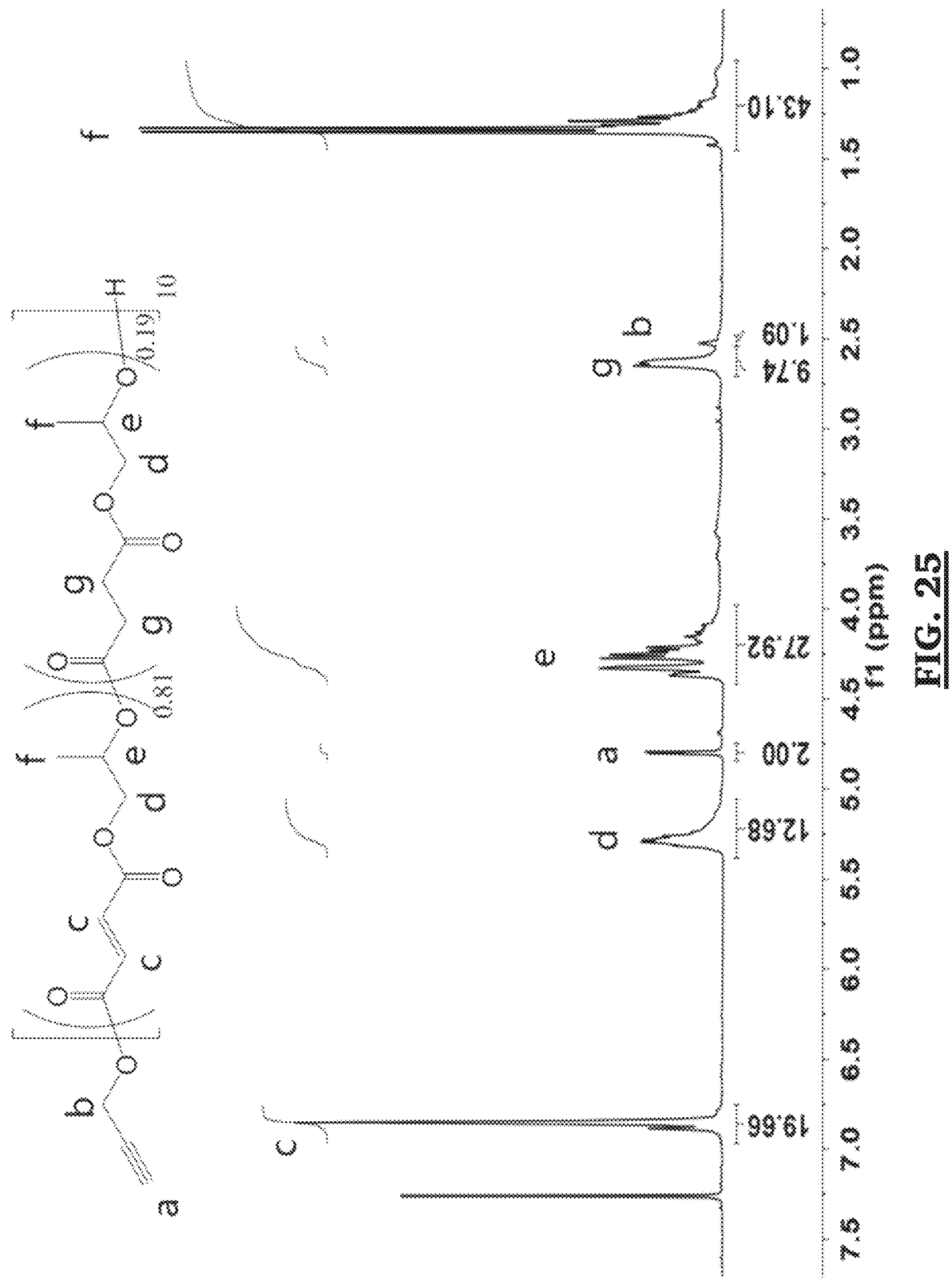
FIG. 25 is a $^1$H NMR spectrum of DP 10 and 20 mol % succinic anhydride feed copolymer after isomerization.
Figure 26:
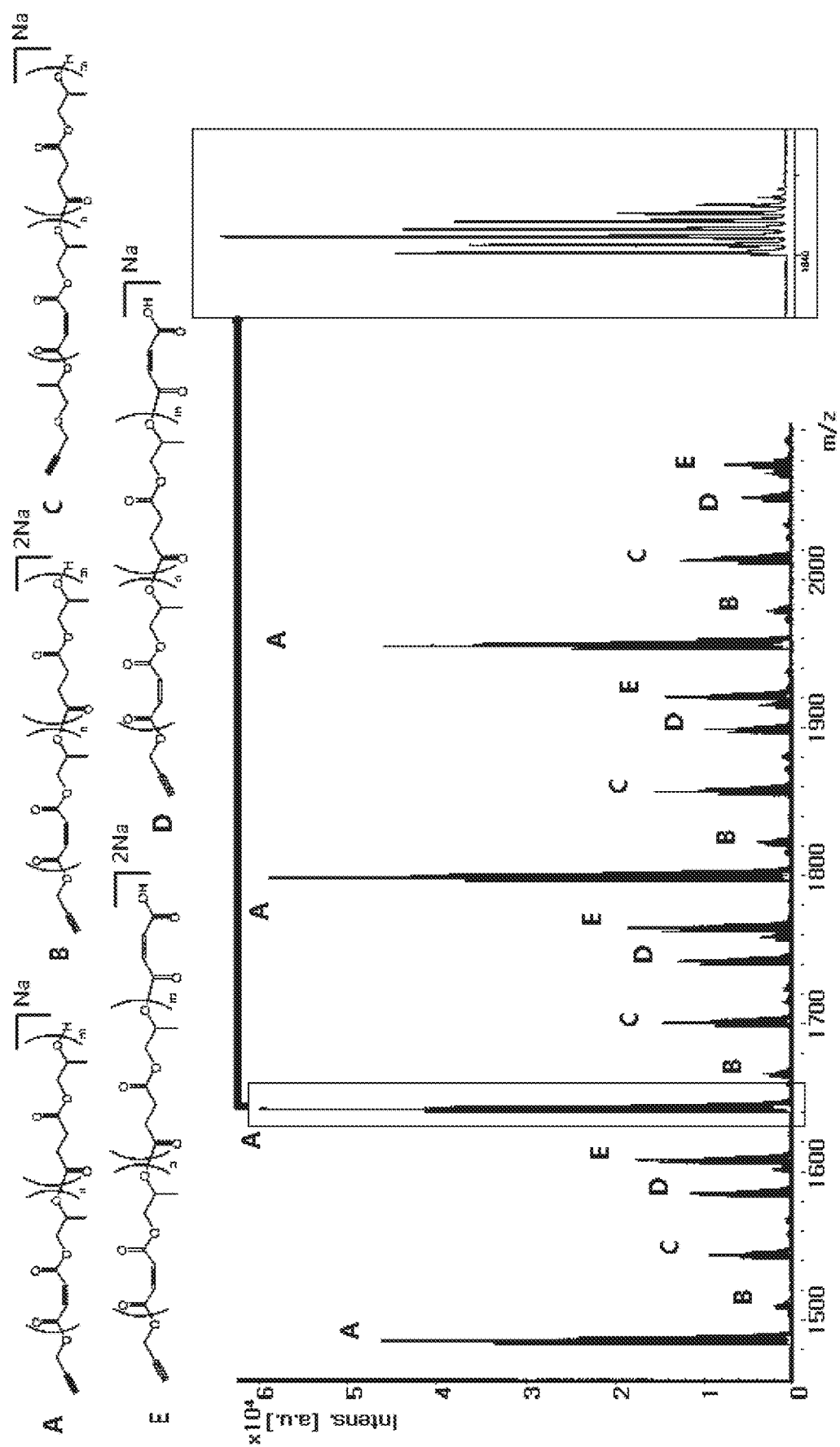
FIG. 26 SEC chromatograph for DP10, 20% succinic anhydride feed copolymer.

The polymer that was recovered from Example 8 was isomerized following procedures used in Comparative Example 3, above, and the isomerized polymer was recovered. The resulting copolymer was characterized by $^1$H NMR ((300 MHz, 298 K, CDCl$_3$): 6.99-6.76 (m, 19.7H, C=OCHCHC=O), 5.36-5.05 (m, 12.7H, CH$_2$CHCH$_3$O), 4.80-4.74 (m, 2H, CCH$_2$O), 4.40-3.98 (m, 27.9H, OCH$_2$CHCH$_3$), 2.73-2.56 (m, 9.7H, OCH$_2$CHCH$_3$), 2.56-2.49 (m, 1.1H, CHC), 1.40-0.98 (m, 43.1, CHCH$_3$). A $^1$H NMR spectrum of the DP 10 with a 20 mol % succinic anhydride feed ratio copolymer after isomerization is shown in FIG. 25. The molecular mass of the polymer was further characterized by size exclusion chromatography (SEC). A SEC chromatograph for the DP10 copolymer with a 20% succinic anhydride feed rate is shown in FIG. 26. In addition, the degree of polymerization was confirmed by NMR, the number average molecular weight ($M_n$) and molecular mass distribution ($Đ_m$) for the copolymer were measured by gel permeation chromatography (GPC), and the complex viscosity of polymer in 50% DEF solution was measured using TA instrument ARES-R2 rheometer with 25 mm diameter plate under frequency sweep mode at room temperature at 10% strain in 0.5 to 100 rad/s angular frequency range and the zero sheer viscosity was calculated by finding the y intercept of a regression curve of frequency sweep data in the range from 3 rad/s to 100 rad/s, as set forth above. The results are reported on Table 5, below.

Example 11

10%, DP=20 Copolymer Isomerization

Figure 27:
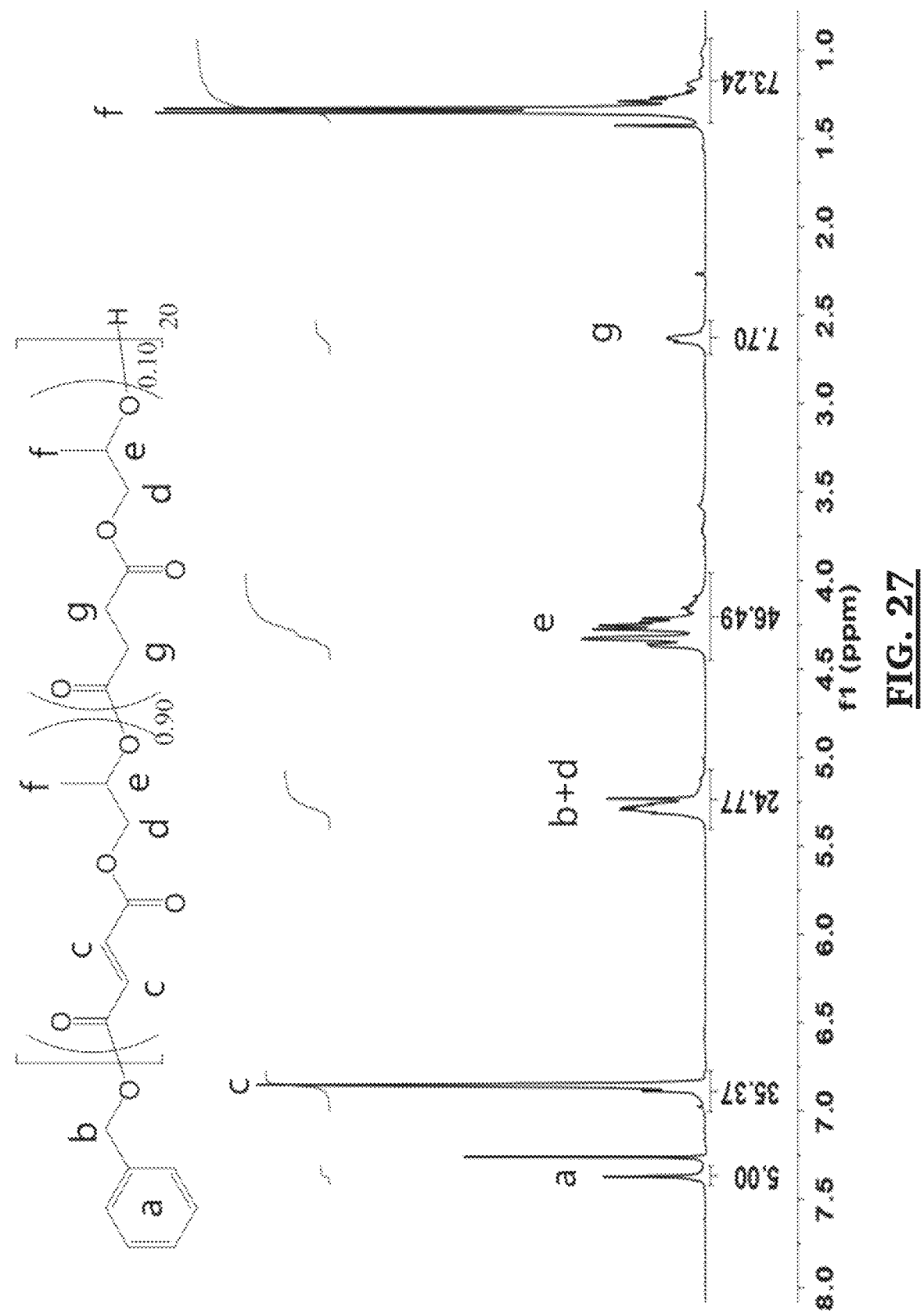
FIG. 27 is a $^1$H NMR spectrum of DP 20 and 10 mol % succinic anhydride feed copolymer after isomerization.

The polymer that was recovered from Example 2 was isomerized following procedures used in Comparative Example 3, above, and the isomerized polymer was recovered. The resulting copolymer was characterized by $^1$H NMR ((300 MHz, 298 K, CDCl$_3$): 7.37 (s, 5.0H, Ar), 6.99-6.80 (m, 35.4H, C=OCHCHC=O), 5.39-5.10 (m, 24.8H, CH$_2$CHCH$_3$O), 4.43-4.00 (m, 46.5H, OCH$_2$CHCH$_3$), 2.72-2.54 (m, 7.7H, C=OCH$_2$CH$_2$C=O), 1.40-1.08 (m, 73.2, CHCH$_3$). A $^1$H NMR spectrum of the DP 20 copolymer with 10 mol % succinic anhydride feed ration after isomerization is shown in FIG. 27. In addition, the degree of polymerization was confirmed by NMR, the number $Đ_m$ average molecular weight ($M_n$) and mass distribution ($Đ_m$) for the copolymer were measured by gel permeation chromatography (GPC), and the complex viscosity of polymer in 50% DEF solution (by weight) was measured using TA instrument ARES-R2 rheometer with 25 mm diameter plate under frequency sweep mode at room temperature at 10% strain in 0.5 to 100 rad/s angular frequency range and the zero sheer viscosity was calculated by finding the y intercept of a regression curve of frequency sweep data in the range from 3 rad/s to 100 rad/s, as set forth above. The results are reported on Table 5, below.

Example 12

20%, DP 20 Copolymer Isomerization

Figure 28:
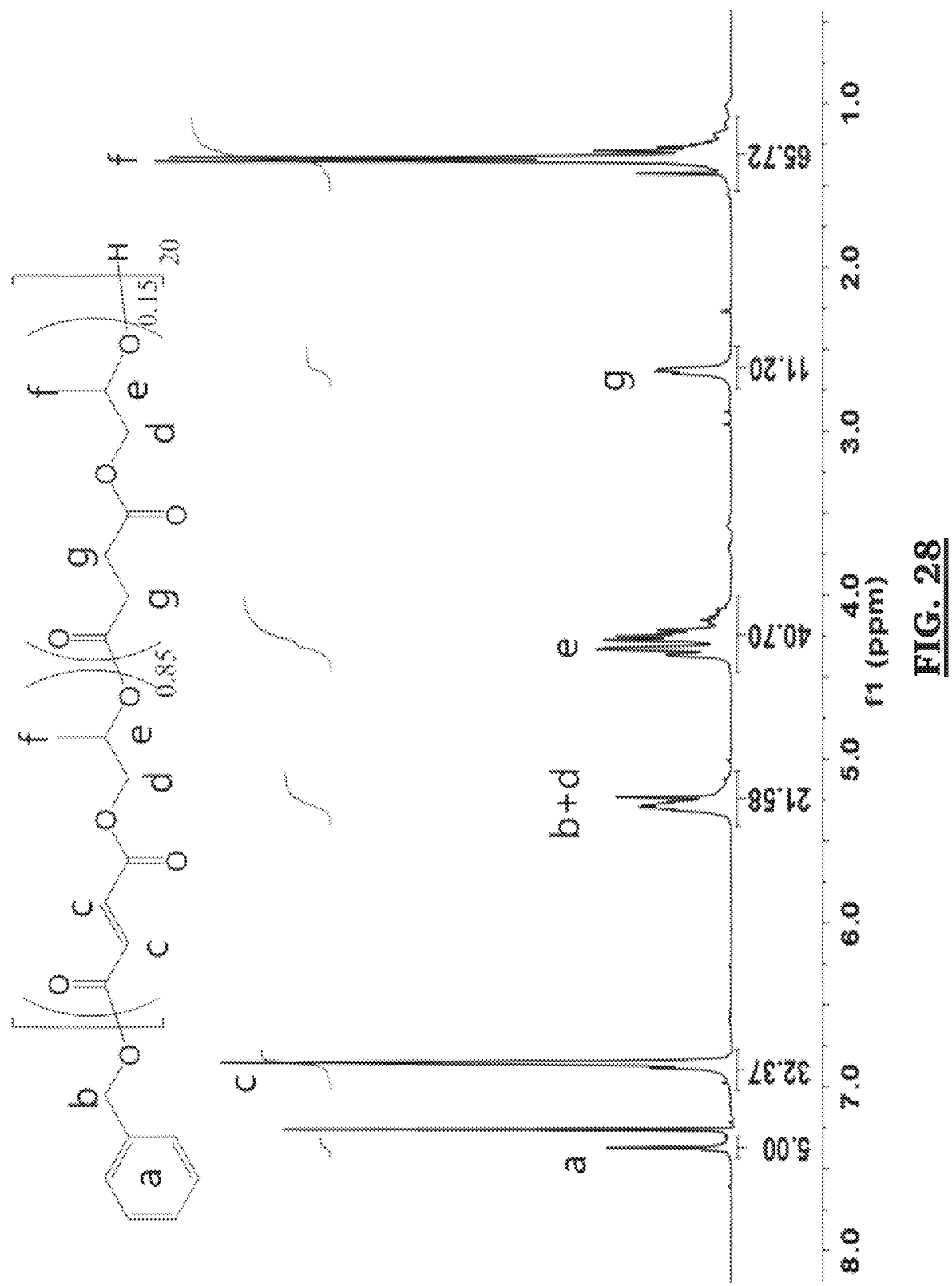
FIG. 28 is a $^1$H NMR spectrum of DP 20 and 20 mol % succinic anhydride feed copolymer after isomerization.

The polymer that was recovered from Example 3 was isomerized following procedures used in Comparative Example 3, above, and the isomerized polymer was recovered. The resulting copolymer was characterized by $^1$H NMR ((300 MHz, 298 K, CDCl$_3$): 7.37 (s, 5.0H, Ar), 6.99-6.80 (m, 32.4H, C=OCHCHC=O), 5.39-5.10 (m, 21.6H, CH$_2$CHCH$_3$O), 4.43-4.00 (m, 40.7H, OCH$_2$CHCH$_3$), 2.72-2.54 (m, 11.2H, C=OCH$_2$CH$_2$C=O), 1.40-1.08 (m, 65.7, CHCH$_3$). A $^1$H NMR spectrum of DP 20 and 20 mol % succinic anhydride feed copolymer after isomerization is shown as FIG. 28. The degree of polymerization was confirmed by NMR, the number average molecular weight ($M_n$) and mass distribution ($Đ_m$) for the copolymer were measured by gel permeation chromatography (GPC), and the complex viscosity of polymer in 50% DEF solution (by weight) was measured using TA instrument ARES-R2 rheometer with 25 mm diameter plate under frequency sweep mode at room temperature at 10% strain in 0.5 to 100 rad/s angular frequency range and the zero sheer viscosity was calculated by finding the y intercept of a regression curve of frequency sweep data in the range from 3 rad/s to 100 rad/s, as set forth above. The results are reported on Table 5, below.

TABLE 5

Polymer analysis data (after isomerization) for Examples 9-12 and Comparative Examples 3-4

| Entry | Composition Fm | SAn | Degree Polymerization Expected | NMR | GPC $M_n$ (kDa) | $Đ_M$ | Zero Sheer Viscosity* (Pa · s) |
|---|---|---|---|---|---|---|---|
| C. Example 3 | 100 | 0 | 10 | 10 | 2.2 | 1.30 | 0.703 |
| C. Example 4 | 100 | 0 | 20 | 20 | 3.2 | 1.30 | 1.166 |
| Example 9 | 89 | 11 | 10 | 13 | 1.8 | 1.37 | 0.445 |
| Example 10 | 81 | 19 | 10 | 13 | 1.6 | 1.28 | 0.101 |
| Example 11 | 90 | 10 | 20 | 23 | 2.6 | 1.37 | 0.912 |
| Example 12 | 85 | 15 | 20 | 20 | 2.0 | 1.34 | 0.500 |

*for the copolymer in a 50% DEF solution.

Example 13

Complex Viscosity of the PPF Copolymer of Comparative Examples 3 and 4 and Examples 9-12

1 g of the trans polymers produced in Comparative Examples 3 and 4 and Examples 9-12, were mixed with 1 g DEF and heated to 45° C. for 5 hours to make homogenous solution. After cooled down to the room temperature, complex viscosities of the solution were measured under frequency sweep mode from 0.5 rad/s to 100 rad/s angular frequency with 10% strain using TA instrument ARES-R2 rheometer with 25 mm diameter plate. Zero sheer viscosities were calculated by the intercept of regression curve of the complex viscosity data frequency range of from 3.0 rad/s to 100 rad/s, to exclude highly fluctuated data (unstable data).

Figure 29:
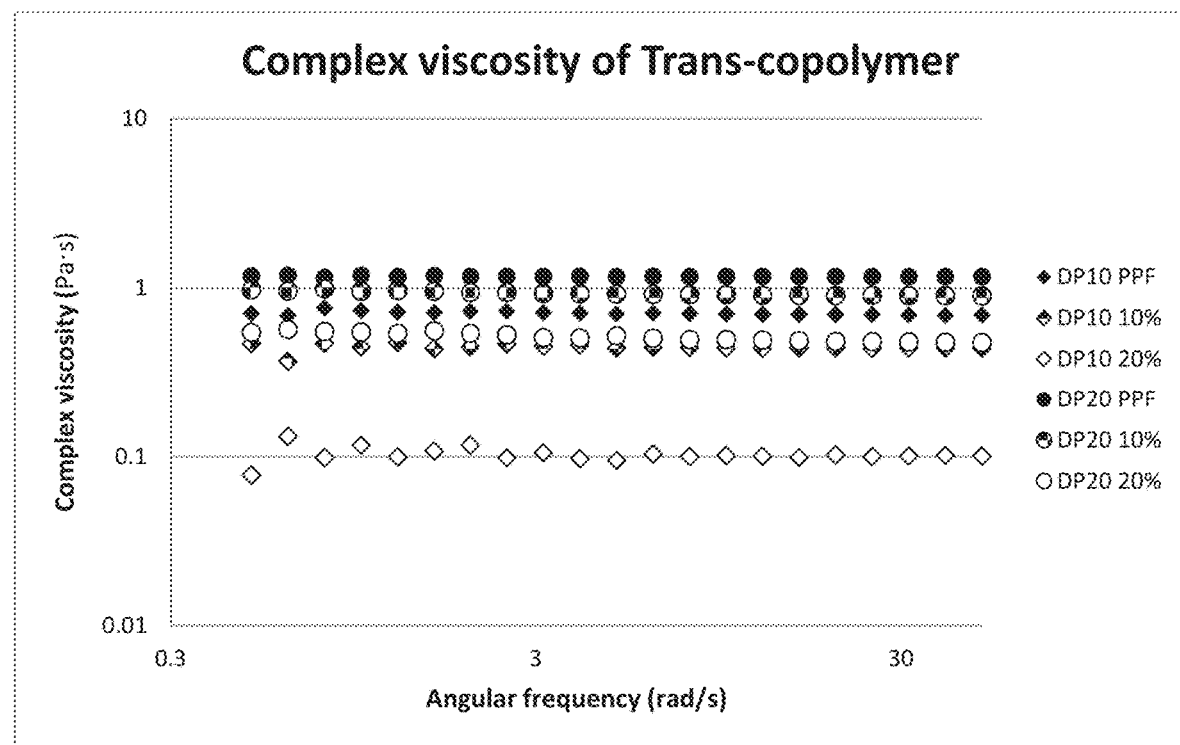
FIG. 29 is a graph showing complex viscosity data obtained for isomerized copolymers with DP 10 and DP 20 and 0, 10 or 20 mol % succinate units in a 50% solution (by weight) DEF solution using TA instrument ARES-R2 rheometer with 25 mm diameter plate under frequency sweep mode.

The frequency sweep data for isomerized copolymers solutions with a DP of 10 or 20 and having 0, 10, or 20 mole % succinate units is shown Table 6, below and in FIG. 29. As can be seen, as the content of succinate units in copolymer increases, the viscosity of copolymer/DEF solution is reduced. Copolymer solutions having a DP or 10 with a 20% succinate content have viscosities as low as 0.1 Pa·s.

TABLE 6

Complex Viscosity Results for Examples 9-12 and Comparative Examples 3-4

| | Complex Viscosity (Pa · s) | | | | | |
|---|---|---|---|---|---|---|
| Angular Frequency (rad/s) | DP10 PPF (C.Ex 3) | DP10 10% (Ex 9) | DP10 20% (Ex 10) | DP20 PPF (C.Ex 4) | DP20 10% (Ex 11) | DP20 20% (Ex 12) |
| 0.5 | 0.703901 | 0.467579 | 0.0772745 | 1.17296 | 0.968098 | 0.544875 |
| 0.629463 | 0.683699 | 0.366862 | 0.131156 | 1.18433 | 0.958519 | 0.567061 |
| 0.792447 | 0.756152 | 0.468469 | 0.0980775 | 1.15025 | 0.984082 | 0.550402 |
| 0.997631 | 0.734811 | 0.447065 | 0.115936 | 1.18324 | 0.952094 | 0.546718 |
| 1.25594 | 0.717132 | 0.473277 | 0.0989156 | 1.16399 | 0.96089 | 0.538342 |
| 1.58114 | 0.714829 | 0.43669 | 0.107443 | 1.17956 | 0.952207 | 0.555992 |
| 1.99054 | 0.7248 | 0.447248 | 0.11673 | 1.16621 | 0.936917 | 0.536908 |
| 2.50594 | 0.725384 | 0.467103 | 0.0975662 | 1.16552 | 0.937252 | 0.525661 |
| 3.15479 | 0.714643 | 0.450362 | 0.105024 | 1.1632 | 0.925644 | 0.507559 |
| 3.97164 | 0.706825 | 0.458056 | 0.0970946 | 1.16868 | 0.919568 | 0.50513 |
| 5 | 0.697849 | 0.438931 | 0.0945988 | 1.16297 | 0.919298 | 0.519987 |
| 6.29463 | 0.704538 | 0.445664 | 0.103416 | 1.16756 | 0.913645 | 0.502308 |
| 7.92447 | 0.702124 | 0.443487 | 0.0992335 | 1.16642 | 0.909694 | 0.495175 |
| 9.97631 | 0.69881 | 0.441341 | 0.101272 | 1.16545 | 0.908079 | 0.494514 |
| 12.5594 | 0.697505 | 0.440583 | 0.100379 | 1.1652 | 0.902638 | 0.490539 |
| 15.8114 | 0.696101 | 0.441241 | 0.0984171 | 1.16565 | 0.902231 | 0.486219 |
| 19.9054 | 0.693042 | 0.440765 | 0.101762 | 1.16407 | 0.899728 | 0.482542 |
| 25.0594 | 0.69375 | 0.437903 | 0.0996049 | 1.16583 | 0.900363 | 0.480237 |
| 31.5479 | 0.691366 | 0.43901 | 0.100344 | 1.16609 | 0.898091 | 0.478922 |
| 39.7164 | 0.688902 | 0.438549 | 0.101141 | 1.16455 | 0.897666 | 0.476336 |
| 50 | 0.689307 | 0.44039 | 0.100247 | 1.16397 | 0.894767 | 0.473495 |
| 62.9463 | 0.686441 | 0.43679 | 0.0994956 | 1.1643 | 0.893999 | 0.472632 |
| 79.2447 | 0.68495 | 0.436568 | 0.0987093 | 1.16092 | 0.890857 | 0.469378 |
| 100 | 0.685156 | 0.440266 | 0.0930185 | 1.16047 | 0.900608 | 0.473655 |

Example 14

24%, DP 6 Poly(propylene fumarate-co-succinate) Copolymer Synthesis

A DP 6 polymer with a 20 mol % succinic anhydride feed ratio was synthesized following same procedure shown in Comparative Example 1, except that 112 g of maleic anhydride, 29 g of succinic anhydride, 100 mL of propylene oxide and 16.6 mL of propargyl alcohol were added. 8.7 g of Mg(BHT)$_2$(THF)$_2$ and 410 mL of toluene were used and 160 g of polymer was collected. 140 g of obtained polymer was isomerized following procedures used in Comparative Example 3, above, and the trans polymer was recovered. The resulting copolymer was characterized by $^1$H NMR ((300 MHz, 298 K, CDCl$_3$): 6.99-6.76 (m, 9.0H, C=OCHCHC=O), 5.36-5.05 (m, 6.1H, CH$_2$CHCH$_3$O), 4.80-4.54 (m, 2H, CCH$_2$O), 4.40-3.98 (m, 13.7H, OCH$_2$CHCH$_3$), 2.73-2.56 (m, 5.4H, OCH$_2$CHCH$_3$), 2.56-2.49 (m, 1.1H, CHC), 1.40-0.98 (m, 21.3, CHCH$_3$). The DP that calculated by NMR is 6 and succinate content is 24%.

Example 15

16%, DP 10 Poly(propylene fumarate-co-succinate) Copolymer Synthesis

A DP 10 polymer with a 20 mol % succinic anhydride feed ratio was synthesized following same procedure shown in Comparative Example 1, except that 112 g of maleic anhydride, 29 g of succinic anhydride, 100 mL of propylene oxide and 8.3 mL of propargyl alcohol were added. 8.7 g of Mg(BHT)$_2$(THF)$_2$ and 410 mL of toluene were used and 150 g of polymer was collected. 130 g of obtained polymer was isomerized following procedures used in Comparative Example 3, above, and the trans polymer was recovered. The resulting copolymer was characterized by $^1$H NMR ((300 MHz, 298 K, CDCl$_3$): 6.99-6.76 (m, 15.2H, C=OCHCHC=O), 5.36-5.05 (m, 10.2H, CH$_2$CHCH$_3$O), 4.80-4.54 (m, 2H, CCH$_2$O), 4.40-3.98 (m, 23.2H, OCH$_2$CHCH$_3$), 2.73-2.56 (m, 5.9H, OCH$_2$CHCH$_3$), 2.56-2.49 (m, 1.0H, CHC), 1.40-0.98 (m, 36.2, CHCH$_3$). The DP that calculated by NMR is 10 and succinate content is 16%.

Example 16

26%, DP 10 Poly(propylene fumarate-co-succinate) Copolymer Synthesis

A DP 10 polymer with a 20 mol % succinic anhydride feed ratio was synthesized following same procedure shown in Comparative Example 1, except that 112 g of maleic anhydride, 29 g of succinic anhydride, 100 mL of propylene oxide and 8.3 mL of propargyl alcohol were added. 8.7 g of Mg(BHT)$_2$(THF)$_2$ and 410 mL of toluene were used and 230 g of polymer was collected. 220 g of obtained polymer was isomerized following procedures used in Comparative Example 3, above, and the trans polymer was recovered. The resulting copolymer was characterized by $^1$H NMR ((300 MHz, 298 K, CDCl$_3$): 6.99-6.76 (m, 14.7H, C=OCHCHC=O), 5.36-5.05 (m, 10.8H, CH$_2$CHCH$_3$O), 4.80-4.54 (m, 2H, CCH$_2$O), 4.40-3.98 (m, 26.8H, OCH$_2$CHCH$_3$), 2.73-2.56 (m, 10.5H, OCH$_2$CHCH$_3$), 2.56-2.49 (m, 1.1H, CHC), 1.40-0.98 (m, 40.7, CHCH$_3$). The DP that calculated by NMR is 11 and succinate content is 26%.

Example 17

Complex Viscosity of the Poly(propylene fumarate-co-succinate) Copolymers

Solutions containing the PPF (trans) copolymers of Examples 14, 15, 16 with DEF were prepared by dissolving the trans copolymers of Example 14, 15, and 16 in DEF at 45° C. at different weight ratio of polymer to DEF. The complex viscosities trans copolymer/DEF solutions having polymer contents of 50%, 70%, 80% and 90% by weight were measured by rheometer as set forth above and their zero sheer viscosities were calculated from those complex viscosities following the procedures set forth in Example 13. The results are shown on Table 7, below.

TABLE 7

Zero Sheer Viscosity Results for Examples 9-12 and Comparative Examples 3-4

| Entry | Composition | | | Zero sheer viscosity (Pa · s) | | | | |
|---|---|---|---|---|---|---|---|---|
| | DP | Fm | SAn | 50 % polymer* | 70 % Polymer* | 80 % Polymer* | 90 % polymer* | 100 % polymer* |
| Example 14 | 6 | 76 | 24 | 0.12 | 1.59 | 9.61 | 43.27 | 1090 |
| Example 15 | 10 | 84 | 16 | 0.16 | 2.29 | 14.32 | 106.31 | 3510 |
| Example 16 | 11 | 74 | 26 | 0.18 | 2.36 | 13.73 | 85.75 | 5670 |

*Weight percent polymer in DEF solution

Figure 30:
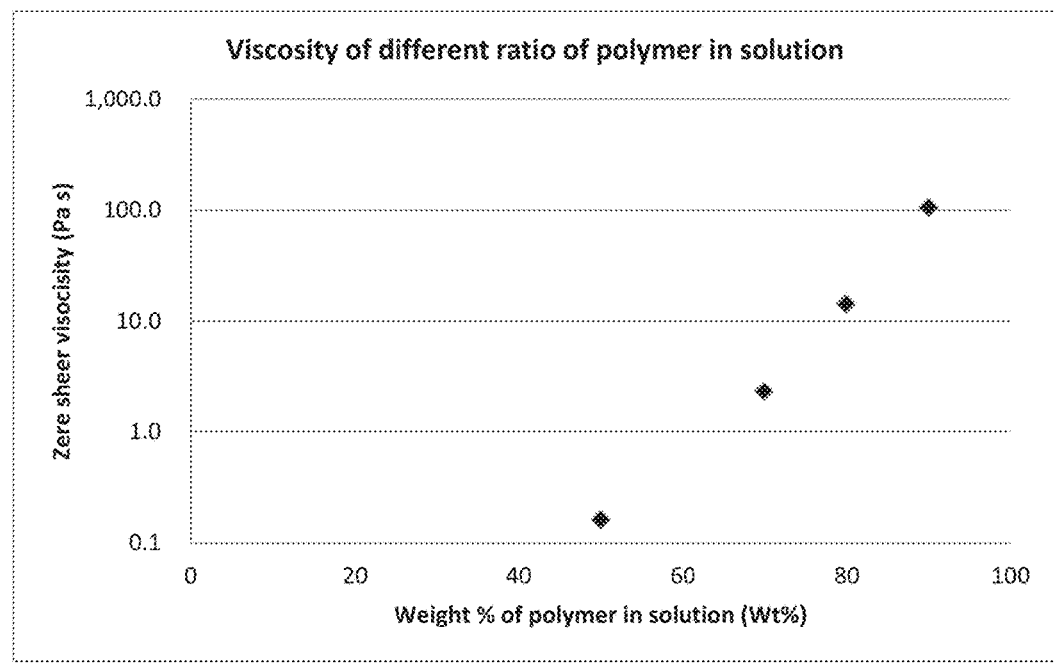
FIG. 30 is a graphs showing viscosity data for DEF solutions containing different concentrations of isomerized copolymers according to various embodiments of the present invention.

As can be seen, the zero sheer viscosity of copolymer/DEF solution increased with an increase in the polymer content of the solution. (See, Table 7; FIG. 30) The zero sheer viscosity of the 70% polymer solutions were found to be in the 3D printable range of around 2 Pa·s. (See also, Tables 7A-7R in Appendix A)

Comparative Example 5

Figure 31:
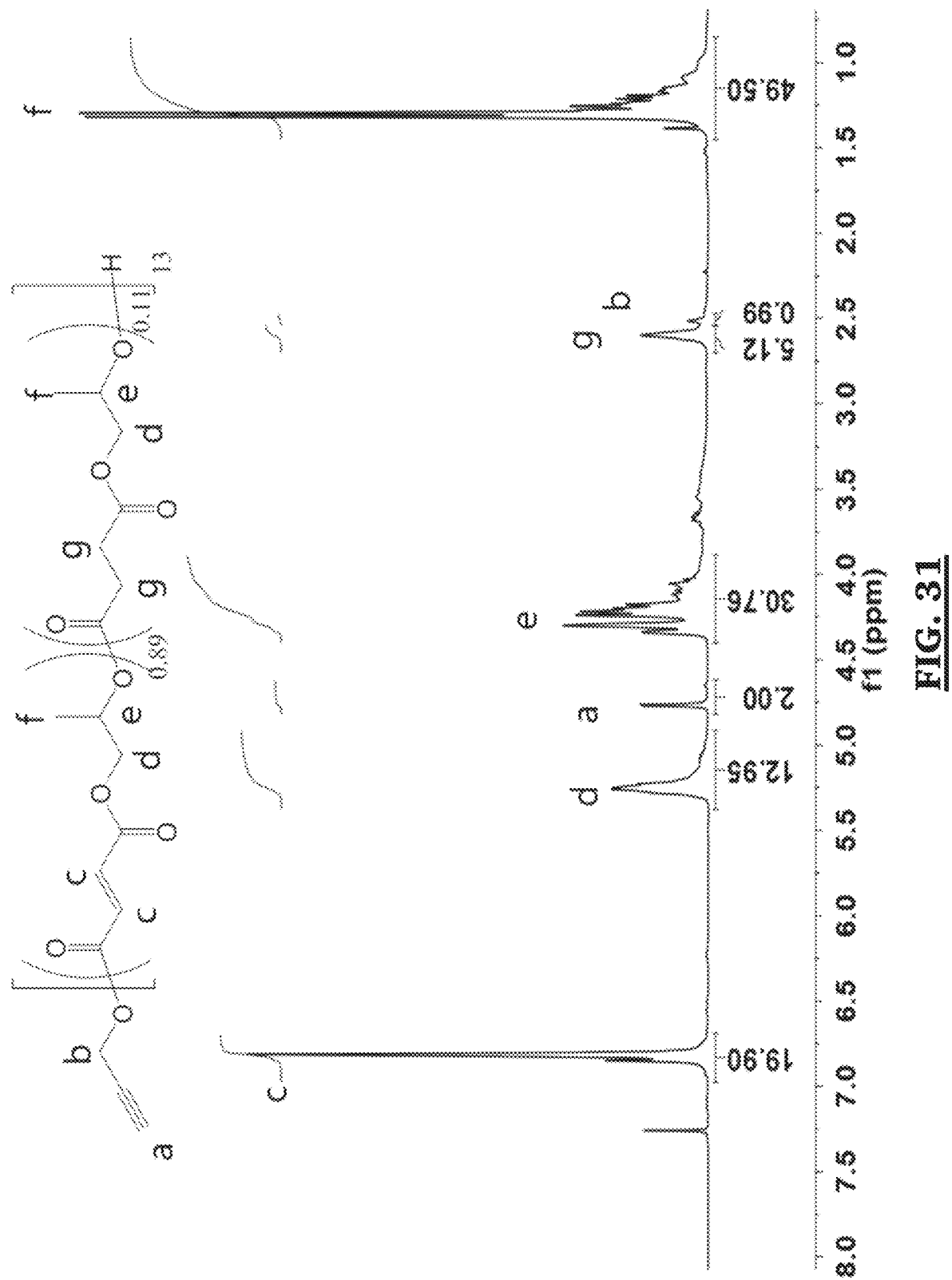
FIG. 31 is a $^1$H NMR spectrum of DP 13 and 11 mol % succinic anhydride feed copolymer after isomerization.

10%, DP 10 Poly(propylene fumarate-co-succinate) Copolymer Synthesis Maleic Anhydride and Succinic Anhydride Added Before the Initiating Alcohol A DP 10 polymer with a 10 mol % succinic anhydride feed ratio was synthesized following same procedure shown in Comparative Example 1, except that 2.524 g of maleic anhydride, 0.286 g of succinic anhydride and 348 mg of Mg(BHT)$_2$(THF)$_2$ are mixed first, and then 8.2 mL of toluene, 165 µL of propargyl alcohol and 2 mL of propylene oxide were added. After the purification process, 3.8 g of polymer was collected. 1 g of obtained polymer was isomerized following procedures used in Comparative Example 3, above, and the trans polymer was recovered. The resulting copolymer was characterized by $^1$H NMR ((300 MHz, 298 K, CDCl$_3$): 6.99-6.76 (m, 19.9H, C=OCHCHC=O), 5.36-5.05 (m, 13.0H, CH$_2$CHCH$_3$O), 4.80-4.54 (m, 2H, CCH$_2$O), 4.40-3.98 (m, 30.8H, OCH$_2$CHCH$_3$), 2.73-2.56 (m, 5.1H, OCH$_2$CHCH$_3$), 2.56-2.49 (m, 1.0H, CHC), 1.40-0.98 (m, 49.5, CHCH$_3$). (See FIG. 31) The DP that calculated by NMR is 13 and succinate content is 11%.

Comparative Example 6

Figure 32:
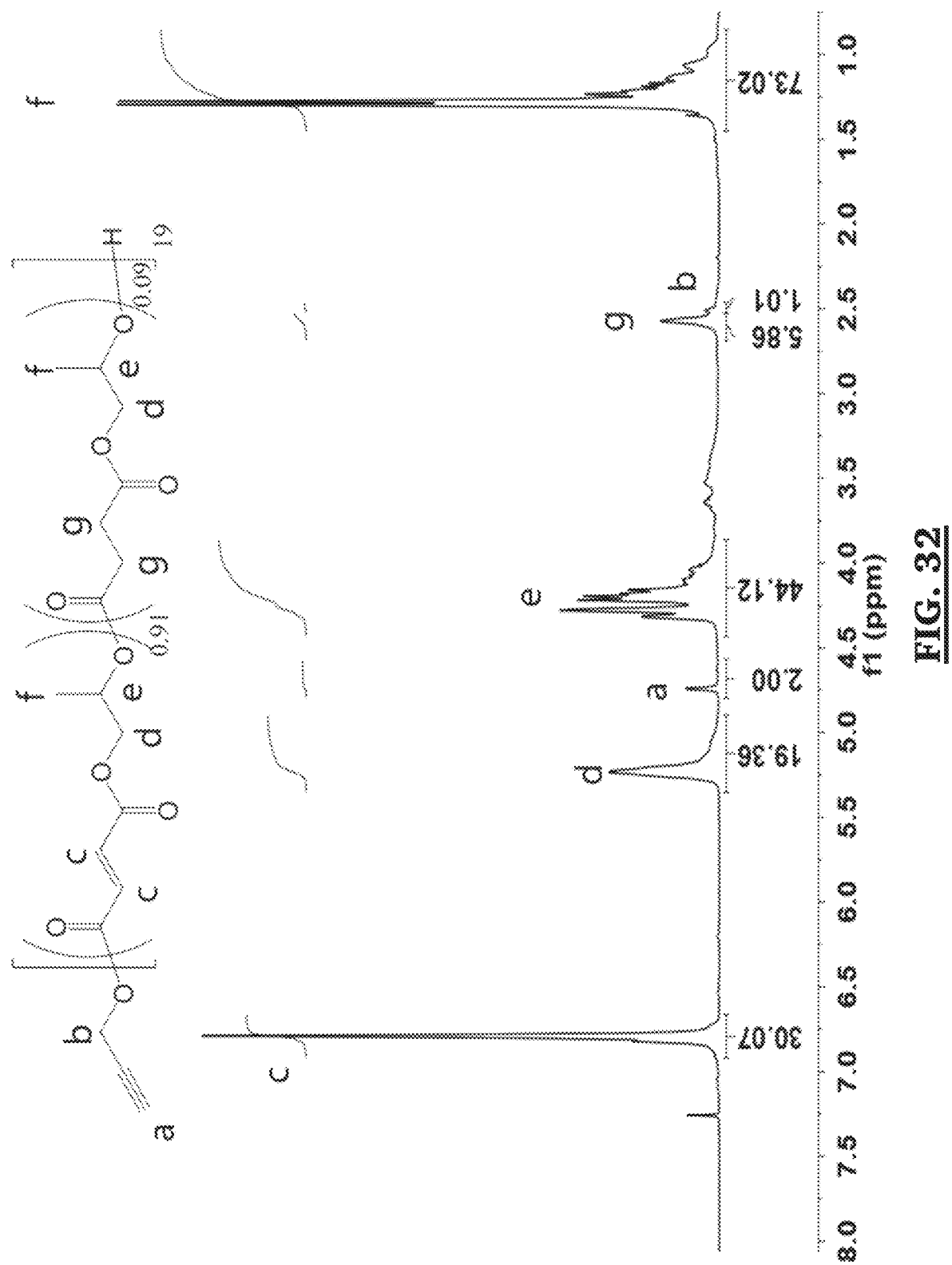
FIG. 32 is a $^1$H NMR spectrum of DP 19 and 9 mol % succinic anhydride feed copolymer after isomerization.

10%, DP 20 Poly(propylene fumarate-co-succinate) Copolymer Synthesis Maleic Anhydride and Succinic Anhydride Added Before the Initiating Alcohol A DP 20 polymer with a 10 mol % succinic anhydride feed ratio was synthesized following same procedure shown in Example 18, except that 83 µL of propargyl alcohol were added. After the purification process, 3.9 g of polymer was collected. 1 g of obtained polymer was isomerized following procedures used in Comparative Example 3, above, and the trans polymer was recovered. The resulting copolymer was characterized by $^1$H NMR ((300 MHz, 298 K, CDCl$_3$): 6.99-6.76 (m, 30.7H, C=OCHCHC=O), 5.36-5.05 (m, 19.4H, CH$_2$CHCH$_3$O), 4.80-4.54 (m, 2H, CCH$_2$O), 4.40-3.98 (m, 44.12H, OCH$_2$CHCH$_3$), 2.73-2.56 (m, 5.9H, OCH$_2$CHCH$_3$), 2.56-2.49 (m, 1.0H, CHC), 1.40-0.98 (m, 73.0, CHCH$_3$). (See FIG. 32) The DP that calculated by NMR is 19 and succinate content is 9%.

Example 20

Comparative Absorbance of the Trans Copolymers

The absorbance of the PPF (trans) copolymers produced in Comparative Examples 3-6, and in Examples 9-12 and 14-16 were measured in 1% THF solution using a BioTek Synergy Mx microplate reader, as set forth above. The absorbance at 360 and 405 nm is summarized in Table 8, below.

TABLE 8

Absorbance Results for Examples 9-12, 14-16, and Comparative Examples 3-6

| Entry | Composition (Mol %) | | | Absorbance | |
|---|---|---|---|---|---|
| | DP | Fm | SAn | 360 nm | 405 nm |
| C. Example 3 | 10 | 100 | 0 | 0.028 | 0.039 |
| C. Example 4 | 20 | 100 | 0 | 0.035 | 0.017 |
| C. Example 5 | 10 | 89 | 11 | 1.747 | 1.090 |
| C. Example 6 | 20 | 91 | 9 | 1.797 | 1.103 |
| Example 9 | 10 | 89 | 11 | 0.069 | 0.036 |
| Example 10 | 10 | 80 | 20 | 0.076 | 0.045 |
| Example 11 | 20 | 90 | 10 | 0.112 | 0.066 |
| Example 12 | 20 | 85 | 15 | 0.167 | 0.101 |
| Example 14 | 6 | 76 | 24 | 0.043 | 0.026 |
| Example 15 | 10 | 84 | 16 | 0.319 | 0.187 |
| Example 16 | 11 | 74 | 26 | 0.069 | 0.036 |

As can be seen, the polymers made by adding the maleic anhydride and succinic anhydride before the initiating alcohol (Comparative Examples 5 and 6) both have much higher absorbance in 360 nm and 405 nm wavelength of photo initiator, than do the other polymers (Comparative Examples 3 and 4 and Examples 9-12, 14-16) where the initiating alcohol was added before the maleic anhydride or succinic anhydride. Moreover, all of these polymers (Comparative Examples 3 and 4 and Examples 9-12, 14-16) have an absorbance at the wavelength ranges of the photo initiator (from about 360 nm and about 405 nm) low enough that their absorbance does not substantially interfere with the 3D printing process. This is true without respect to the presence of succinic anhydride in the polymer as can be seen by comparing the absorbance of polymers of Comparative Examples 3 and 4 to the absorbance of the polymers of Comparative 5 and 6.

Example 21

Characterization and Analysis of the Effects of the Order of Addition on Polymer Absorbance Characterization Techniques Proton ($^1$H) NMR experiments were performed in CDCl$_3$ at 25° C. using a Varian Mercury 300 spectrometer. All chemical shifts were recorded in parts per million (ppm) relative to the reference peak solvent: chloroform at δ=7.26.

The dispersities ($Đ$) of polymers were determined by size exclusion chromatography (SEC) on a Tosoh EcoSEC HLC-8320GPC with TSKgel GMHHR-M columns in series. The detector used in this determination is a refractive index detector. Dimethylformamide (DMF) was used as eluent (0.2 mL.min$^{-1}$) at 40° C. in the presence of LiBr (1 g.L$^{-1}$). Molecular masses were calculated through a calibration curve determined from polystyrene standards. The sample concentration is 10 mg.mL$^{-1}$.

Rheological information was obtained using an ARES-G2 rheometer using a 50 mm diameter parallel plate flow cell with a geometry gap of 0.3 mm with environmental conditions set to 25° C. The temperature was controlled with a Peltier system. Oscillatory shear measurements were done in the linear response regime. Samples were loaded onto the rheometer, and it was verified that the system was stable before the frequency dependence of the storage (G'), loss (G") moduli and the zero-shear viscosity η$_0$. (See Tables 12-13 in Appendix B.)

Kinetic Studies

Kinetic studies of the ring opening copolymerization (ROCOP) of maleic anhydride (MAn) and propylene oxide (PO) using propargyl alcohol (PrOH) as initiator were performed to investigate the influence of the order of addition of the reactive species. In both cases, the total target DP was 20, and the molar ratios were [MAn]$_0$: [PO]$_0$: [PrOH]$_0$:[Cat.]$_0$=20:20:1:0.2, corresponding to 5 g of MAn (5.10×10$^{-2}$ mol), 3.6 mL of PO (5.10×10$^{-2}$ mol), 0.147 mL of PrOH (2.55×10$^{-3}$ mol) and 0.308 mg of catalyst (5.10× 10$^{-4}$ mol). The total monomer concentration was 7 M. (See, Tables 9-11 in Appendix B)

For kinetic studies, the mixture was split in several vials, immersed in a preheated bath at 80° C. (corresponding to the time zero of the reaction), polymerizations were conducted under stirring and stopped by cooling down to ambient temperature and by adding an excess of chloroform. The monomer conversions were determined by $^1$H NMR in CDCl$_3$ of crude samples from reactional volumes and the dispersity by DMF GPC after precipitation in diethyl ether and drying. (See, Tables 9-11 in Appendix B)

DISCUSSION

Due to the huge influence of the order of addition of the reactive species on the color of the final polymer obtained, the possible impact on the kinetic of polymerization as well as the polymerization process as investigated. Various aliquots of crude product were analyzed by $^1$H NMR at different polymerization times to calculate the conversion of the MAn monomer and the ln([M$_0$]/[M$_t$]) values and the SEC in DMF provided the dispersity over time. (See, Table 9 in Appendix B)

Figure 33A:
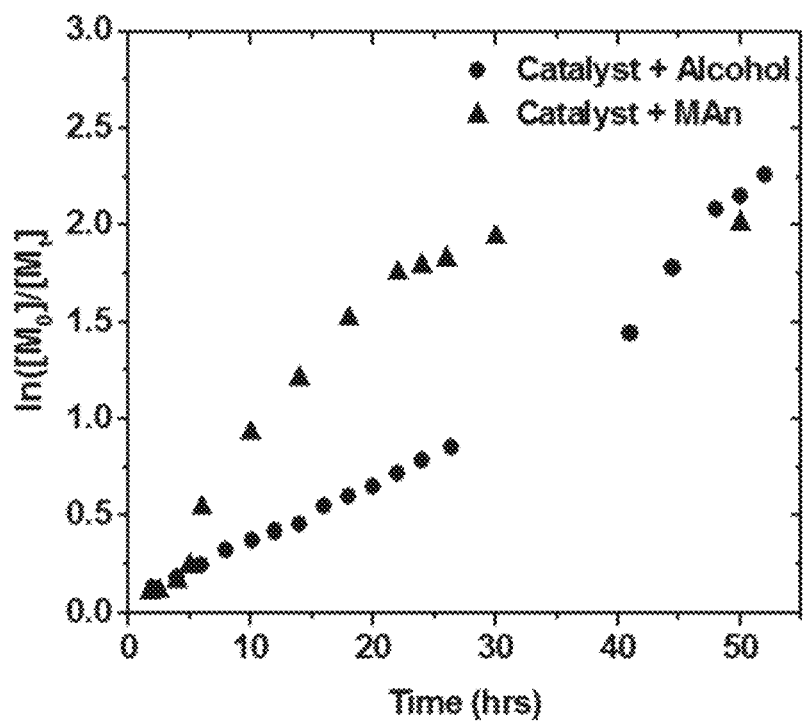
FIGS. 33A-D are kinetic plots for the copolymerization of maleic anhydride and propylene oxide, conducted at 80° C. in toluene with $[MAn]_0$: $[PO]_0$: $[PrOH]_0$: $[Cat.]_0$=20:20:1: 0.2, total initial monomer concentration of 7 M with 2 different addition orders of addition of reactive species where
Figure 33B:
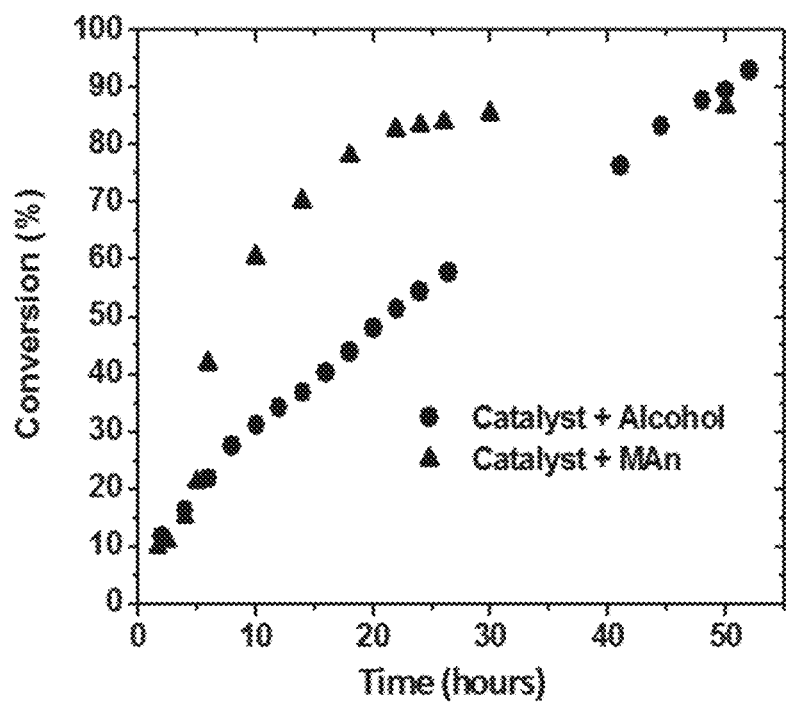
Figure 33C:
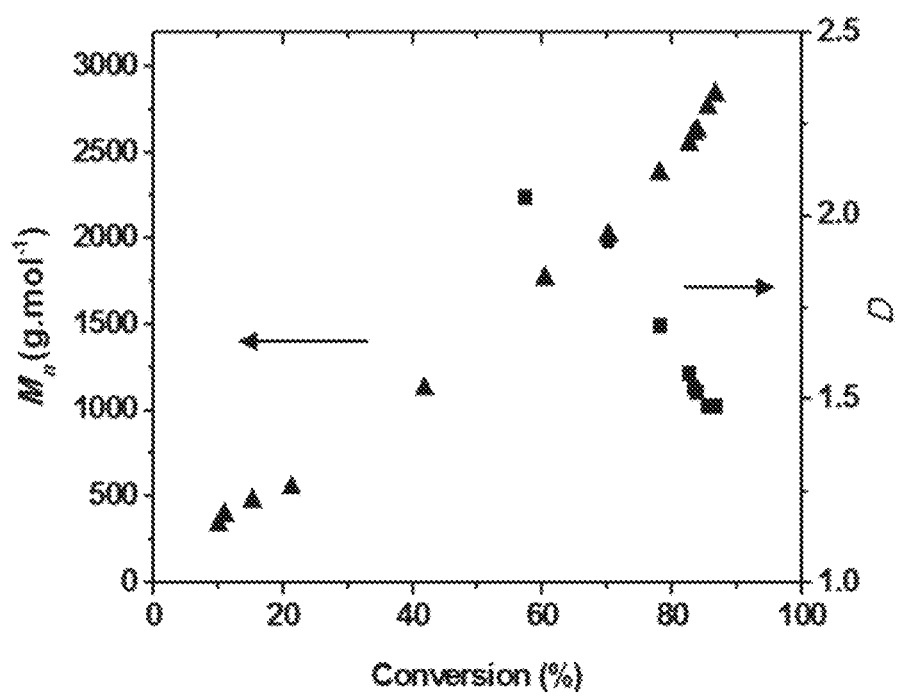

FIGS. 33A-C show the evolution of the ln([M$_0$]/[M$_t$]) values and the conversion of MAn with time respectively. For the first order of addition (black triangle, corresponding to the addition of Man and catalyst first), the kinetics plots revealed a slow initiation step followed by a faster polymerization step undergoing a drastic slowdown after 22 hrs, corresponding to only 81% of conversion. Despite 50 hrs of polymerization, the maximum of conversion was 85%. Moreover, although FIG. 33C shows a linear molar mass growth over the polymerization, the dispersity value ranged from 2.1 at 58% of conversion to 1.45 at 85%, supporting the idea of a slow and inhomogeneous initiation step leading to various populations of growing chains.

On the contrary, the kinetic plots corresponding to the couple catalyst+alcohol (circles on FIG. 33A), revealed a linear pseudo-first order behavior with an initiation step as fast as the polymerization step which is characteristic of a constant concentration of propagating species during the polymerization.

Figure 33D:
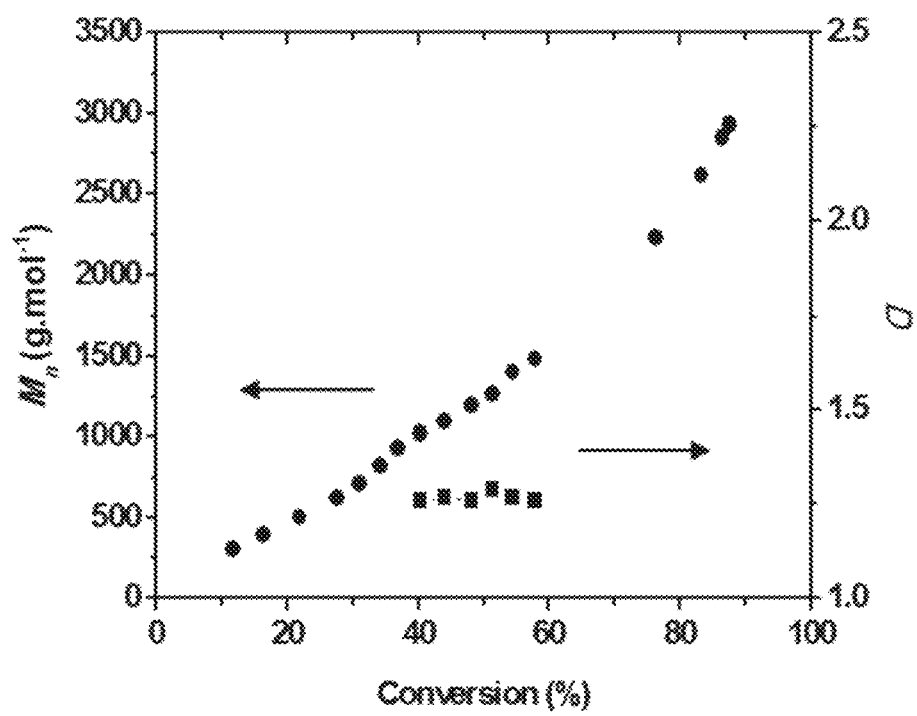

As a consequence of the pseudo-first order kinetics, it can be assumed that the number of active chains is maintained and no termination side reactions occur throughout the polymerization. Linear molar mass growth and the dispersity stayed low during the polymerization (FIG. 33D), providing further evidence of controlled ROCOP. In addition, the final conversion reached after 52 hrs of polymerization was 95%, 10% higher than previously.

The traces indicate very different polymerization kinetics. Indeed, the calculated propagation constants k$_{Cat+Man}$ and k$_{Cat+PrOH}$ corresponding to the couples Catalyst+MAn (maleic anhydride added before the propargyl alcohol) and Catalyst+alcohol (propargyl alcohol added before the maleic anhydride), respectively are 5.88×10$^{-5}$ L.mol$^{-1}$.s$^{-1}$ and 2.34×10$^{-5}$ L.mol$^{-1}$.s$^{-1}$ (see, the linear part of the graphs in FIGS. 33A-B). As a consequence, the polymerization results in the formation of a polymer that is less polydispersed, with a higher conversion, and a lighter color (lower absorbance), but takes nearly twice as long.

This information is of primary importance, on the one hand in order to synthesize polymers of controlled molar mass and in a reproducible manner and on the other hand to develop a scale up protocol.

In order to measure the complex viscosity of the printable resins and to investigate the differences between the clear and the dark polypropylene fumarate (PPF, $\overline{M}_n$=3 KDa, DP 20), the polymers were mixed with diethyl fumarate (DEF) to reach 50:50 and 60:40 (PPF:DEF) weight ratios. (See Tables 12-13 in Appendix B)

Figure 34A:
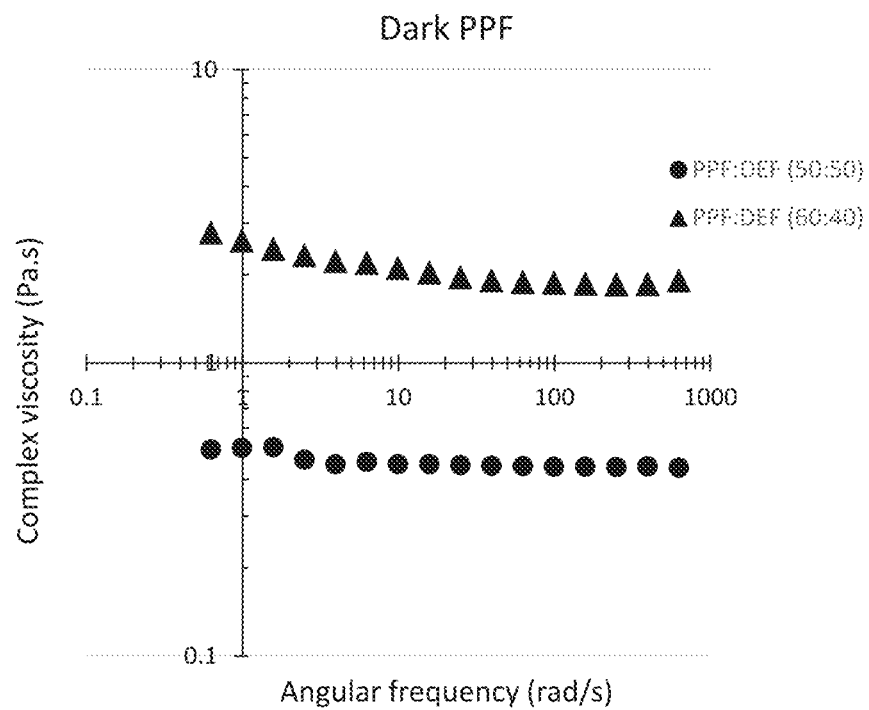
FIGS. 34A-B are graphs showing the evolution of the complex viscosity with the angular frequency of the PPF: DEF resins made using with 2 different orders of addition for reactive species, namely a dark PPF where the maleic anhydride is added before the initiating alcohol (FIG. 34A) and a light PPF where the initiating alcohol is added before the maleic anhydride and/or succinic anhydride (FIG. 34B).
Figure 34B:
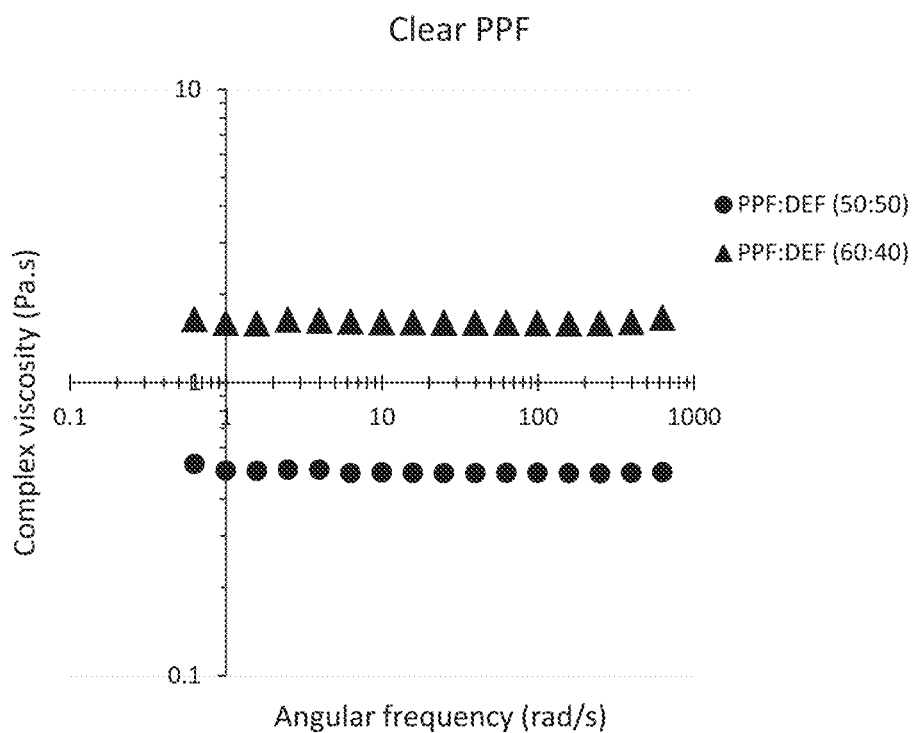

FIGS. 34A-B show the evolutions of the complex viscosity with the angular frequency of the resin based on dark and clear PPF respectively. Regarding the dark PPF, the complex viscosity values are 2.4 and 0.5 Pa·s for PPF:DEF ratios of 60:40 and 50:50 respectively while they are equal to 1.60 and 0.5 Pa·s for the clear PPF. These results suggest that both formulations have very similar rheological properties, even if the light PPF-based resin (60:40) seems to be slightly less viscous than its darker counterpart.

In light of the foregoing, it should be appreciated that the present invention significantly advances the art by providing a PPF-based 3D-printable polymer that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

APPENDIX A

The Tables in this Appendix are Complementary of Table 7

TABLE 7A

Summary of Complex Viscosity Results for Example 14
Example 14

| Angular frequency (rad/s) | Complex viscosity (Pa · s) | | | | |
|---|---|---|---|---|---|
| | 50% | 70% | 80% | 90% | 100% |
| 0.5 | 0.206537 | 1.61805 | 9.2989 | 43.4254 | 1099.19 |
| 0.629463 | 0.105637 | 1.57993 | 9.93337 | 43.8326 | 1082.6 |
| 0.792447 | 0.149983 | 1.57747 | 9.58983 | 43.9737 | 1079.13 |
| 0.997631 | 0.10604 | 1.58106 | 9.60137 | 44.1576 | 1078.11 |
| 1.25594 | 0.105959 | 1.60365 | 9.71661 | 43.7502 | 1078.5 |
| 1.58114 | 0.103188 | 1.59298 | 9.66137 | 43.7588 | 1080.32 |
| 1.99054 | 0.10435 | 1.59765 | 9.50725 | 43.0833 | 1082 |

TABLE 7A-continued

Summary of Complex Viscosity Results for Example 14
Example 14

| Angular frequency (rad/s) | Complex viscosity (Pa · s) | | | | |
|---|---|---|---|---|---|
| | 50% | 70% | 80% | 90% | 100% |
| 2.50594 | 0.124924 | 1.58682 | 9.47201 | 43.4411 | 1082.84 |
| 3.15479 | 0.107352 | 1.59131 | 9.70096 | 43.2462 | 1083.81 |
| 3.97164 | 0.112914 | 1.59563 | 9.69355 | 43.0501 | 1084.49 |
| 5 | 0.116272 | 1.59964 | 9.59834 | 42.8438 | 1084.36 |
| 6.29463 | 0.118903 | 1.59413 | 9.63991 | 42.8354 | 1086.22 |
| 7.92447 | 0.116895 | 1.59508 | 9.60374 | 42.7852 | 1088.27 |
| 9.97631 | 0.118496 | 1.59333 | 9.605 | 42.73 | 1089.06 |
| 12.5594 | 0.120124 | 1.59194 | 9.59835 | 42.638 | 1089.52 |
| 15.8114 | 0.11881 | 1.59259 | 9.62414 | 42.611 | 1094.34 |
| 19.9054 | 0.118605 | 1.59164 | 9.59596 | 42.5609 | 1094.03 |
| 25.0594 | 0.120536 | 1.58528 | 9.60065 | 42.5313 | 1094.01 |
| 31.5479 | 0.118694 | 1.59037 | 9.61612 | 42.4953 | 1093.68 |
| 39.7164 | 0.118403 | 1.58943 | 9.62499 | 42.4547 | 1092.83 |
| 50 | 0.119006 | 1.58953 | 9.63018 | 42.439 | 1091.24 |
| 62.9463 | 0.119122 | 1.58815 | 9.63468 | 42.4197 | 1083.18 |
| 79.2447 | 0.120101 | 1.58757 | 9.64316 | 42.3993 | 1079.81 |
| 100 | 0.118058 | 1.58187 | 9.65312 | 42.3872 | 1075.98 |

TABLE 7B

Complex Viscosity Results for Example 14 at 50% Polymer Content
Example 14 (50% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1405 | 23.747 | 9.96326 | 0.010289 | 6.29864 | 0.016193 | 0.101991 | 0.206537 |
| 0.629463 | 45.1432 | 23.747 | 9.96139 | 6.62E-03 | −26.8342 | −2.48E-03 | 0.066448 | 0.105637 |
| 0.792447 | 61.0327 | 23.741 | 9.95845 | 0.011836 | 18.9525 | 6.26E-03 | 0.118688 | 0.149983 |
| 0.997631 | 73.6617 | 23.736 | 9.95808 | 0.010535 | −13.4739 | −7.83E-03 | 0.105499 | 0.10604 |
| 1.25594 | 83.7063 | 23.736 | 9.96121 | 0.013236 | 4.41149 | 0.02942 | 0.129786 | 0.105959 |
| 1.58114 | 91.69 | 23.733 | 9.95875 | 0.016248 | 6.5605 | 0.024585 | 0.161291 | 0.103188 |
| 1.99054 | 98.039 | 23.73 | 9.95623 | 0.02068 | −16.6851 | −0.01243 | 0.207341 | 0.10435 |
| 2.50594 | 103.084 | 23.727 | 9.96032 | 0.031181 | 15.3363 | 0.020369 | 0.312388 | 0.124924 |
| 3.15479 | 107.097 | 23.722 | 9.95678 | 0.033721 | 61.4164 | 5.51E-03 | 0.338626 | 0.107352 |
| 3.97164 | 110.298 | 23.725 | 9.9571 | 0.044653 | −20.4784 | −0.02187 | 0.447921 | 0.112914 |
| 5 | 112.841 | 23.728 | 9.96169 | 0.057913 | −31.95 | −0.01819 | 0.581076 | 0.116272 |
| 6.29463 | 121.889 | 23.725 | 9.95648 | 0.074518 | 111.798 | 6.69E-03 | 0.748423 | 0.118903 |
| 7.92447 | 129.092 | 23.724 | 9.95662 | 0.092229 | −70.2543 | −0.01318 | 0.926235 | 0.116895 |
| 9.97631 | 134.808 | 23.718 | 9.95781 | 0.117712 | 136.61 | 8.65E-03 | 1.18212 | 0.118496 |
| 12.5594 | 139.869 | 23.719 | 9.95819 | 0.150229 | −308.139 | −4.90E-03 | 1.50868 | 0.120124 |
| 15.8114 | 147.137 | 23.715 | 9.95518 | 0.186995 | 161.102 | 0.011661 | 1.87852 | 0.11881 |
| 19.9054 | 153.512 | 23.716 | 9.95377 | 0.23496 | 89.3931 | 0.026409 | 2.36073 | 0.118605 |
| 25.0594 | 158.861 | 23.711 | 9.95011 | 0.300476 | −56.1392 | −0.0538 | 3.02007 | 0.120536 |
| 31.5479 | 170.227 | 23.709 | 9.94347 | 0.372191 | 57.8437 | 0.064726 | 3.74398 | 0.118694 |
| 39.7164 | 176.806 | 23.709 | 9.93369 | 0.466843 | 60.5806 | 0.077614 | 4.70189 | 0.118403 |
| 50 | 182.468 | 23.705 | 9.91817 | 0.589584 | 46.4806 | 0.127988 | 5.94895 | 0.119006 |
| 62.9463 | 190.444 | 23.704 | 9.89398 | 0.740729 | 45.5858 | 0.164448 | 7.4965 | 0.119122 |
| 79.2447 | 197.254 | 23.704 | 9.85816 | 0.935962 | 29.9751 | 0.317331 | 9.51204 | 0.120101 |
| 100 | 202.603 | 23.708 | 9.80406 | 1.15282 | −114.379 | −0.10321 | 11.8053 | 0.118058 |

TABLE 7C

Complex Viscosity Results for Example 14 at 70% Polymer Content
Example 14 (70% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1403 | 23.662 | 9.96332 | 0.080606 | −465.933 | −1.74E-03 | 0.809022 | 1.61805 |
| 0.629463 | 45.1452 | 23.66 | 9.96155 | 0.099069 | −682.868 | −1.46E-03 | 0.994508 | 1.57993 |
| 0.792447 | 61.0348 | 23.656 | 9.95799 | 0.124481 | −26.3248 | −0.04745 | 1.24916 | 1.57747 |
| 0.997631 | 73.6642 | 23.654 | 9.95803 | 0.157069 | −160.926 | −9.80E-03 | 1.57728 | 1.58106 |
| 1.25594 | 83.7065 | 23.65 | 9.96139 | 0.200632 | 209.936 | 9.59E-03 | 2.01407 | 1.60365 |

TABLE 7C-continued

Complex Viscosity Results for Example 14 at 70% Polymer Content
Example 14 (70% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 1.58114 | 91.6883 | 23.653 | 9.9586 | 0.250829 | −44.4785 | −0.05661 | 2.51808 | 1.59298 |
| 1.99054 | 98.0362 | 23.653 | 9.95632 | 0.316628 | −301.083 | −0.01056 | 3.18016 | 1.59765 |
| 2.50594 | 103.084 | 23.647 | 9.96026 | 0.396066 | −200.169 | −0.01987 | 3.97642 | 1.58682 |
| 3.15479 | 107.097 | 23.647 | 9.95705 | 0.499869 | 2022.5 | 2.48E−03 | 5.02025 | 1.59131 |
| 3.97164 | 110.298 | 23.647 | 9.95668 | 0.63098 | −727.46 | −8.71E−03 | 6.33725 | 1.59563 |
| 5 | 112.841 | 23.645 | 9.96161 | 0.79675 | 194.05 | 0.041217 | 7.9981 | 1.59964 |
| 6.29463 | 124.883 | 23.638 | 9.95636 | 0.999066 | 226.255 | 0.04435 | 10.0344 | 1.59413 |
| 7.92447 | 132.872 | 23.639 | 9.9567 | 1.25855 | 244.183 | 0.051765 | 12.6401 | 1.59508 |
| 9.97631 | 138.586 | 23.639 | 9.9577 | 1.58283 | 227.014 | 0.070019 | 15.8954 | 1.59333 |
| 12.5594 | 143.646 | 23.641 | 9.95835 | 1.99106 | 197.77 | 0.101095 | 19.9936 | 1.59194 |
| 15.8114 | 151.321 | 23.642 | 9.95496 | 2.50677 | 185.671 | 0.13562 | 25.1807 | 1.59259 |
| 19.9054 | 157.694 | 23.635 | 9.95405 | 3.15366 | 260.542 | 0.1216 | 31.6819 | 1.59164 |
| 25.0594 | 163.042 | 23.635 | 9.95008 | 3.95278 | 188.635 | 0.210595 | 39.7255 | 1.58528 |
| 31.5479 | 174.806 | 23.632 | 9.94352 | 4.98892 | 217.429 | 0.230752 | 50.1721 | 1.59037 |
| 39.7164 | 181.217 | 23.628 | 9.93356 | 6.2707 | 193.589 | 0.326081 | 63.1258 | 1.58943 |
| 50 | 186.632 | 23.626 | 9.91838 | 7.88273 | 185.794 | 0.42776 | 79.4752 | 1.58953 |
| 62.9463 | 194.5 | 23.628 | 9.89427 | 9.89105 | 185.625 | 0.538541 | 99.9669 | 1.58815 |
| 79.2447 | 201.393 | 23.619 | 9.85822 | 12.4021 | 121.493 | 1.03547 | 125.802 | 1.58757 |
| 100 | 208.876 | 23.618 | 9.80429 | 15.5088 | 99.3293 | 1.59247 | 158.179 | 1.58187 |

TABLE 7D

Complex Viscosity Results for Example 14 at 80% Polymer Content
Example 14 (80% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1405 | 24.953 | 9.9626 | 0.463206 | 44.2805 | 0.104973 | 4.64826 | 9.2989 |
| 0.629463 | 45.1453 | 24.952 | 9.96143 | 0.622857 | 26.6675 | 0.234304 | 6.24829 | 9.93337 |
| 0.792447 | 61.0352 | 24.96 | 9.95864 | 0.7568 | −48.3025 | −0.1573 | 7.5978 | 9.58983 |
| 0.997631 | 73.6642 | 24.971 | 9.95827 | 0.953866 | −1332.29 | −7.19E−03 | 9.57862 | 9.60137 |
| 1.25594 | 83.7087 | 24.982 | 9.96164 | 1.21567 | −59.7533 | −0.2042 | 12.2018 | 9.71661 |
| 1.58114 | 91.6925 | 24.987 | 9.95883 | 1.52131 | −107.437 | −0.14218 | 15.2753 | 9.66137 |
| 1.99054 | 98.0415 | 24.993 | 9.95657 | 1.88423 | −37.1284 | −0.50952 | 18.9177 | 9.50725 |
| 2.50594 | 103.087 | 24.995 | 9.96052 | 2.36425 | 76.1784 | 0.311561 | 23.7342 | 9.47201 |
| 3.15479 | 107.099 | 24.994 | 9.95694 | 3.04727 | 40.7368 | 0.751046 | 30.5952 | 9.70096 |
| 3.97164 | 110.3 | 25.001 | 9.95682 | 3.83331 | 51.6537 | 0.745193 | 38.4921 | 9.69355 |
| 5 | 112.844 | 25.004 | 9.96191 | 4.78089 | −140.146 | −0.34243 | 47.9905 | 9.59834 |
| 6.29463 | 121.891 | 25.006 | 9.95654 | 6.04159 | 170.617 | 0.355641 | 60.6786 | 9.63991 |
| 7.92447 | 129.094 | 25.01 | 9.95683 | 7.5776 | 212.241 | 0.358571 | 76.1037 | 9.60374 |
| 9.97631 | 134.81 | 25.009 | 9.95784 | 9.54185 | 166.156 | 0.576686 | 95.8207 | 9.605 |
| 12.5594 | 139.871 | 25.011 | 9.95856 | 12.005 | 232.045 | 0.519509 | 120.549 | 9.59835 |
| 15.8114 | 147.14 | 25.015 | 9.95526 | 15.149 | 162.07 | 0.938906 | 152.168 | 9.62414 |
| 19.9054 | 153.514 | 25.011 | 9.95416 | 19.0135 | 231.411 | 0.825412 | 191.009 | 9.59596 |
| 25.0594 | 158.864 | 25.015 | 9.95037 | 23.9392 | 398.97 | 0.603017 | 240.585 | 9.60065 |
| 31.5479 | 166.445 | 25.011 | 9.9441 | 30.1672 | 270.419 | 1.12184 | 303.366 | 9.61612 |
| 39.7164 | 176.812 | 25.012 | 9.9347 | 37.9774 | 285.942 | 1.33687 | 382.268 | 9.62499 |
| 50 | 182.986 | 25.01 | 9.91929 | 47.7623 | 315.816 | 1.52464 | 481.507 | 9.63018 |
| 62.9463 | 192.657 | 25.004 | 9.89548 | 60.0129 | 295.459 | 2.05261 | 606.464 | 9.63468 |
| 79.2447 | 202.01 | 25.001 | 9.86001 | 75.3471 | 274.597 | 2.78285 | 764.164 | 9.64316 |
| 100 | 209.996 | 25.004 | 9.80579 | 94.6564 | 701.175 | 1.37666 | 965.311 | 9.65312 |

TABLE 7E

Complex Viscosity Results for Example 14 at 90% Polymer Content
Example 14 (90% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1403 | 24.966 | 9.96281 | 2.1632 | 44.6958 | 0.485666 | 21.7073 | 43.4254 |
| 0.629463 | 45.1432 | 24.968 | 9.96156 | 2.74849 | 36.944 | 0.74656 | 27.5809 | 43.8326 |
| 0.792447 | 61.0328 | 24.976 | 9.95843 | 3.47019 | 477.15 | 0.073031 | 34.8467 | 43.9737 |

TABLE 7E-continued

Complex Viscosity Results for Example 14 at 90% Polymer Content
Example 14 (90% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.997631 | 73.6618 | 24.978 | 9.95806 | 4.38683 | 316.197 | 0.139321 | 44.0528 | 44.1576 |
| 1.25594 | 83.7065 | 24.979 | 9.96154 | 5.47364 | 47.4399 | 1.158 | 54.9355 | 43.7502 |
| 1.58114 | 91.6902 | 24.985 | 9.95894 | 6.89046 | 85.86 | 0.805778 | 69.184 | 43.7588 |
| 1.99054 | 98.0392 | 24.99 | 9.95641 | 8.53851 | 121.47 | 0.705986 | 85.756 | 43.0833 |
| 2.50594 | 103.084 | 24.999 | 9.96063 | 10.8432 | 50.3622 | 2.16113 | 108.839 | 43.4411 |
| 3.15479 | 107.096 | 24.997 | 9.9571 | 13.5847 | 68.5695 | 1.98948 | 136.418 | 43.2462 |
| 3.97164 | 110.298 | 24.996 | 9.95683 | 17.0241 | 77.9911 | 2.19212 | 170.965 | 43.0501 |
| 5 | 112.842 | 24.998 | 9.96199 | 21.3405 | 149.766 | 1.43033 | 214.214 | 42.8438 |
| 6.29463 | 121.888 | 25.003 | 9.9566 | 26.8463 | 87.7086 | 3.07399 | 269.615 | 42.8354 |
| 7.92447 | 129.091 | 25.002 | 9.95709 | 33.7595 | 82.9213 | 4.08852 | 339.025 | 42.7852 |
| 9.97631 | 134.807 | 25.007 | 9.95802 | 42.4499 | 99.6953 | 4.27571 | 426.267 | 42.73 |
| 12.5594 | 139.869 | 25.011 | 9.95906 | 53.3316 | 107.292 | 4.99092 | 535.486 | 42.638 |
| 15.8114 | 147.137 | 25.008 | 9.95579 | 67.076 | 113.629 | 5.92906 | 673.713 | 42.611 |
| 19.9054 | 153.512 | 25.006 | 9.95504 | 84.3382 | 125.028 | 6.77581 | 847.163 | 42.5609 |
| 25.0594 | 158.861 | 25.007 | 9.95196 | 106.069 | 135.976 | 7.83797 | 1065.78 | 42.5313 |
| 31.5479 | 166.442 | 25.011 | 9.94649 | 133.346 | 142.813 | 9.38716 | 1340.6 | 42.4953 |
| 39.7164 | 172.854 | 25.003 | 9.93747 | 167.561 | 151.681 | 11.1162 | 1686.11 | 42.4547 |
| 50 | 178.27 | 25.008 | 9.92333 | 210.568 | 164.567 | 12.893 | 2121.91 | 42.439 |
| 62.9463 | 186.137 | 25.011 | 9.9008 | 264.367 | 179.293 | 14.8925 | 2670.12 | 42.4197 |
| 79.2447 | 193.031 | 25.003 | 9.86558 | 331.475 | 194.735 | 17.2535 | 3359.87 | 42.3993 |
| 100 | 198.377 | 25.002 | 9.81267 | 415.932 | 219.782 | 19.2859 | 4238.68 | 42.3872 |

TABLE 7F

Complex Viscosity Results for Example 14 at 100% Polymer Content
Example 14 (100% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1405 | 25.02 | 9.96623 | 54.774 | 146.611 | 3.74856 | 549.583 | 1099.19 |
| 0.629463 | 45.1492 | 25.064 | 9.9628 | 67.8922 | 182.064 | 3.74291 | 681.447 | 1082.6 |
| 0.792447 | 61.043 | 25.076 | 9.95856 | 85.161 | 182.115 | 4.69561 | 855.141 | 1079.13 |
| 0.997631 | 73.6762 | 25.076 | 9.95809 | 107.105 | 214.346 | 5.01782 | 1075.55 | 1078.11 |
| 1.25594 | 83.7225 | 25.07 | 9.96115 | 134.927 | 252.495 | 5.36453 | 1354.52 | 1078.5 |
| 1.58114 | 91.7083 | 25.057 | 9.95874 | 170.109 | 252.252 | 6.77147 | 1708.12 | 1080.32 |
| 1.99054 | 98.0572 | 25.055 | 9.95647 | 214.438 | 268.721 | 8.01479 | 2153.74 | 1082 |
| 2.50594 | 103.104 | 25.044 | 9.96054 | 270.283 | 278.832 | 9.73171 | 2713.52 | 1082.84 |
| 3.15479 | 107.119 | 25.042 | 9.9578 | 340.475 | 274.849 | 12.4401 | 3419.16 | 1083.81 |
| 3.97164 | 110.314 | 25.036 | 9.95815 | 428.917 | 270.445 | 15.9262 | 4307.17 | 1084.49 |
| 5 | 112.863 | 25.035 | 9.96401 | 540.228 | 256.181 | 21.1637 | 5421.75 | 1084.36 |
| 6.29463 | 121.915 | 25.024 | 9.95924 | 680.948 | 235.081 | 29.0848 | 6837.29 | 1086.22 |
| 7.92447 | 129.113 | 25.016 | 9.96203 | 859.122 | 213.903 | 40.3168 | 8623.87 | 1088.27 |
| 9.97631 | 135.454 | 25.006 | 9.9658 | 1082.76 | 188.614 | 57.6017 | 10864.6 | 1089.06 |
| 12.5594 | 140.51 | 25.006 | 9.97178 | 1364.52 | 164.427 | 83.2197 | 13683.6 | 1089.52 |
| 15.8114 | 148.182 | 24.992 | 9.97519 | 1726.01 | 145.576 | 118.857 | 17302.7 | 1094.34 |
| 19.9054 | 154.554 | 24.99 | 9.985 | 2174.44 | 124.438 | 174.998 | 21776.4 | 1094.03 |
| 25.0594 | 159.901 | 24.99 | 9.99715 | 2740.73 | 103.908 | 263.828 | 27413.8 | 1094.01 |
| 31.5479 | 167.482 | 24.991 | 10.0126 | 3454.67 | 87.4343 | 394.593 | 34501 | 1093.68 |
| 39.7164 | 174.053 | 24.984 | 10.0305 | 4353.59 | 73.6646 | 589.147 | 43399.3 | 1092.83 |
| 50 | 179.469 | 24.987 | 10.0479 | 5482.35 | 62.1382 | 877.965 | 54555.1 | 1091.24 |
| 62.9463 | 187.336 | 24.983 | 10.0568 | 6856.93 | 50.6754 | 1345.21 | 68169 | 1083.18 |
| 79.2447 | 194.232 | 24.985 | 10.0467 | 8596.95 | 42.9472 | 1991.9 | 85546.3 | 1079.81 |
| 100 | 199.591 | 24.983 | 10.004 | 10738.6 | 36.3838 | 2949.19 | 107303 | 1075.98 |

TABLE 7G

Summary of Complex Viscosity Results for Example 15
Example 15

| Angular frequency | Complex viscosity (Pa · s) | | | | |
|---|---|---|---|---|---|
| rad/s | 50% | 70% | 80% | 90% | 100% |
| 0.5 | 0.576713 | 2.64267 | 14.1969 | 104.995 | 3483.12 |
| 0.629463 | 0.509636 | 2.04439 | 14.2707 | 105.351 | 3489.88 |
| 0.792447 | 0.43278 | 2.2029 | 14.1946 | 105.858 | 3498.43 |
| 0.997631 | 0.169537 | 2.08915 | 14.2979 | 106.421 | 3501.32 |
| 1.25594 | 0.352566 | 2.26548 | 14.4085 | 106.247 | 3501.68 |
| 1.58114 | 0.215948 | 2.3589 | 14.1949 | 106.372 | 3501.42 |
| 1.99054 | 0.16773 | 2.15981 | 14.3301 | 106.887 | 3501.04 |
| 2.50594 | 0.134944 | 2.373 | 14.359 | 106.442 | 3500.42 |
| 3.15479 | 0.157384 | 2.30637 | 14.3765 | 106.591 | 3501.55 |
| 3.97164 | 0.145471 | 2.38015 | 14.4181 | 106.424 | 3497.81 |
| 5 | 0.197265 | 2.31008 | 14.3651 | 106.519 | 3491.95 |
| 6.29463 | 0.184135 | 2.30146 | 14.3429 | 106.54 | 3488.93 |
| 7.92447 | 0.157583 | 2.30527 | 14.337 | 106.587 | 3484.67 |

TABLE 7G-continued

Summary of Complex Viscosity Results for Example 15
Example 15

| Angular frequency | Complex viscosity (Pa · s) | | | | |
|---|---|---|---|---|---|
| rad/s | 50% | 70% | 80% | 90% | 100% |
| 9.97631 | 0.15041 | 2.33055 | 14.3484 | 106.501 | 3477.3 |
| 12.5594 | 0.160743 | 2.34845 | 14.3533 | 106.446 | 3469.2 |
| 15.8114 | 0.161701 | 2.32513 | 14.3416 | 106.429 | 3458.62 |
| 19.9054 | 0.153346 | 2.31382 | 14.3138 | 106.369 | 3446.06 |
| 25.0594 | 0.149633 | 2.32941 | 14.3073 | 106.303 | 3429.39 |
| 31.5479 | 0.142733 | 2.32251 | 14.3149 | 106.223 | 3409.39 |
| 39.7164 | 0.146433 | 2.32987 | 14.3081 | 106.168 | 3384.36 |
| 50 | 0.153585 | 2.32078 | 14.3086 | 106.094 | 3354.4 |
| 62.9463 | 0.148835 | 2.32678 | 14.3028 | 105.99 | 3315.03 |
| 79.2447 | 0.146862 | 2.32716 | 14.2987 | 105.898 | 3269.32 |
| 100 | 0.151412 | 2.334 | 14.3087 | 105.747 | 3213.04 |

TABLE 7H

Complex Viscosity Results for Example 15 at 50% Polymer Content
Example 15 (50% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1405 | 25.129 | 9.96138 | 0.028724 | −0.72447 | −0.23352 | 0.169175 | 0.576713 |
| 0.629463 | 45.1432 | 25.054 | 9.95959 | 0.03195 | 0.616849 | 0.273031 | 0.168418 | 0.509636 |
| 0.792447 | 61.033 | 25.004 | 9.95686 | 0.034148 | −0.37477 | −0.32114 | 0.120356 | 0.43278 |
| 0.997631 | 73.6622 | 24.971 | 9.95717 | 0.016841 | −0.01078 | −0.16913 | 1.82E−03 | 0.169537 |
| 1.25594 | 83.7067 | 24.95 | 9.96062 | 0.044106 | 1.3374 | 0.265164 | 0.35463 | 0.352566 |
| 1.58114 | 91.6903 | 24.941 | 9.95874 | 0.034004 | −2.56157 | −0.12417 | 0.318066 | 0.215948 |
| 1.99054 | 98.0393 | 24.937 | 9.95598 | 0.03324 | 1.56508 | 0.179765 | 0.281346 | 0.16773 |
| 2.50594 | 103.085 | 24.938 | 9.96053 | 0.033683 | −1.45199 | −0.19181 | 0.2785 | 0.134944 |
| 3.15479 | 107.097 | 24.937 | 9.95681 | 0.049437 | 47.0542 | 0.01055 | 0.496401 | 0.157384 |
| 3.97164 | 110.298 | 24.934 | 9.95697 | 0.057527 | 1.40956 | 0.3343 | 0.471218 | 0.145471 |
| 5 | 112.842 | 24.938 | 9.96172 | 0.098255 | 0.932397 | 0.721395 | 0.672627 | 0.197265 |
| 6.29463 | 128.876 | 24.951 | 9.95673 | 0.115404 | −4.34492 | −0.25997 | 1.12953 | 0.184135 |
| 7.92447 | 136.079 | 24.96 | 9.95703 | 0.124338 | 6.52658 | 0.189127 | 1.23435 | 0.157583 |
| 9.97631 | 141.794 | 24.962 | 9.95783 | 0.149418 | −6.54899 | −0.2265 | 1.48335 | 0.15041 |
| 12.5594 | 148.857 | 24.974 | 9.95867 | 0.201043 | −17.8851 | −0.1127 | 2.0157 | 0.160743 |
| 15.8114 | 162.093 | 24.989 | 9.95536 | 0.254518 | −25.489 | −0.10023 | 2.55476 | 0.161701 |
| 19.9054 | 168.464 | 24.987 | 9.95388 | 0.303806 | −43.385 | −0.07034 | 3.05161 | 0.153346 |
| 25.0594 | 173.81 | 25 | 9.9503 | 0.373049 | −100.753 | −0.03721 | 3.74952 | 0.149633 |
| 31.5479 | 181.39 | 25 | 9.94379 | 0.447639 | 30.8002 | 0.14612 | 4.50054 | 0.142733 |
| 39.7164 | 187.968 | 25.009 | 9.93391 | 0.577499 | 207.531 | 0.028023 | 5.81571 | 0.146433 |
| 50 | 193.378 | 25.011 | 9.91829 | 0.761205 | 154.682 | 0.049645 | 7.67911 | 0.153585 |
| 62.9463 | 201.553 | 25.013 | 9.89426 | 0.926035 | 53.6028 | 0.174748 | 9.36697 | 0.148835 |
| 79.2447 | 208.363 | 25.012 | 9.85821 | 1.14545 | 31.8717 | 0.364972 | 11.6323 | 0.146862 |
| 100 | 213.712 | 25.018 | 9.80426 | 1.48089 | 30.8936 | 0.489851 | 15.1333 | 0.151412 |

TABLE 7I

Complex Viscosity Results for Example 15 at 70% Polymer Content
Example 15 (70% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1405 | 25.028 | 9.96205 | 0.131632 | −9.73647 | −0.135 | 1.31442 | 2.64267 |
| 0.629463 | 55.125 | 24.986 | 9.96057 | 0.12818 | 24.73 | 0.051994 | 1.28582 | 2.04439 |
| 0.792447 | 71.0203 | 24.976 | 9.95784 | 0.173832 | −21.8909 | −0.07966 | 1.74386 | 2.2029 |
| 0.997631 | 83.6513 | 24.974 | 9.95792 | 0.207544 | 14.3592 | 0.144797 | 2.07917 | 2.08915 |
| 1.25594 | 98.6997 | 24.976 | 9.96136 | 0.283432 | −54.3262 | −0.05237 | 2.84484 | 2.26548 |
| 1.58114 | 110.657 | 24.975 | 9.95872 | 0.371435 | −366.965 | −0.01016 | 3.72974 | 2.3589 |
| 1.99054 | 117.007 | 24.982 | 9.95672 | 0.428058 | −19.396 | −0.22136 | 4.29348 | 2.15981 |
| 2.50594 | 122.052 | 24.983 | 9.96014 | 0.592289 | 67.7563 | 0.087755 | 5.94595 | 2.373 |
| 3.15479 | 126.065 | 24.985 | 9.95701 | 0.724482 | 27.4708 | 0.264691 | 7.27128 | 2.30637 |

TABLE 7I-continued

Complex Viscosity Results for Example 15 at 70% Polymer Content
Example 15 (70% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 3.97164 | 129.266 | 24.985 | 9.95699 | 0.941245 | 42.4282 | 0.222741 | 9.45049 | 2.38015 |
| 5 | 131.811 | 24.985 | 9.96173 | 1.15062 | −45.4403 | −0.25413 | 11.5476 | 2.31008 |
| 6.29463 | 140.858 | 24.994 | 9.95664 | 1.4424 | 749.676 | 0.019324 | 14.4868 | 2.30146 |
| 7.92447 | 148.061 | 24.993 | 9.95673 | 1.8189 | 789.172 | 0.023148 | 18.268 | 2.30527 |
| 9.97631 | 153.777 | 24.993 | 9.95759 | 2.31517 | 487.464 | 0.047696 | 23.2502 | 2.33055 |
| 12.5594 | 158.838 | 24.996 | 9.95855 | 2.93729 | 73.0379 | 0.403796 | 29.4924 | 2.34845 |
| 15.8114 | 169.683 | 25 | 9.95498 | 3.65981 | 598.133 | 0.061464 | 36.7635 | 2.32513 |
| 19.9054 | 176.056 | 25.003 | 9.95425 | 4.58468 | −2221.93 | −0.02073 | 46.0575 | 2.31382 |
| 25.0594 | 181.404 | 25.006 | 9.95017 | 5.80826 | 857.763 | 0.068053 | 58.3735 | 2.32941 |
| 31.5479 | 188.985 | 25.005 | 9.94378 | 7.28582 | 366.256 | 0.200051 | 73.27 | 2.32251 |
| 39.7164 | 195.396 | 25.007 | 9.93399 | 9.1923 | 375.402 | 0.246496 | 92.5336 | 2.32987 |
| 50 | 202.821 | 25.007 | 9.91842 | 11.5092 | 254.595 | 0.455774 | 116.038 | 2.32078 |
| 62.9463 | 211.094 | 25.005 | 9.89433 | 14.4914 | 412.001 | 0.35549 | 146.462 | 2.32678 |
| 79.2447 | 217.903 | 25.003 | 9.85845 | 18.1804 | 317.525 | 0.580787 | 184.414 | 2.32716 |
| 100 | 223.252 | 25.007 | 9.80469 | 22.884 | 147.038 | 1.58731 | 233.395 | 2.334 |

TABLE 7J

Complex Viscosity Results for Example 15 at 80% Polymer Content
Example 15 (80% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1405 | 25.063 | 9.96343 | 0.707248 | −37.4613 | −0.18942 | 7.0959 | 14.1969 |
| 0.629463 | 45.1452 | 25.046 | 9.96077 | 0.894763 | −36.8176 | −0.24389 | 8.97956 | 14.2707 |
| 0.792447 | 61.0348 | 25.02 | 9.95736 | 1.12005 | −227.682 | −0.0494 | 11.2483 | 14.1946 |
| 0.997631 | 73.6642 | 25.003 | 9.95773 | 1.42037 | −133.989 | −0.10645 | 14.2636 | 14.2979 |
| 1.25594 | 83.7065 | 24.99 | 9.96122 | 1.80261 | 561.387 | 0.032235 | 18.0963 | 14.4085 |
| 1.58114 | 91.6883 | 24.988 | 9.95864 | 2.23513 | 5590.04 | 4.02E−03 | 22.4441 | 14.1949 |
| 1.99054 | 98.0363 | 24.979 | 9.95631 | 2.83999 | 83.6023 | 0.341169 | 28.5225 | 14.3301 |
| 2.50594 | 103.084 | 24.982 | 9.96043 | 3.58403 | 260.931 | 0.1379 | 35.9824 | 14.359 |
| 3.15479 | 107.097 | 24.978 | 9.95677 | 4.51589 | 65.907 | 0.688086 | 45.3497 | 14.3765 |
| 3.97164 | 110.298 | 24.979 | 9.95666 | 5.70155 | 191.924 | 0.298364 | 57.2629 | 14.4181 |
| 5 | 112.841 | 24.979 | 9.96181 | 7.15511 | 182.305 | 0.393978 | 71.8243 | 14.3651 |
| 6.29463 | 121.889 | 24.977 | 9.95653 | 8.98906 | 195.179 | 0.462559 | 90.2819 | 14.3429 |
| 7.92447 | 129.093 | 24.979 | 9.9568 | 11.3122 | 181.839 | 0.62479 | 113.611 | 14.337 |
| 9.97631 | 134.808 | 24.978 | 9.95769 | 14.2539 | 204.85 | 0.698765 | 143.143 | 14.3484 |
| 12.5594 | 139.87 | 24.981 | 9.95866 | 17.9524 | 189.964 | 0.948964 | 180.267 | 14.3533 |
| 15.8114 | 147.138 | 24.983 | 9.95527 | 22.5746 | 249.655 | 0.908286 | 226.758 | 14.3416 |
| 19.9054 | 153.513 | 24.985 | 9.95448 | 28.3624 | 246.5 | 1.15585 | 284.918 | 14.3138 |
| 25.0594 | 158.862 | 24.989 | 9.95076 | 35.6767 | 209.015 | 1.71532 | 358.528 | 14.3073 |
| 31.5479 | 166.444 | 24.991 | 9.94453 | 44.91 | 217.114 | 2.08002 | 451.601 | 14.3149 |
| 39.7164 | 173.962 | 24.99 | 9.93513 | 56.4582 | 215.613 | 2.63557 | 568.262 | 14.3081 |
| 50 | 179.381 | 24.997 | 9.91982 | 70.9692 | 212.99 | 3.35893 | 715.421 | 14.3086 |
| 62.9463 | 190.645 | 24.996 | 9.89649 | 89.0992 | 233.986 | 3.84767 | 900.302 | 14.3028 |
| 79.2447 | 200.863 | 25.003 | 9.86082 | 111.733 | 261.256 | 4.33709 | 1133.09 | 14.2987 |
| 100 | 207.596 | 25.002 | 9.80689 | 140.324 | 288.261 | 4.96376 | 1430.86 | 14.3087 |

TABLE 7K

Complex Viscosity Results for Example 15 at 90% Polymer Content
Example 15 (90% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 37.7068 | 25.038 | 9.96194 | 5.22976 | 422.583 | 0.124229 | 52.4973 | 104.995 |
| 0.629463 | 57.7088 | 25.014 | 9.96125 | 6.60577 | 1185.06 | 0.055962 | 66.3146 | 105.351 |
| 0.792447 | 73.5965 | 24.993 | 9.9576 | 8.35314 | 274.651 | 0.305429 | 83.8866 | 105.858 |
| 0.997631 | 86.2315 | 24.986 | 9.9578 | 10.572 | 274.525 | 0.386732 | 106.168 | 106.421 |
| 1.25594 | 96.2693 | 24.979 | 9.96133 | 13.2924 | 246.66 | 0.540985 | 133.439 | 106.247 |

TABLE 7K-continued

Complex Viscosity Results for Example 15 at 90% Polymer Content
Example 15 (90% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 1.58114 | 104.25 | 24.977 | 9.95897 | 16.7499 | 262.507 | 0.6407 | 168.188 | 106.372 |
| 1.99054 | 110.597 | 24.976 | 9.95573 | 21.1819 | 201.683 | 1.05492 | 212.759 | 106.887 |
| 2.50594 | 115.64 | 24.976 | 9.96073 | 26.5691 | 240.528 | 1.10896 | 266.736 | 106.442 |
| 3.15479 | 119.651 | 24.979 | 9.95735 | 33.4839 | 243.714 | 1.37977 | 336.27 | 106.591 |
| 3.97164 | 122.851 | 24.976 | 9.95653 | 42.084 | 196.197 | 2.15432 | 422.672 | 106.424 |
| 5 | 125.395 | 24.975 | 9.96192 | 53.0565 | 229.668 | 2.31895 | 532.589 | 106.519 |
| 6.29463 | 134.442 | 24.978 | 9.9572 | 66.7756 | 251.27 | 2.66893 | 670.621 | 106.54 |
| 7.92447 | 144.807 | 24.987 | 9.957 | 84.1015 | 232.953 | 3.62579 | 844.639 | 106.587 |
| 9.97631 | 150.523 | 24.988 | 9.95878 | 105.811 | 227.18 | 4.6768 | 1062.48 | 106.501 |
| 12.5594 | 155.575 | 24.986 | 9.95961 | 133.151 | 197.905 | 6.75519 | 1336.89 | 106.446 |
| 15.8114 | 163.243 | 24.99 | 9.95692 | 167.554 | 188.576 | 8.92356 | 1682.77 | 106.429 |
| 19.9054 | 169.612 | 24.987 | 9.95752 | 210.831 | 174.037 | 12.1656 | 2117.27 | 106.369 |
| 25.0594 | 174.956 | 24.994 | 9.95426 | 265.169 | 151.311 | 17.6049 | 2663.82 | 106.303 |
| 31.5479 | 182.533 | 24.997 | 9.95108 | 333.473 | 136.359 | 24.5751 | 3351.03 | 106.223 |
| 39.7164 | 189.427 | 24.997 | 9.94341 | 419.275 | 122.263 | 34.4869 | 4216.47 | 106.168 |
| 50 | 194.845 | 24.999 | 9.93118 | 526.82 | 109.854 | 48.2869 | 5304.48 | 106.094 |
| 62.9463 | 202.715 | 25.004 | 9.91057 | 661.199 | 98.6181 | 67.6479 | 6671.31 | 105.99 |
| 79.2447 | 209.61 | 25.005 | 9.87696 | 828.857 | 89.2571 | 94.0127 | 8391.3 | 105.898 |
| 100 | 214.957 | 25.004 | 9.82528 | 1038.99 | 80.089 | 132.026 | 10573.8 | 105.747 |

TABLE 7L

Complex Viscosity Results for Example 15 at 100% Polymer Content
Example 15 (100% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1407 | 25.006 | 9.96327 | 173.516 | 155.088 | 11.2293 | 1741.53 | 3483.12 |
| 0.629463 | 45.1493 | 24.992 | 9.96147 | 218.828 | 175.618 | 12.5085 | 2196.71 | 3489.88 |
| 0.792447 | 61.0432 | 24.986 | 9.95846 | 276.08 | 223.149 | 12.4235 | 2772.29 | 3498.43 |
| 0.997631 | 73.6765 | 24.986 | 9.95778 | 347.828 | 163.708 | 21.3365 | 3492.96 | 3501.32 |
| 1.25594 | 83.7227 | 24.986 | 9.96144 | 438.095 | 213.62 | 20.5874 | 4397.86 | 3501.68 |
| 1.58114 | 91.7087 | 24.986 | 9.9587 | 551.337 | 148.709 | 37.2278 | 5536.1 | 3501.42 |
| 1.99054 | 98.0573 | 24.99 | 9.95622 | 693.843 | 110.242 | 63.2124 | 6968.65 | 3501.04 |
| 2.50594 | 103.104 | 24.991 | 9.96039 | 873.709 | 98.8727 | 88.7139 | 8771.38 | 3500.42 |
| 3.15479 | 107.119 | 24.995 | 9.95709 | 1099.93 | 84.1289 | 131.297 | 11045.9 | 3501.55 |
| 3.97164 | 111.896 | 24.991 | 9.95679 | 1383.2 | 79.1645 | 175.469 | 13890.9 | 3497.81 |
| 5 | 114.445 | 24.993 | 9.9618 | 1739.31 | 67.265 | 259.538 | 17457.8 | 3491.95 |
| 6.29463 | 123.497 | 24.994 | 9.95659 | 2186.62 | 54.5725 | 402.361 | 21957.8 | 3488.93 |
| 7.92447 | 130.695 | 24.996 | 9.95711 | 2749.57 | 46.6438 | 591.887 | 27607.8 | 3484.67 |
| 9.97631 | 136.407 | 24.997 | 9.95779 | 3454.42 | 39.3934 | 880.337 | 34679.5 | 3477.3 |
| 12.5594 | 141.466 | 24.999 | 9.95911 | 4339.31 | 33.2772 | 1308.75 | 43551.6 | 3469.2 |
| 15.8114 | 149.141 | 24.994 | 9.95544 | 5444.19 | 28.0172 | 1950.62 | 54650.8 | 3458.62 |
| 19.9054 | 155.515 | 24.997 | 9.95504 | 6828.67 | 23.7531 | 2885.28 | 68534.4 | 3446.06 |
| 25.0594 | 160.864 | 24.999 | 9.95153 | 8552.19 | 20.1318 | 4263.54 | 85832.6 | 3429.39 |
| 31.5479 | 168.446 | 25.003 | 9.94585 | 10697.7 | 17.1627 | 6256.4 | 107377 | 3409.39 |
| 39.7164 | 175.017 | 25 | 9.937 | 13356.8 | 14.6974 | 9124.39 | 134105 | 3384.36 |
| 50 | 180.433 | 25.003 | 9.92203 | 16641.2 | 12.7129 | 13152.2 | 167204 | 3354.4 |
| 62.9463 | 191.297 | 25.001 | 9.89894 | 20656 | 11.0712 | 18771.5 | 207822 | 3315.03 |
| 79.2447 | 198.195 | 25.002 | 9.8636 | 25554.2 | 9.70742 | 26548 | 257712 | 3269.32 |
| 100 | 203.558 | 25 | 9.80979 | 31444.6 | 8.55628 | 37209.6 | 318376 | 3213.04 |

TABLE 7M

Summary of Complex Viscosity Results for Example 16
Example 16

| Angular frequency (rad/s) | Complex viscosity (Pa · s) | | | | |
|---|---|---|---|---|---|
| | 50% | 70% | 80% | 90% | 100% |
| 0.5 | 0.105533 | 7.47092 | 13.5757 | 83.9123 | 5646.72 |
| 0.629463 | 0.122633 | 7.93567 | 13.927 | 84.1518 | 5646.29 |
| 0.792447 | 0.129495 | 7.52153 | 13.8261 | 84.3409 | 5637.15 |
| 0.997631 | 0.191276 | 7.75737 | 13.5734 | 84.8484 | 5641.97 |

TABLE 7M-continued

Summary of Complex Viscosity Results for Example 16
Example 16

| Angular frequency (rad/s) | Complex viscosity (Pa · s) | | | | |
|---|---|---|---|---|---|
| | 50% | 70% | 80% | 90% | 100% |
| 1.25594 | 0.191112 | 7.40771 | 13.7863 | 84.5137 | 5642.45 |
| 1.58114 | 0.129922 | 7.52854 | 13.7676 | 84.7718 | 5644.34 |
| 1.99054 | 0.337734 | 7.58655 | 13.9726 | 84.9731 | 5640.28 |
| 2.50594 | 0.216909 | 7.65407 | 13.6761 | 84.9718 | 5637.92 |
| 3.15479 | 0.269861 | 7.51068 | 13.8431 | 84.9111 | 5639.42 |
| 3.97164 | 0.093719 | 7.42453 | 13.7181 | 84.8793 | 5633.66 |
| 5 | 0.209489 | 7.38394 | 13.6169 | 84.8166 | 5622.26 |
| 6.29463 | 0.222806 | 7.49509 | 13.7072 | 84.824 | 5617.06 |
| 7.92447 | 0.234527 | 7.48388 | 13.6772 | 84.9318 | 5607.96 |
| 9.97631 | 0.185656 | 7.4701 | 13.6809 | 84.9645 | 5593.12 |
| 12.5594 | 0.224774 | 7.47754 | 13.6334 | 84.8985 | 5574.59 |
| 15.8114 | 0.192582 | 7.44458 | 13.6438 | 84.9253 | 5550.53 |
| 19.9054 | 0.187578 | 7.45628 | 13.6316 | 84.8738 | 5516.93 |
| 25.0594 | 0.184162 | 7.43339 | 13.6288 | 84.8415 | 5472.77 |
| 31.5479 | 0.200011 | 7.43298 | 13.623 | 84.8293 | 5417.6 |
| 39.7164 | 0.200585 | 7.43123 | 13.6142 | 84.7666 | 5347.32 |
| 50 | 0.199106 | 7.42689 | 13.6037 | 84.7183 | 5261.29 |
| 62.9463 | 0.195072 | 7.42745 | 13.6023 | 84.6411 | 5153.66 |
| 79.2447 | 0.193491 | 7.41988 | 13.5977 | 84.5397 | 5022.96 |
| 100 | 0.18912 | 7.42501 | 13.5857 | 84.4486 | 4888.67 |

TABLE 7N

Complex Viscosity Results for Example 16 at 50% Polymer Content
Example 16 (50% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1403 | 25.118 | 9.96561 | 5.26E−03 | 0.886944 | 0.039476 | 0.035013 | 0.105533 |
| 0.629463 | 45.1452 | 25.122 | 9.96192 | 7.69E−03 | 1.85388 | −0.03665 | −0.06794 | 0.122633 |
| 0.792447 | 61.0347 | 25.105 | 9.95764 | 0.010218 | 1.04065 | 0.071102 | 0.073992 | 0.129495 |
| 0.997631 | 73.6638 | 25.077 | 9.95717 | 0.019001 | −2.93439 | −0.06155 | 0.180622 | 0.191276 |
| 1.25594 | 83.7082 | 25.048 | 9.96053 | 0.023908 | −6.63445 | −0.03577 | 0.237344 | 0.191112 |
| 1.58114 | 91.6922 | 25.034 | 9.95841 | 0.020457 | −7.77534 | −0.0262 | 0.203746 | 0.129922 |
| 1.99054 | 98.041 | 25.017 | 9.95582 | 0.06693 | 2.00047 | 0.300593 | 0.601327 | 0.337734 |
| 2.50594 | 103.086 | 25.009 | 9.96033 | 0.05414 | 3.31513 | 0.156977 | 0.5204 | 0.216909 |
| 3.15479 | 107.098 | 25.003 | 9.95661 | 0.084766 | 1.63475 | 0.444257 | 0.72625 | 0.269861 |
| 3.97164 | 110.3 | 24.989 | 9.95663 | 0.03706 | 1.65976 | 0.192089 | 0.318823 | 0.093719 |
| 5 | 112.844 | 24.993 | 9.96171 | 0.104343 | −10.1032 | −0.10317 | 1.04235 | 0.209489 |
| 6.29463 | 121.891 | 24.979 | 9.95599 | 0.13963 | 49.2616 | 0.028464 | 1.40219 | 0.222806 |
| 7.92447 | 129.094 | 24.975 | 9.95655 | 0.185042 | 4.39712 | 0.412141 | 1.81223 | 0.234527 |
| 9.97631 | 136.069 | 24.964 | 9.95749 | 0.184426 | −26.0577 | −0.07103 | 1.8508 | 0.185656 |
| 12.5594 | 142.623 | 24.961 | 9.95853 | 0.281127 | 196.805 | 0.014344 | 2.82299 | 0.224774 |
| 15.8114 | 149.892 | 24.964 | 9.95487 | 0.303114 | 11.7611 | 0.257972 | 3.03404 | 0.192582 |
| 19.9054 | 160.054 | 24.96 | 9.95388 | 0.371636 | 14.4701 | 0.257423 | 3.72493 | 0.187578 |
| 25.0594 | 165.401 | 24.965 | 9.95027 | 0.459157 | 11.9189 | 0.385843 | 4.59883 | 0.184162 |
| 31.5479 | 172.98 | 24.971 | 9.94365 | 0.627352 | 83.3406 | 0.075707 | 6.30948 | 0.200011 |
| 39.7164 | 179.558 | 24.974 | 9.93387 | 0.791215 | 19.9635 | 0.398554 | 7.95655 | 0.200585 |
| 50 | 184.969 | 24.976 | 9.91849 | 0.987074 | 41.7568 | 0.238343 | 9.95244 | 0.199106 |
| 62.9463 | 192.944 | 24.98 | 9.89381 | 1.21418 | 18.5054 | 0.662572 | 12.2612 | 0.195072 |
| 79.2447 | 199.753 | 24.99 | 9.85841 | 1.51021 | 94.6828 | 0.161933 | 15.3322 | 0.193491 |
| 100 | 205.792 | 24.989 | 9.804 | 1.8513 | 22.8175 | 0.828041 | 18.8939 | 0.18912 |

TABLE 7O

Complex Viscosity Results for Example 16 at 70% Polymer Content
Example 16 (70% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1405 | 25.021 | 9.96147 | 0.372106 | 74.6941 | 0.050006 | 3.73512 | 7.47092 |
| 0.629463 | 45.1433 | 24.978 | 9.96053 | 0.497549 | 69.6255 | 0.071737 | 4.99469 | 7.93567 |
| 0.792447 | 61.033 | 24.958 | 9.95743 | 0.593504 | 39.4961 | 0.150863 | 5.9585 | 7.52153 |
| 0.997631 | 73.6622 | 24.958 | 9.95787 | 0.770639 | −37.0639 | −0.20873 | 7.73618 | 7.75737 |
| 1.25594 | 83.7068 | 24.95 | 9.9614 | 0.926775 | −41.2524 | −0.22546 | 9.30093 | 7.40771 |
| 1.58114 | 91.6905 | 24.956 | 9.95901 | 1.18549 | 37.8149 | 0.314678 | 11.8995 | 7.52854 |
| 1.99054 | 98.0395 | 24.958 | 9.9563 | 1.50353 | −47.9879 | −0.31462 | 15.098 | 7.58655 |
| 2.50594 | 103.085 | 24.961 | 9.96071 | 1.91052 | 95.0994 | 0.201679 | 19.1795 | 7.65407 |
| 3.15479 | 107.097 | 24.965 | 9.95698 | 2.35927 | 141.207 | 0.167797 | 23.694 | 7.51068 |
| 3.97164 | 110.298 | 24.973 | 9.95701 | 2.93608 | −258.528 | −0.11406 | 29.4874 | 7.42453 |
| 5 | 114.099 | 24.979 | 9.9619 | 3.6779 | −440.893 | −0.08374 | 36.9196 | 7.38394 |

TABLE 7O-continued

Complex Viscosity Results for Example 16 at 70% Polymer Content
Example 16 (70% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 6.29463 | 123.149 | 24.981 | 9.95646 | 4.69734 | 277.137 | 0.170235 | 47.1785 | 7.49509 |
| 7.92447 | 130.345 | 24.983 | 9.95698 | 5.90506 | 463.186 | 0.128038 | 59.3056 | 7.48388 |
| 9.97631 | 136.055 | 24.989 | 9.95781 | 7.42096 | 162.588 | 0.458353 | 74.5226 | 7.4701 |
| 12.5594 | 141.112 | 25 | 9.95868 | 9.35257 | 156.075 | 0.60171 | 93.9118 | 7.47754 |
| 15.8114 | 148.783 | 25 | 9.95533 | 11.7183 | 214.669 | 0.548322 | 117.708 | 7.44458 |
| 19.9054 | 155.154 | 25.003 | 9.95413 | 14.7739 | 150.952 | 0.983207 | 148.417 | 7.45628 |
| 25.0594 | 160.5 | 25.007 | 9.95052 | 18.5354 | 169.552 | 1.09863 | 186.273 | 7.43339 |
| 31.5479 | 171.066 | 25.01 | 9.94402 | 23.3182 | 171.563 | 1.36679 | 234.491 | 7.43298 |
| 39.7164 | 177.639 | 25.015 | 9.93446 | 29.3207 | 176.93 | 1.6681 | 295.137 | 7.43123 |
| 50 | 183.055 | 25.015 | 9.91906 | 36.8339 | 154.585 | 2.40125 | 371.337 | 7.42689 |
| 62.9463 | 190.922 | 25.011 | 9.89504 | 46.2623 | 169.162 | 2.76375 | 467.522 | 7.42745 |
| 79.2447 | 197.816 | 25.013 | 9.85971 | 57.9737 | 228.088 | 2.57786 | 587.98 | 7.41988 |
| 100 | 203.163 | 25.014 | 9.80531 | 72.8045 | 258.415 | 2.87327 | 742.496 | 7.42501 |

TABLE 7P

Complex Viscosity Results for Example 16 at 80% Polymer Content
Example 16 (80% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1403 | 25.066 | 9.96234 | 0.676228 | 58.8906 | 0.115246 | 6.78686 | 13.5757 |
| 0.629463 | 45.1432 | 25.027 | 9.96037 | 0.873182 | 51.0661 | 0.171638 | 8.76488 | 13.927 |
| 0.792447 | 61.0328 | 24.999 | 9.95754 | 1.09099 | −209.476 | −0.0523 | 10.9563 | 13.8261 |
| 0.997631 | 73.662 | 24.98 | 9.95749 | 1.34837 | 150.976 | 0.089689 | 13.541 | 13.5734 |
| 1.25594 | 83.7065 | 24.975 | 9.96108 | 1.72474 | 202.555 | 0.085481 | 17.3146 | 13.7863 |
| 1.58114 | 91.6883 | 24.972 | 9.95854 | 2.16783 | 92.5842 | 0.235108 | 21.7673 | 13.7676 |
| 1.99054 | 98.0362 | 24.965 | 9.9563 | 2.76913 | 57.9032 | 0.480263 | 27.8088 | 13.9726 |
| 2.50594 | 105.591 | 24.965 | 9.96028 | 3.41353 | −17810.5 | −1.93E−03 | 34.2714 | 13.6761 |
| 3.15479 | 109.602 | 24.965 | 9.95702 | 4.34845 | 125.891 | 0.346894 | 43.6708 | 13.8431 |
| 3.97164 | 112.803 | 24.963 | 9.95691 | 5.42488 | 215.507 | 0.252812 | 54.483 | 13.7181 |
| 5 | 115.346 | 24.968 | 9.96182 | 6.78246 | 278.907 | 0.244109 | 68.0841 | 13.6169 |
| 6.29463 | 124.393 | 24.972 | 9.95665 | 8.59074 | 169.699 | 0.508429 | 86.28 | 13.7072 |
| 7.92447 | 131.587 | 24.975 | 9.95663 | 10.7914 | 172.239 | 0.629255 | 108.382 | 13.6772 |
| 9.97631 | 137.295 | 24.978 | 9.9578 | 13.5909 | 169.23 | 0.806489 | 136.482 | 13.6809 |
| 12.5594 | 142.35 | 24.98 | 9.95862 | 17.052 | 168.459 | 1.01642 | 171.225 | 13.6334 |
| 15.8114 | 150.02 | 24.983 | 9.95542 | 21.4765 | 163.351 | 1.32062 | 215.723 | 13.6438 |
| 19.9054 | 156.392 | 24.987 | 9.95433 | 27.0103 | 166.496 | 1.6297 | 271.338 | 13.6316 |
| 25.0594 | 161.737 | 24.985 | 9.95079 | 33.985 | 161.08 | 2.12021 | 341.524 | 13.6288 |
| 31.5479 | 169.315 | 24.999 | 9.94451 | 42.739 | 185.228 | 2.32022 | 429.769 | 13.623 |
| 39.7164 | 175.726 | 24.997 | 9.93514 | 53.72 | 163.411 | 3.3088 | 540.697 | 13.6142 |
| 50 | 181.14 | 25 | 9.91983 | 67.4732 | 169.593 | 4.01062 | 680.173 | 13.6037 |
| 62.9463 | 190.503 | 25.003 | 9.89617 | 84.7325 | 169.816 | 5.04193 | 856.201 | 13.6023 |
| 79.2447 | 197.315 | 25.007 | 9.86085 | 106.255 | 184.098 | 5.85302 | 1077.53 | 13.5977 |
| 100 | 202.663 | 25.01 | 9.80681 | 133.233 | 155.467 | 8.73847 | 1358.55 | 13.5857 |

TABLE 7Q

Complex Viscosity Results for Example 16 at 90% Polymer Content
Example 16 (90% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1405 | 25.065 | 9.96435 | 4.18066 | 167.363 | 0.250685 | 41.9554 | 83.9123 |
| 0.629463 | 45.1452 | 25.066 | 9.96133 | 5.27656 | 182.44 | 0.290338 | 52.9696 | 84.1518 |
| 0.792447 | 61.035 | 25.058 | 9.95806 | 6.65553 | 109.399 | 0.610907 | 66.8329 | 84.3409 |

TABLE 7Q-continued

Complex Viscosity Results for Example 16 at 90% Polymer Content
Example 16 (90% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.997631 | 73.6643 | 25.037 | 9.95713 | 8.42845 | 76.8358 | 1.10157 | 84.6403 | 84.8484 |
| 1.25594 | 83.7065 | 25.023 | 9.96129 | 10.5734 | 127.37 | 0.833327 | 106.141 | 84.5137 |
| 1.58114 | 91.6885 | 25.011 | 9.95834 | 13.3478 | 84.3812 | 1.58835 | 134.027 | 84.7718 |
| 1.99054 | 98.0362 | 25.003 | 9.95631 | 16.8403 | 101.728 | 1.66261 | 169.134 | 84.9731 |
| 2.50594 | 103.084 | 25.004 | 9.96022 | 21.2087 | 98.2542 | 2.16706 | 212.923 | 84.9718 |
| 3.15479 | 107.097 | 25 | 9.95709 | 26.6727 | 93.7945 | 2.85583 | 267.861 | 84.9111 |
| 3.97164 | 110.298 | 24.992 | 9.95655 | 33.5645 | 150.884 | 2.23419 | 337.103 | 84.8793 |
| 5 | 112.843 | 24.989 | 9.96217 | 42.2479 | 132.853 | 3.19202 | 424.071 | 84.8166 |
| 6.29463 | 121.89 | 24.983 | 9.95656 | 53.1616 | 146.84 | 3.63609 | 533.923 | 84.824 |
| 7.92447 | 129.093 | 24.981 | 9.95689 | 67.0138 | 141.062 | 4.77112 | 673.022 | 84.9318 |
| 9.97631 | 134.809 | 24.976 | 9.95823 | 84.4093 | 138.756 | 6.10863 | 847.611 | 84.9645 |
| 12.5594 | 139.871 | 24.977 | 9.95935 | 106.194 | 149.475 | 7.13332 | 1066.25 | 84.8985 |
| 15.8114 | 147.546 | 24.976 | 9.95673 | 133.698 | 152.284 | 8.81748 | 1342.76 | 84.9253 |
| 19.9054 | 153.92 | 24.976 | 9.95615 | 168.204 | 144.937 | 11.6561 | 1689.4 | 84.8738 |
| 25.0594 | 159.269 | 24.978 | 9.95378 | 211.625 | 138.062 | 15.399 | 2126.02 | 84.8415 |
| 31.5479 | 166.85 | 24.981 | 9.94884 | 266.249 | 127.764 | 20.9456 | 2676.1 | 84.8293 |
| 39.7164 | 173.261 | 24.981 | 9.94215 | 334.715 | 119.854 | 28.0884 | 3366.51 | 84.7666 |
| 50 | 178.676 | 24.983 | 9.9283 | 420.555 | 111.212 | 38.087 | 4235.74 | 84.7183 |
| 62.9463 | 186.544 | 24.985 | 9.90649 | 527.803 | 102.997 | 51.7257 | 5327.59 | 84.6411 |
| 79.2447 | 193.437 | 24.992 | 9.87429 | 661.51 | 95.586 | 70.083 | 6698.95 | 84.5397 |
| 100 | 198.784 | 24.99 | 9.82073 | 829.346 | 86.9278 | 97.1416 | 8444.3 | 84.4486 |

Complex Viscosity Results for Example 16 at 100% Polymer Content
Example 16 (100% polymer content)

| Angular frequency (rad/s) | Step time (s) | Temp. (° C.) | Oscillation strain (%) | Oscillation stress (Pa) | Tan(delta) | Storage modulus (Pa) | Loss modulus (Pa) | Complex viscosity (Pa · s) |
|---|---|---|---|---|---|---|---|---|
| 0.5 | 25.1405 | 24.999 | 9.96334 | 281.301 | 127.034 | 22.2244 | 2823.27 | 5646.72 |
| 0.629463 | 45.1492 | 24.994 | 9.96165 | 354.05 | 169.254 | 20.9984 | 3554.07 | 5646.29 |
| 0.792447 | 61.0428 | 24.999 | 9.95799 | 444.838 | 146.527 | 30.4861 | 4467.04 | 5637.15 |
| 0.997631 | 73.6758 | 24.997 | 9.95802 | 560.498 | 126.418 | 44.5223 | 5628.43 | 5641.97 |
| 1.25594 | 83.7225 | 24.997 | 9.96153 | 705.934 | 140.443 | 50.4576 | 7086.42 | 5642.45 |
| 1.58114 | 91.7083 | 24.997 | 9.95882 | 888.773 | 106.399 | 83.8737 | 8924.09 | 5644.34 |
| 1.99054 | 98.0568 | 25.002 | 9.95598 | 1117.78 | 88.3861 | 127.016 | 11226.5 | 5640.28 |
| 2.50594 | 103.104 | 25 | 9.96055 | 1407.25 | 79.0064 | 178.81 | 14127.1 | 5637.92 |
| 3.15479 | 107.119 | 24.999 | 9.95686 | 1771.44 | 65.0291 | 273.556 | 17789.1 | 5639.42 |
| 3.97164 | 110.313 | 24.999 | 9.9571 | 2227.89 | 54.8691 | 407.718 | 22371.2 | 5633.66 |
| 5 | 112.862 | 25.001 | 9.96187 | 2800.41 | 44.9282 | 625.539 | 28104.3 | 5622.26 |
| 6.29463 | 121.915 | 25 | 9.95669 | 3520.41 | 37.5097 | 942.283 | 35344.7 | 5617.06 |
| 7.92447 | 129.112 | 25 | 9.95699 | 4424.89 | 30.878 | 1438.46 | 44416.8 | 5607.96 |
| 9.97631 | 134.824 | 24.996 | 9.95814 | 5556.51 | 25.7789 | 2162.88 | 55756.7 | 5593.12 |
| 12.5594 | 139.884 | 25.004 | 9.95903 | 6972.69 | 21.3683 | 3272.94 | 69937.2 | 5574.59 |
| 15.8114 | 147.558 | 24.999 | 9.95621 | 8737.73 | 17.8235 | 4916.18 | 87623.8 | 5550.53 |
| 19.9054 | 153.932 | 24.997 | 9.95533 | 10932.6 | 14.9148 | 7346.43 | 109570 | 5516.93 |
| 25.0594 | 159.282 | 25 | 9.95248 | 13649.2 | 12.5399 | 10902 | 136710 | 5472.77 |
| 31.5479 | 166.864 | 24.999 | 9.94713 | 17001 | 10.6275 | 16011.4 | 170162 | 5417.6 |
| 39.7164 | 173.436 | 25 | 9.93827 | 21106.5 | 9.09276 | 23216.7 | 211103 | 5347.32 |
| 50 | 179.983 | 24.997 | 9.92389 | 26106.2 | 7.86309 | 33188.3 | 260962 | 5261.29 |
| 62.9463 | 187.85 | 25.004 | 9.90114 | 32119.6 | 6.87049 | 46724.6 | 321021 | 5153.66 |
| 79.2447 | 194.745 | 25.001 | 9.86524 | 39267.9 | 6.07475 | 64653.9 | 392757 | 5022.96 |
| 100 | 200.105 | 25.003 | 9.81108 | 47849.5 | 5.46566 | 87774.5 | 479745 | 4888.67 |

APPENDIX B

TABLE 9

Comparison of 1st order monomer conversion viscosities over time for poly(propylene fumarate-co-succinate) copolymers made with different orders of addition for the reactive species

| Catalyst + alcohol | | Catalyst + Maleic anhydrid | |
|---|---|---|---|
| Time (hrs) | $\ln([M_0/M_t])$ | Time (hrs) | $\ln([M_0/M_t])$ |
| 2 | 0.1246 | 1.7 | 0.104 |
| 4 | 0.178 | 2.5 | 0.113 |
| 6 | 0.246 | 4 | 0.1658 |
| 8 | 0.321 | 5 | 0.24 |
| 10.1 | 0.372 | 6 | 0.5422 |
| 12 | 0.418 | 10 | 0.93 |
| 14 | 0.4589 | 14 | 1.21 |
| 16 | 0.5516 | 18 | 1.52 |
| 18 | 0.5979 | 22 | 1.756 |
| 20 | 0.6503 | 24 | 1.793 |
| 22 | 0.7181 | 26 | 1.825 |
| 24 | 0.7853 | 30 | 1.94 |
| 26.4 | 0.8542 | 50 | 2.01 |
| 41 | 1.44 | | |
| 44.5 | 1.78 | | |
| 48 | 2.08 | | |
| 50 | 2.10 | | |
| 52 | 2.23 | | |

TABLE 10

Comparison of MAn conversion percentage over time for poly(propylene fumarate-co-succinate) copolymers made with different orders of addition for the reactive species

| Catalyst + alcohol | | Catalyst + Maleic anhydride | |
|---|---|---|---|
| Time (hrs) | MAn conversion (%) | Time (hrs) | MAn conversion (%) |
| 2 | 11.7 | 1.7 | 10 |
| 4 | 16.3 | 2.5 | 11 |
| 6 | 21.8 | 4 | 15.28 |
| 8 | 27.5 | 5 | 21.32 |
| 10.1 | 31.05 | 6 | 41.85 |
| 12 | 34.16 | 10 | 60.5 |
| 14 | 36.8 | 14 | 70.15 |
| 16 | 40.28 | 18 | 78.11 |
| 18 | 43.97 | 22 | 82.72 |
| 20 | 48.11 | 24 | 83.35 |
| 22 | 51.28 | 26 | 83.98 |
| 24 | 54.41 | 30 | 85.5 |
| 26.4 | 57.76 | 50 | 86.7 |
| 41 | 76.3 | 50 | 86.7 |
| 44.5 | 83.2 | | |
| 48 | 87.6 | | |
| 50 | 89.5 | | |
| 52 | 93 | | |

TABLE 11

Comparison of Mn and Đm at different MAn Conversion (%) for poly(propylene fumarate-co-succinate) copolymers made with different orders of addition for the reactive species

| Catalyst + Maleic anhydride | | | Catalyst + alcohol | | |
|---|---|---|---|---|---|
| MAn Conversion (%) | Mn (g·mol$^{-1}$) | Đ$_m$ | MAn Conversion (%) | Mn (g·mol$^{-1}$) | Đ$_m$ |
| 10 | 337 | — | 21.8 | 504 | — |
| 11 | 393 | — | 27.5 | 622 | — |
| 15.28 | 477 | — | 31.05 | 713 | — |
| 21.32 | 555 | — | 34.16 | 824 | — |
| 41.85 | 1129 | — | 36.8 | 925 | — |
| 58.2 | 1769 | 2.05 | 40.28 | 1022 | 1.26 |
| 70.15 | 2022 | 1.93 | 43.97 | 1100 | 1.27 |
| 78.11 | 2382 | 1.7 | 48.11 | 1196 | 1.26 |
| 82.72 | 2549 | 1.57 | 51.28 | 1267 | 1.29 |
| 83.35 | 2610 | 1.53 | 54.41 | 1402 | 1.27 |
| 83.88 | 2628 | 1.52 | 57.76 | 1485 | 1.26 |
| 85.5 | 2761 | 1.48 | 76.3 | 2230 | — |
| 86.7 | 2836 | 1.48 | 83.2 | 2620 | — |
| | | | 87.6 | 2930 | — |
| | | | 86.4 | 2850 | — |

TABLE 12

Complex Viscosity for Clear PPF/DEF with 50% Polymer Content
Clear PPF/DEF
50% polymer content

| Angular frequency rad/s | Step time s | Temp. °C. | Oscillation strain % | Oscillation stress Pa | Tan (delta) | Storage modulus Pa | Loss modulus Pa | Complex viscosity (Pa·s) |
|---|---|---|---|---|---|---|---|---|
| 0.628319 | 20.0053 | 24.999 | 4.98085 | 0.016501 | 11.6995 | 0.028214 | 0.330092 | 0.527273 |
| 0.995818 | 32.6945 | 25.004 | 4.97983 | 0.024773 | 4.35955 | 0.111219 | 0.484866 | 0.499547 |
| 1.57826 | 40.7153 | 25 | 4.9798 | 0.039194 | 11.6734 | 0.067177 | 0.784177 | 0.49868 |
| 2.50138 | 45.8047 | 25.003 | 4.98102 | 0.062835 | 40.377 | 0.031233 | 1.26111 | 0.504319 |
| 3.96442 | 50.6218 | 24.999 | 4.97574 | 0.099409 | 70.3467 | 0.028398 | 1.99767 | 0.50395 |
| 6.28319 | 59.7183 | 25.002 | 4.97921 | 0.153472 | 38.44 | 0.080157 | 3.08122 | 0.490557 |
| 9.95818 | 65.4897 | 25.007 | 4.97968 | 0.244125 | 34.3133 | 0.142812 | 4.90034 | 0.492301 |
| 15.7826 | 72.8132 | 25.007 | 4.97902 | 0.385825 | 141.672 | 0.054696 | 7.74881 | 0.490983 |
| 25.0138 | 78.2372 | 25.002 | 4.9752 | 0.609929 | 93.869 | 0.130593 | 12.2587 | 0.490104 |
| 39.6442 | 84.4727 | 25.001 | 4.96907 | 0.966296 | 95.0724 | 0.20453 | 19.4452 | 0.490519 |
| 62.8319 | 95.451 | 25.001 | 4.94869 | 1.52735 | 166.334 | 0.185548 | 30.8631 | 0.49121 |
| 99.5818 | 101.373 | 25.003 | 4.90653 | 2.3994 | 117.908 | 0.414734 | 48.9004 | 0.491076 |
| 157.826 | 107.749 | 25.007 | 4.8164 | 3.72616 | 411.455 | 0.188025 | 77.3639 | 0.490185 |
| 250.138 | 115.877 | 24.997 | 4.67194 | 5.71663 | −663.478 | −0.18442 | 122.361 | 0.489176 |

TABLE 12-continued

Complex Viscosity for Clear PPF/DEF with 50% Polymer Content
Clear PPF/DEF
50% polymer content

| Angular frequency rad/s | Step time s | Temp. °C. | Oscillation strain % | Oscillation stress Pa | Tan (delta) | Storage modulus Pa | Loss modulus Pa | Complex viscosity (Pa · s) |
|---|---|---|---|---|---|---|---|---|
| 396.442 | 121.947 | 25.005 | 4.48925 | 8.75216 | −41.981 | −4.6427 | 194.905 | 0.491775 |
| 628.319 | 129.027 | 25.001 | 4.25825 | 13.1973 | −197.153 | −1.57201 | 309.928 | 0.493272 |

TABLE 13

Complex Viscosity for Dark PPF/DEF with 60% Polymer Content
Clear PPF/DEF
60% polymer content

| Angular frequency rad/s | Step time s | Temp. °C. | Oscillation strain % | Oscillation stress Pa | Tan (delta) | Storage modulus Pa | Loss modulus Pa | Complex viscosity (Pa · s) |
|---|---|---|---|---|---|---|---|---|
| 0.628319 | 20.0053 | 24.995 | 4.98229 | 0.051414 | 14.2267 | 0.072356 | 1.02938 | 1.64236 |
| 0.995818 | 32.6945 | 24.997 | 4.97935 | 0.079126 | 28.6516 | 0.055428 | 1.58811 | 1.59575 |
| 1.57826 | 40.7155 | 24.997 | 4.98061 | 0.125058 | 43.9614 | 0.057101 | 2.51025 | 1.59093 |
| 2.50138 | 45.8045 | 24.997 | 4.98035 | 0.204265 | 36.5354 | 0.112217 | 4.09989 | 1.63966 |
| 3.96442 | 49.0355 | 24.994 | 4.97692 | 0.320454 | 67.8929 | 0.094827 | 6.43809 | 1.62414 |
| 6.28319 | 59.1335 | 24.997 | 4.9781 | 0.50391 | 66.236 | 0.152808 | 10.1214 | 1.61105 |
| 9.95818 | 64.8943 | 25 | 4.98044 | 0.79471 | 73.9413 | 0.215781 | 15.9551 | 1.60236 |
| 15.7826 | 72.2143 | 25.001 | 4.9802 | 1.25838 | 75.8813 | 0.332959 | 25.2654 | 1.60097 |
| 25.0138 | 77.635 | 25 | 4.97778 | 1.98942 | 81.5641 | 0.489958 | 39.963 | 1.59776 |
| 39.6442 | 83.8688 | 25.001 | 4.97437 | 3.14841 | 85.4593 | 0.740566 | 63.2883 | 1.59652 |
| 62.8319 | 91.8497 | 24.999 | 4.95779 | 4.97329 | 93.4413 | 1.07348 | 100.307 | 1.59653 |
| 99.5818 | 97.7658 | 25 | 4.91667 | 7.797 | 112.104 | 1.41455 | 158.577 | 1.59249 |
| 157.826 | 104.139 | 24.999 | 4.82572 | 12.1184 | 144.294 | 1.74031 | 251.116 | 1.59113 |
| 250.138 | 116.64 | 24.997 | 4.66541 | 18.5841 | 300.724 | 1.32459 | 398.335 | 1.59247 |
| 396.442 | 122.711 | 25 | 4.43794 | 28.2372 | −97.4327 | −6.52998 | 636.234 | 1.60494 |
| 628.319 | 129.804 | 24.998 | 4.10345 | 42.9125 | −93.5594 | −11.1769 | 1045.71 | 1.66439 |

What is claimed is:

1. A polymer composition comprising one or more isomerized residues of maleic anhydride monomer, one or more residues of succinic anhydride monomer and one or more residues of propylene oxide monomer and having a mass distribution ($Đ_m$) of from about 1 to about 1.5, wherein said polymer composition comprises from about 1 to about 30 mole percent succinic anhydride residues.

2. The polymer composition of claim 1 having a degree of polymerization (DP) of from about 5 to about 100.

3. The polymer composition of claim 1 having a number average molecular weight ($M_n$) of from about 0.5 kDa to about 100 kDa, as measured by size exclusion chromatography (SEC) or gel permeation chromatography (GPC).

4. The polymer composition of claim 1 having a mass distribution ($Đ_m$) of from about 1 to about 1.2.

5. The polymer composition of claim 1 having a zero sheer viscosity of from about 500 Pa·s to about 10,000 Pa·s, as measured by a rheometer.

6. The polymer composition of claim 1 having a zero sheer viscosity of from about 1.5 Pa·s to about 2.5 Pa·s, as measured by a rheometer when diluted with 30 weight percent DEF.

7. The polymer composition of claim 1 having an absorbance at wavelengths from about 305 nm to about 405 nm of from about 0.001 to about 0.3, as measured by a UV-Visible spectrometer.

8. The polymer composition of claim 1 having the formula:

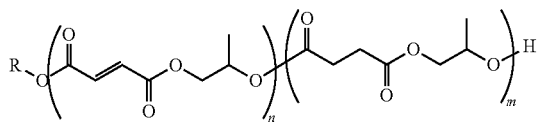

where R is alkyl, alkene, alkyne or aromatic group; n is a mole fraction from about 0.50 to about 0.99 and m is a mole fraction from about 0.01 to about 0.50.

9. A polymer for use in 3D printable resins comprising the isomerized reaction product of maleic anhydride, succinic anhydride and propylene oxide having an absorbance at wavelengths from about 305 nm to about 405 nm of from about 0.001 to about 0.2 as measured by a UV-Visible spectrometer.

10. The polymer for use in 3D printable resins of claim 9 comprising from about 1 to about 20 mole percent, succinic anhydride residues.

11. The polymer for use in 3D printable resins of claim 9 having a degree of polymerization (DP) of from about 5 to about 50.

12. The polymer for use in 3D printable resins of claim 9 having a number average molecular mass ($M_n$) of from about 0.5 kDa to about 50 kDa, as measured by size exclusion chromatography (SEC) or gel permeation chromatography (GPC).

13. The polymer for use in 3D printable resins of claim 9 having a mass distribution ($Đ_m$) of from about 1 to about 1.5.

14. The polymer for use in 3D printable resins of claim 9 having a zero sheer viscosity of from about 1000 Pa·s to about 7,000 Pa·s, as measured by a rheometer.

15. The polymer for use in 3D printable resins of claim 9 having a zero sheer viscosity of from about 1.7 Pa·s to about 2.4 Pa·s, as measured by a rheometer when diluted with 30 weight percent DEF.

16. The polymer for use in 3D printable resins of claim 9 having the formula:

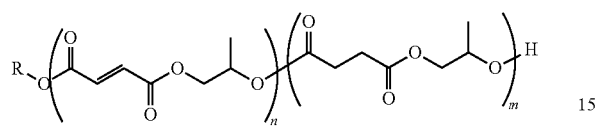

where R is alkyl, alkene, alkyne or aromatic group; n is a mole fraction from about 0.50 to about 0.99 and m is a mole fraction from about 0.01 to about 0.50.

* * * * *